(12) United States Patent
Nishibayashi et al.

(10) Patent No.: US 9,465,378 B2
(45) Date of Patent: Oct. 11, 2016

(54) POWER ELECTRONICS DEVICE, COMMUNICATION DEVICE, COOPERATIVE CONTROL METHOD AND COMPUTER READABLE MEDIUM

(71) Applicant: KABUSHIKI KAISHA TOSHIBA, Tokyo (JP)

(72) Inventors: Yasuyuki Nishibayashi, Kawasaki (JP); Keiichi Teramoto, Tokyo (JP); Kotaro Ise, Kawasaki (JP); Yasuro Shobatake, Kawasaki (JP); Ikuya Aoyama, Yokohama (JP); Yuki Yonezawa, Kawasaki (JP); Fumiaki Kanayama, Kawasaki (JP); Yusuke Doi, Yokohama (JP); Shinya Murai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 273 days.

(21) Appl. No.: 14/028,871

(22) Filed: Sep. 17, 2013

(65) Prior Publication Data
US 2014/0288718 A1     Sep. 25, 2014

(30) Foreign Application Priority Data

Mar. 19, 2013  (JP) ................................ 2013-056978
Sep. 4, 2013   (JP) ................................ 2013-183473

(51) Int. Cl.
    *G05B 13/02*    (2006.01)
    *G05B 19/042*   (2006.01)

(52) U.S. Cl.
    CPC ... *G05B 19/0423* (2013.01); *G05B 2219/2237* (2013.01); *G05B 2219/2639* (2013.01)

(58) Field of Classification Search
    CPC .............. G05B 15/00; G05B 19/0423; G05B 2219/2237; G05B 2219/2639
    USPC ....................................................... 700/286
    See application file for complete search history.

(56) References Cited

U.S. PATENT DOCUMENTS 8,058,836 B2      11/2011  Ichikawa et al.
2007/0290835 A1*  12/2007  Engel Hardt et al. ... 340/538.16
(Continued)

FOREIGN PATENT DOCUMENTS

JP     2003-235252     8/2003
JP     2003-348851     12/2003
(Continued)

OTHER PUBLICATIONS

Nguyen, P.H. et al., "Smart Power Router: A Flexible Agent-Based Converter Interface in Acive Distribution Networks", IEEE Transactions on Smart Grid, vol. 2, No. 3, (Sep. 2011), pp. 487-495.
Otani et al., "A Plug and Play Method for Maintenance Support System to Streamline", *System Engineering Research Laboratory*, Rep.No. R10023, and an English Abstract.
Nishibayashi, U.S. Appl. No. 13/835,474, filed Mar. 15, 2013.

*Primary Examiner* — Robert Fennema
*Assistant Examiner* — Sivalingam Sivanesan
(74) *Attorney, Agent, or Firm* — Nixon & Vanderhye, P.C.

(57) ABSTRACT

According to some embodiments, there is provided a power electronics device including: a controlling unit, a determining unit, a confirming unit and a determining unit. The controlling unit performs surveillance/control concerning an input/output of power to a power line with other power electronics devices connected via the power line. The determining unit determines a master device which is a subject of the surveillance/control and a slave device which is controlled by the master device, based on power characteristic information of the other power electronics devices from among the other power electronics devices and the power electronics device. The confirming unit confirms whether the master device and the slave device determined by the determining unit are matched with the master device and the slave device determined by the other power electronics devices. The determining unit permits a start of the surveillance/control when matching is determined by the confirming unit.

13 Claims, 47 Drawing Sheets

(56) References Cited

U.S. PATENT DOCUMENTS

2009/0322154 A1* 12/2009 Ichikawa et al. ............... 307/82
2010/0095035 A1* 4/2010 Chen et al. .................. 710/110
2014/0077596 A1* 3/2014 Nishibayashi et al. ......... 307/29
2014/0247892 A1* 9/2014 Williams et al. ............ 375/257

FOREIGN PATENT DOCUMENTS

| JP | 2008-035665 | 2/2008 |
| JP | 2009-118670 | 5/2009 |
| JP | 2010-213482 | 9/2010 |

* cited by examiner

| INFORMATION TYPE | | REMARK |
|---|---|---|
| DEVICE ID | | INDIVIDUAL RECOGNITION NUMBER (SERIAL NUMBER ETC.) |
| DEVICE TYPE | | EMS, INV (AC/DC), INV (DC/DC), INV (DC/DC) : POWER SOURCE (BATTERY STORAGE), INV (DC/DC) : POWER SOURCE (PV), INV (DC/DC) : LOAD, DC/DC: POWER SOURCE (IN CASE WHERE POWER SOURCE SUCH AS BATTERY STORAGE AND PV IS CONNECTED) DC/DC: LOAD (IN CASE WHERE LOAD DEVICE IS CONNECTED) |
| COMMUNICATION CONNECTION | | IDENTICAL COMMUNICATION BROADCAST DEVICES POSITIONED IN DOMAIN |
| POWER CONNECTION | | DEVICES POSITIONED ON SAME BUS LINE |
| MASTER/SLAVE | | MASTER: DEVICE OF CONTROL SUBJECT SLAVE: DEVICE SUBJECTED TO CONTROL |

FIG. 7

| DEVICE ID | DEVICE TYPE | SEQUENCE NUMBER: 01 | | |
|---|---|---|---|---|
| | | COMMUNICATION CONNECTION | POWER CONNECTION | MASTER/ SLAVE |
| 1 | INV (AC/DC) | 2,3,4 | 2,3,4 | M: NOTHING S:2,3,4 |
| 2 | INV (DC/DC) : POWER SOURCE (BATTERY STORAGE) | 1,3,4 | 1,3,4 | M : 1 S : NOTHING |
| 3 | IN (DC/DC) : POWER SOURCE(PV) | 1,2,4 | 1,2,4 | M : 1 S : NOTHING |
| 4 | INV (DC/DC) : LOAD | 1,2,3 | 1,2,3 | M : 1 S : NOTHING |

FIG. 8

| SEQUENCE NUMBER:0 | |
|---|---|
| ID | MASTER/SLAVE |
| 1 | |
| 2 | |
| 3 | |
| 4 | |

(A)

| SEQUENCE NUMBER:1 | |
|---|---|
| ID | MASTER/SLAVE |
| 1 | |
| 2 | |
| 3 | S:4 |
| 4 | M:3 |

(B)

| SEQUENCE NUMBER:2 | |
|---|---|
| ID | MASTER/SLAVE |
| 1 | |
| 2 | M:3 |
| 3 | S:2,4 |
| 4 | M:3 |

(C)

| SEQUENCE NUMBER:3 | |
|---|---|
| ID | MASTER/SLAVE |
| 1 | S:3,4 |
| 2 | M:3 |
| 3 | M:1 S:2 |
| 4 | M:1 |

(D)

| SEQUENCE NUMBER:4 | |
|---|---|
| ID | MASTER/SLAVE |
| 1 | S:2,3,4 |
| 2 | M:1 |
| 3 | M:1 |
| 4 | M:1 |

| ID | MASTER/SLAVE |
|----|--------------|
| 1 | |
| 2 | |
| 3 | |
| 4 | |

SEQUENCE NUMBER: 0

(B)

| ID | MASTER/SLAVE |
|----|--------------|
| 1 | |
| 2 | |
| 3 | S:4 |
| 4 | M:3 |

SEQUENCE NUMBER: 1

(C)

| ID | MASTER/SLAVE |
|----|--------------|
| 1 | |
| 2 | M:3 |
| 3 | S:2,4 |
| 4 | M:3 |

SEQUENCE NUMBER: 2

(D)

| ID | MASTER/SLAVE |
|----|--------------|
| 1 | S:4 |
| 2 | M:3 |
| 3 | S:2,4 |
| 4 | M:1 |

SEQUENCE NUMBER: 3

(E)

| ID | MASTER/SLAVE |
|----|--------------|
| 1 | S:2,4 |
| 2 | M:1 |
| 3 | S:2,4 |
| 4 | M:1 |

SEQUENCE NUMBER: 4

(F)

| ID | MASTER/SLAVE |
|----|--------------|
| 1 | S:2,3,4 |
| 2 | M:1 |
| 3 | M:1 |
| 4 | M:1 |

SEQUENCE NUMBER: 5

FIG. 13C

STEP 1: USUAL OPERATION (NORMAL OPERATION)

|  | AC/DC (M) | DC/DC (BATTERY STORAGE) (S) | DC/DC (PV) (S) | DC/DC (LOAD) (S) |
|---|---|---|---|---|
| RATE VALUE | 25kW | 10kW | 10kW | 25kW |
| ACTUAL VALUE | 25kW | 0 | 0 | 25kW |

STEP 2: BLACKOUT OCCURRENCE (ANOMALOUS OCCURRENCE)

|  | AC/DC (M) | DC/DC (BATTERY STORAGE) (S) | DC/DC (PV) (S) | DC/DC (LOAD) (S) |
|---|---|---|---|---|
| RATE VALUE | – | 10kW | 10kW | – |
| ACTUAL VALUE | – | 0 | 0 | – |

STEP 3: FAIL-SOFT (DEGENERACY OPERATION)

|  | AC/DC | DC/DC (BATTERY STORAGE) (M) | DC/DC (PV) (S) | DC/DC (LOAD) (S) |
|---|---|---|---|---|
| RATE VALUE | – | 10kW | 10kW | 25kW |
| ACTUAL VALUE | – | 10kW | 10kW | 20kW |

STEP 4: BLACKOUT RESTORATION (ABNORMALITY RESTORATION)→STEP 1

|  | AC/DC | DC/DC (BATTERY STORAGE) (M) | DC/DC (PV) (S) | DC/DC (LOAD) (S) |
|---|---|---|---|---|
| RATE VALUE | 25kW | 10kW | 10kW | 25kW |
| ACTUAL VALUE | 0 | 10kW | 10kW | 20kW |

FIG. 15C

NOTIFY MESSAGE

| COMMUNICATION HEADER | MESSAGE TYPE | SEQUENCE NUMBER | TRANSMISSION DEVICE ID | NOTIFICATION/ UPDATE/ SEPARATION |
|---|---|---|---|---|

FIG. 16

SEARCH MESSAGE

| COMMUNICATION HEADER | MESSAGE TYPE | TRANSMISSION DEVICE ID | STANDBY TIME |
|---|---|---|---|

FIG. 17

SEARCH-RESPONSE MESSAGE

| COMMUNICATION HEADER | MESSAGE TYPE | SEQUENCE NUMBER | TRANSMISSION DEVICE ID |
|---|---|---|---|

FIG. 18

SCDATA-WRITE-RESPONSE MESSAGE

| COMMUNICATION HEADER | MESSAGE TYPE | SEQUENCE NUMBER | TRANSMISSION DEVICE ID | WRITING RESULT |
|---|---|---|---|---|

SCDATA-READ-REQUEST MESSAGE

| COMMUNICATION HEADER | MESSAGE TYPE | TRANSMISSION DEVICE ID |
|---|---|---|

INFO REQUEST

| COMMUNICATION HEADER | MESSAGE TYPE | SEQUENCE NUMBER | POWER CONNECTION INFORMATION IDENTIFIER |

FIG. 31

INFO RESPONSE

| COMMUNICATION HEADER | MESSAGE TYPE | SEQUENCE NUMBER | STATUS CODE | POWER CONNECTION INFROMATION ACCESS IDENTIFIER | POWER CONNECTION INFORMATION SIZE |

FIG. 32

GET BLOCK REQUEST

| COMMUNICATION HEADER | MESSAGE TYPE | SEQUENCE NUMBER | POWER CONNECTION INFORMATION ACCESS IDENTIFIER | ACQUISITION START POINT OF POWER CONNECTION INFORMATION |

FIG. 33

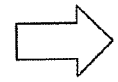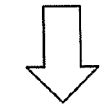
FIG. 37

POWER ELECTRONICS DEVICE, COMMUNICATION DEVICE, COOPERATIVE CONTROL METHOD AND COMPUTER READABLE MEDIUM

CROSS REFERENCE TO RELATED APPLICATIONS

This application is based upon and claims the benefit of priority from the prior Japanese Patent Application No. 2013-056978 filed on Mar. 19, 2013 and No. 2013-183473 filed on Sep. 4, 2013, the entire contents of which are incorporated herein by reference.

FIELD

Embodiments described herein relate to a power electronics device, a communication device, a cooperative control method and a computer readable medium.

BACKGROUND

Take a moment to consider a system in which an inverter unit (i.e., power electronics device) that converts the power is provided with a communication function and autonomous cooperative control such as phase synchronization of output power and allocation of output/input power amount is applied between a plurality of power electronics devices to maintain the flexibility of operations while automatically implementing a capacity change even at the time of expansion and the time when an abnormality occurs.

It is necessary to provide a phase synchronization of output power function in, for example, an application in which a plurality of power electronics devices are driven in parallel to increase the output of power. The phase synchronization of output power function is to prevent an occurrence of cross current (e.g. reactive current caused by a difference of electromotive force, synchronization cross current caused by a phase difference of electromotive force and harmonic cross current caused by a waveform difference of electromotive force) in an output on the alternating-current side. Also, the allocation of output/input power amount function is to drive a plurality of power electronics devices in parallel and distribute the power efficiently for the load of a motor drive or the like.

In this case, it is useful for the throughput increase in the power input/output to determine the subject of control between the plurality of power electronics devices, that is, to determine a master (i.e. device of a control subject) and a slave (i.e., device of a controlled subject) and give an instruction of power information and synchronization information (e.g., time synchronization information and frequency information) from the master to the slave for phase synchronization of output power. In a case where three or more power electronics devices are connected to the same power line, since it is difficult only with information on the power line to recognize individual actual values with respect to the planned values of respective devices, power information is exchanged using the communication function and the master synchronizes with the slave.

In the related art, there is disclosed a method in which a plurality of inverters, to which the master/slave role is fixedly set, realize parallel running corresponding to phase synchronization of output power by the use of an optical communication line. Moreover, there is disclosed a method in which, by notifying device information to a server by the use of a communication function when a device connects to a system, software on the server that monitors and controls the device is automatically set.

However, in the case of automatically determining the master/slave role between a plurality of power electronics devices, since the devices individually operate at the time of initial installation or anomalous occurrence, if the defined state of a logical configuration that controls power is not considered, the operations may start in a state where there are a plurality of masters in the system. In this case, since it is difficult to unify a decision as to from which power electronics device the synchronization information is received for operation, there is a problem of an autonomous cooperation function such as phase synchronization of output power and allocation of output/input power amount unable to correctly operate. Such a problem cannot be solved by a simple combination of the above-mentioned related arts.

Moreover, any of the related arts assume the operation state between the time of initial installment of a device and the time of driving of the device. Therefore, in a case where an abnormality such as a blackout (i.e., major power outage) occurs, there is a problem of difficulty to realize the securement of operation flexibility and the maintenance of power input/output throughput by automatically executing fail-soft (i.e., degeneracy operation) and continuing power input/output.

BRIEF DESCRIPTION OF THE DRAWINGS

FIG. 7 is a view illustrating a configuration example of characteristic information according to an embodiment of the present invention;

FIG. 8 is a view illustrating a configuration example of configuration information according to an embodiment of the present invention;

FIG. 12C is a view illustrating an updating example of configuration information according to an embodiment of the present invention;

FIG. 13C is a view illustrating an updating example of configuration information according to an embodiment of the present invention;

FIG. 15C is a view illustrating an operation state example of multiple power electronics devices at the time of anomalous occurrence according to an embodiment of the present invention;

FIG. 16 is a view illustrating a communication message configuration example according to an embodiment of the present invention;

FIG. 17 is a view illustrating a communication message configuration example according to an embodiment of the present invention;

FIG. 18 is a view illustrating a communication message configuration example according to an embodiment of the present invention;

FIG. 20 is a view illustrating a communication message configuration example according to an embodiment of the present invention;

FIG. 21 is a view illustrating a communication message configuration example according to an embodiment of the present invention.

FIG. 23 is a view illustrating the outline of an exchanging scheme of power connection information managed by a power electronics device or the like;

FIG. 31 is a view illustrating a format of an INFO request message;

FIG. 32 is a view illustrating a format of an INFO response message;

FIG. 33 is a view illustrating a format of a GET BLOCK request message;

FIG. 37 is an explanatory diagram of processing for confirming the configuration of power connection;

DETAILED DESCRIPTION

According to some embodiments, there is provided a power electronics device including: a controlling unit, a determining unit, a confirming unit and a determining unit.

The controlling unit performs surveillance/control concerning an input/output of power to a power line with other power electronics devices connected via the power line.

The determining unit determines a master device which is a subject of the surveillance/control and a slave device which is controlled by the master device, based on power characteristic information of the other power electronics devices from among the other power electronics devices and the power electronics device.

The confirming unit confirms whether the master device and the slave device determined by the determining unit are matched with the master device and the slave device determined by the other power electronics devices.

The determining unit permits a start of the surveillance/control when matching is determined by the confirming unit.

In the following, embodiments of the present invention are described with reference to the drawings.

Figure 1:
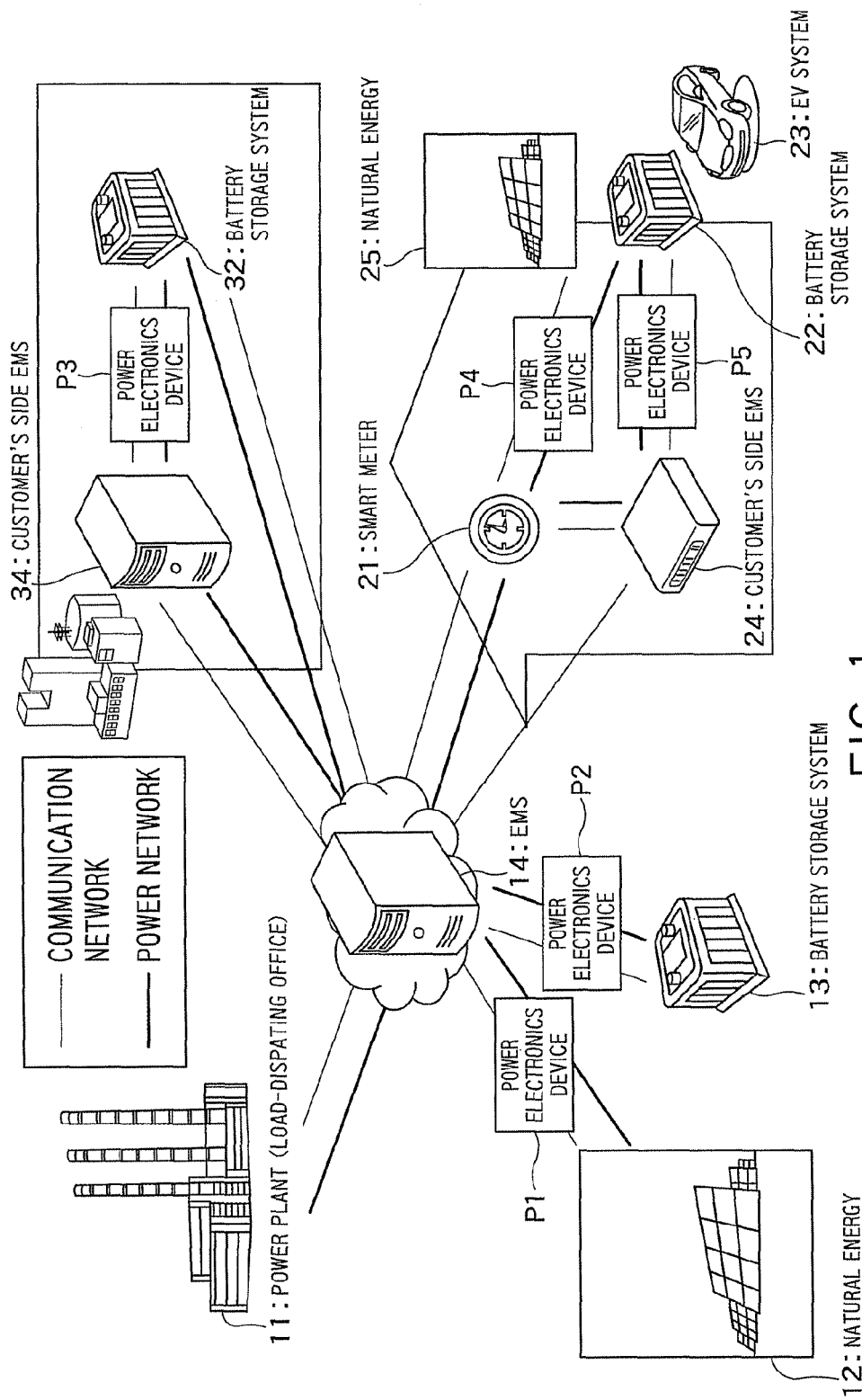
FIG. 1 is an overall system configuration view according to an embodiment of the present invention.

FIG. 1 presents the entire outline of a system configuration according to the present invention. On the power infrastructure side, there are provided a power plant (or load-dispatching office) 11, a natural energy system 12, a battery storage system 13 and an EMS (Energy Management System) 14. Moreover, on the customer side of a home or building, there are provided a smart meter 21, battery storage systems 22 and 32, an EV (Electric Vehicle) system 23, customer's side EMS's 24 and 34. Moreover, a natural energy system 25 such as PV (PhotoVoltaic) generation and wind power generation is installed. A customer's side EMS for homes implements power monitoring control in the equipment as an HEMS (Home Energy Management System) and the customer's side EMS for buildings implements power monitoring control in the equipment as a BEMS (Building Energy Management System). Inverters (i.e., power electronics devices) P1, P4, P2, P5 and P3 that convert the input/output power (direct current/alternating current or direct current/direct current) are connected to the natural energy systems 12 and 25 and the battery storage systems 13, 22 and 32.

The power plant (or load-dispatching office) 11 generates a large amount of power by fuel sources such as fire power and nuclear power, and supplies it to the customer side such as homes, buildings and factories through transmission and distribution networks. In the present specification, the transmission and distribution networks from the power plant 11 to the customers are collectively referred to as "power infrastructure (or power system network)." The natural energy system 12 includes a power generating device that generates power from energy existing in the natural world such as wind power and sunlight, and, in the same way as the power plant, supplies the power from the power system network to the customers through transmission and distribution networks. By installing the natural energy system in the power system network, it is possible to reduce the burden in the power plant and efficiently perform an operation. Here, the battery storage system 13 has a role to store surplus power generated in the power plant 11 and the natural energy system 12. Also, the EMS 14 has a role to control the stabilization in the whole power system including the supply power of the power plant 11 and the natural energy system 12 and load power consumed on the customer side, using both a power network and a communication network.

The smart meter 21 measures the electric energy consumed in equipment on the customer side and periodically notifies it to a management server of an electric power provider. Generally, although the management server is referred to as "MDMS (Metering Data Management System)," its illustration is omitted in FIG. 1. The above-mentioned EMS 14 can calculate the total amount of load power on the customer side in cooperation with the MDMS. The battery storage systems 32 and 22 installed in customer's equipment store power supplied from the system network of the electric power provider or power generated by the natural energy system in the equipment. The EV system 23 stores power in an in-vehicle battery through a battery charger. The HEMS performs supervisory control of the power consumption amount in the home and the BEMS performs supervisory control of the power consumption amount in the building or factory. As described above, embodiments of the present invention are applicable to not only the home but also the building or factory in the same way. In this case, the BEMS in the building equipment and the customer's side EMS called "FEMS (Factory Management System)" in the factory play a role of performing supervisory control of the power consumption amount in the equipment.

As the use of the battery storage system on the system side of the electric power provider, a battery storage system is utilized to realize a function called "ancillary service" (i.e. short-period control) that stabilizes a system by performing output adjustment on the second time scale according to instant load changes in order to maintain the system frequency or the quality of power such as voltage. Also, as the use of the battery storage system on the home or building customer side, it may be utilized to realize a function called "peak shift" (i.e. day operation) that stores nighttime power of a lower unit price to implement interchange in a time period in which the diurnal power use is peak. Power electronics devices P1 to P5 convert power between the direct-current power input/output by a battery storage system or natural energy system and the alternating-current power of the power system network.

Figure 2:
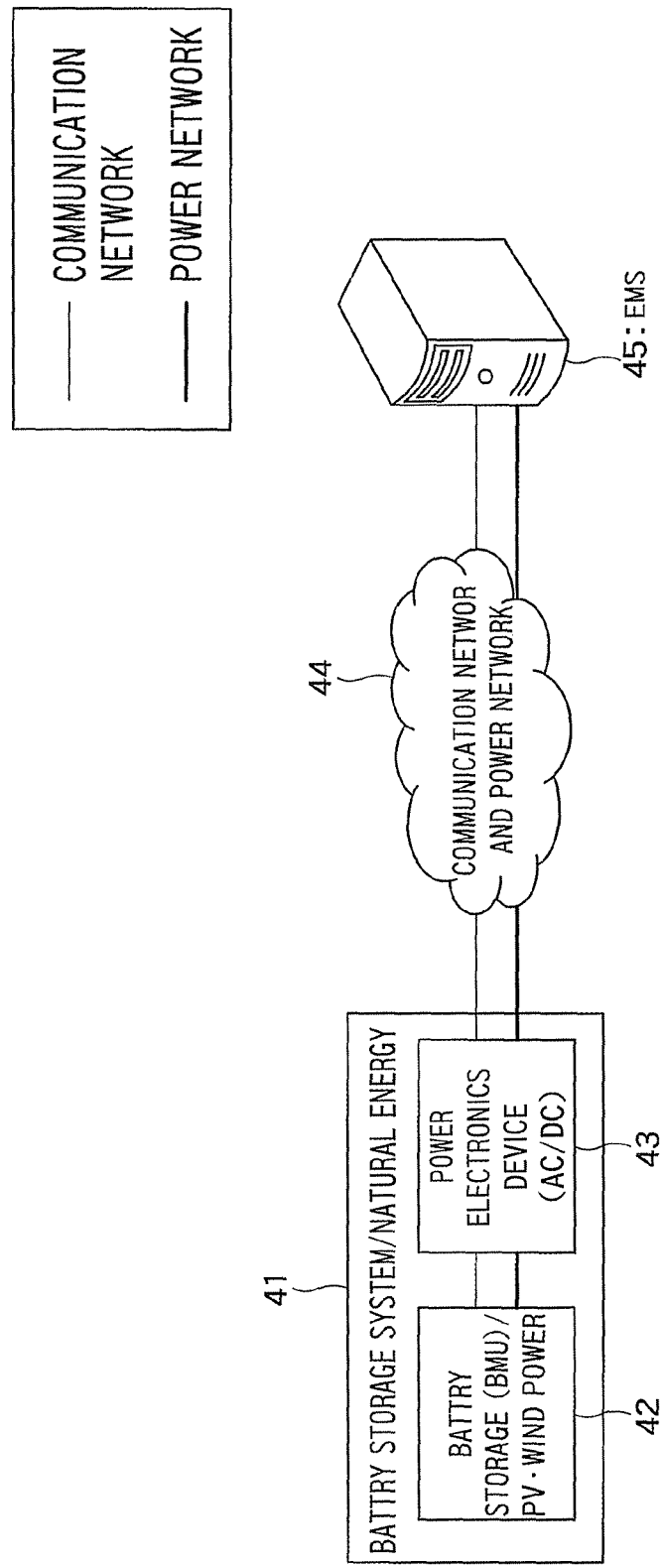
FIG. 2 is a system configuration view of a battery storage system or natural energy according to an embodiment of the present invention.
Figure 3:
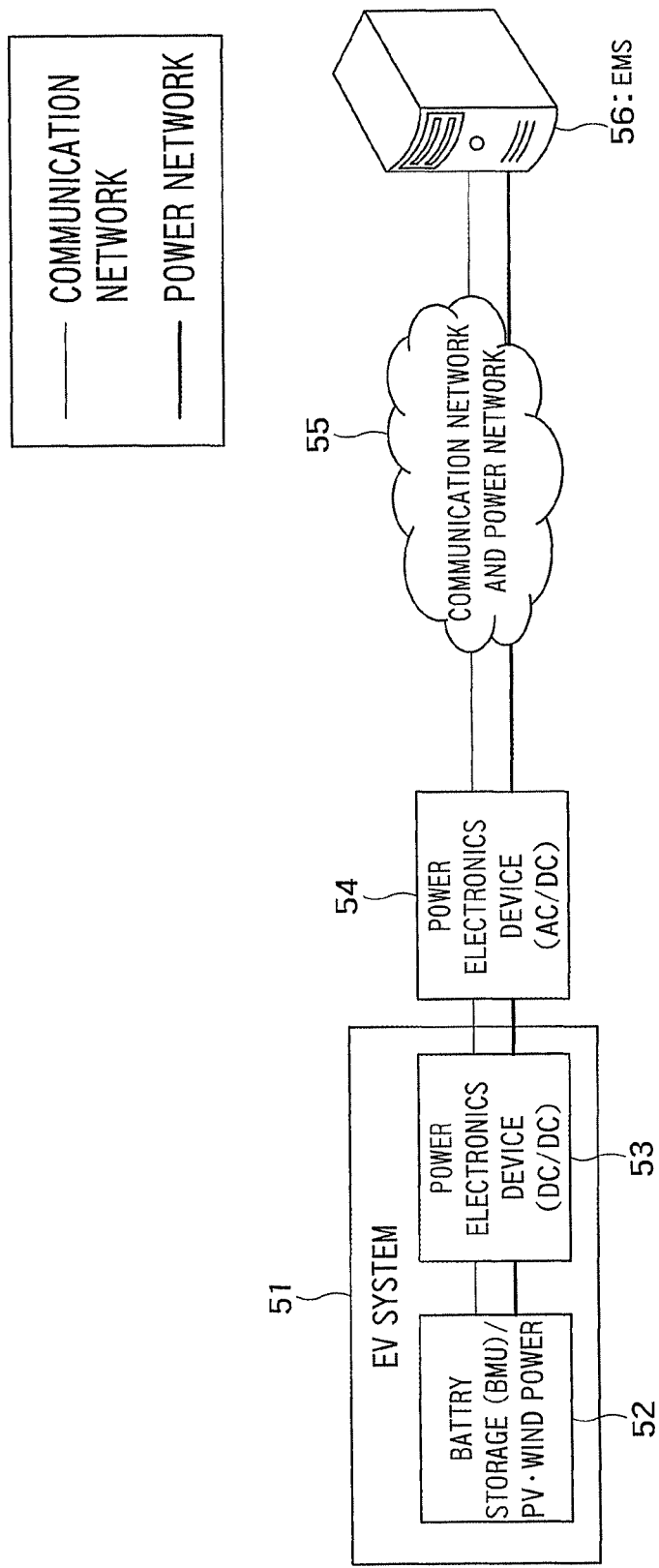
FIG. 3 is an EV system configuration view according to an embodiment of the present invention.

FIG. 2 and FIG. 3 illustrate basic system configurations of the power electronics device in FIG. 1 according to an embodiment of the present invention. These are details of the system configuration in FIG. 1. FIG. 2 presents a detailed configuration of the battery storage system and natural energy system, and FIG. 3 presents a derailed configuration of the EV system. There is a feature that the battery storage in the battery storage system performs both charging and discharging, and the power generating device (replaced with the battery storage in FIG. 2) of natural energy such as wind power and photovoltaic generation can implement only discharging.

The battery storage system/natural energy system in FIG. 2 is connected to an EMS 45 through a communication network and power network 44. The EMS 45 may be an EMS on the system side or an EMS on the customer side. The battery storage system/natural energy system is formed with a battery storage (BMU: Battery Management unit) 42 or a power generating device and a power electronics device 43. The power electronics device 43 is called "inverter," "converter" or "PCS (Power Conditioning System)" and therefore has a role to convert an input/output of power and adjust the voltage amount.

The battery storage (BMU) 42 includes multiple battery cells and an internal processor to manage the state inside a battery pack, and implements charge/discharge control of power based on a request from the power electronics device 43. The battery storage (BMU) 42 notifies information such as the rated voltage, the maximum current value at the time of discharge and charge, the SOC (State Of Charge) and the SOH (State Of Health) to the controlling unit.

In the example of FIG. 2, the power electronics device 43 exchanges direct-current power with the battery storage 42 and alternating-current power with the power system network 44. Although the power electronics device 43 performs direct-current/alternating-current conversion and voltage change suppression, it is considered that these functions are realized on a processor connected to the outside of the device.

Moreover, regarding the charge/discharge control and information notification between the battery storage (BMU) 42 and the power electronics device 43, in addition to a method of realizing them using a CAN (Controller Area Network), there is a possible method of realizing them using a wire communication medium such as Ethernet or a wireless communication medium such as a wireless LAN (Local Area Network), and, furthermore, an electrical signal line that is uniquely defined by a vendor who sells products. However, embodiments of the present invention are not limited to any communicating units.

The power electronics device 43 in the battery storage system in FIG. 2 has a communication function and communicates with each EMS 45 installed in the power system network or the customer's equipment. Generally, since a battery storage has a feature of self-discharge, by acquiring information such as SOC and SOH from the battery storage system, the EMS 45 can adequately monitor the state that changes over time and instruct charge/discharge control.

Figure 4:
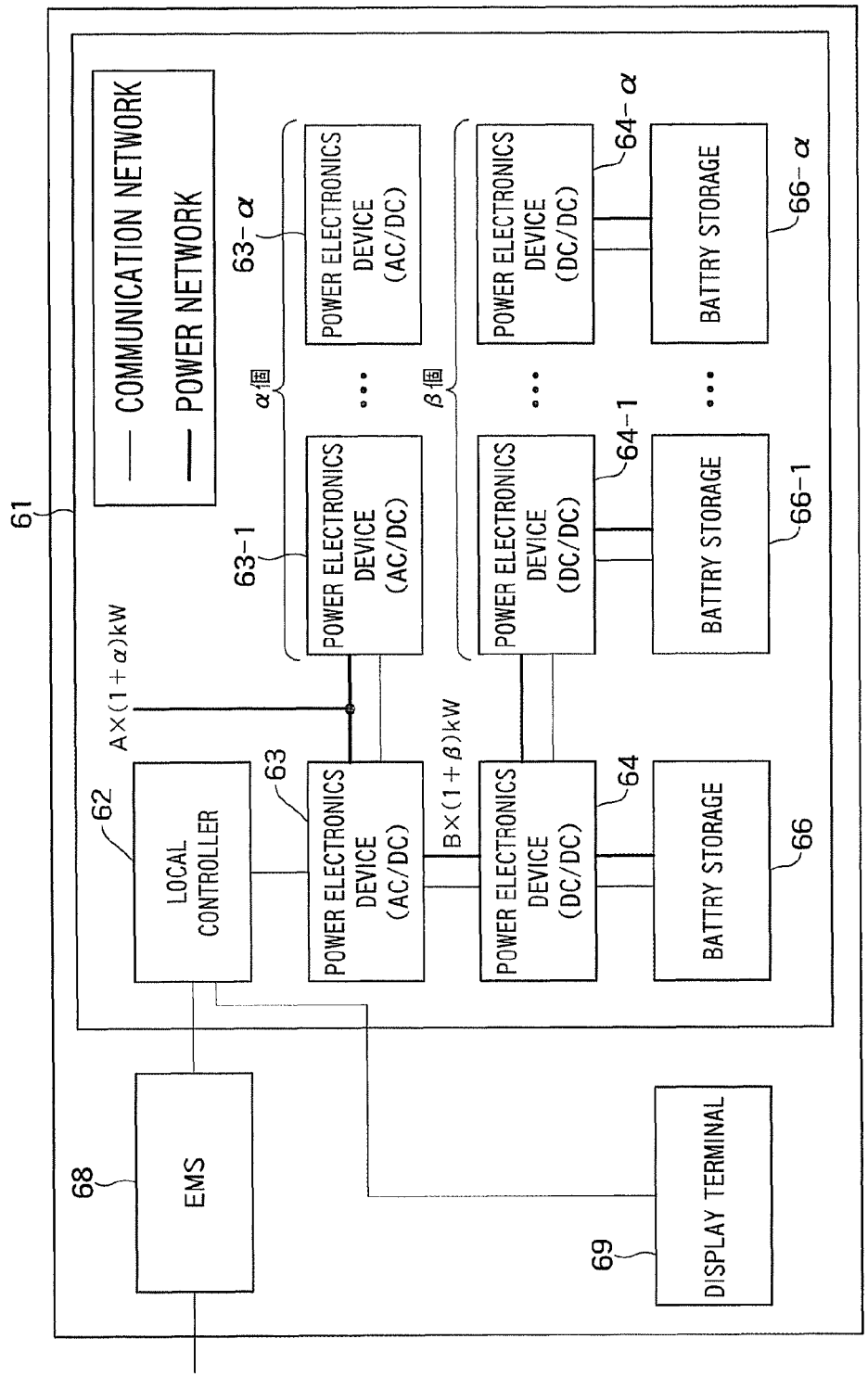
FIG. 4 is a system configuration view of multiple power electronics devices according to an embodiment of the present invention.

Here, an input/output of power through the power electronics device may be referred to as "discharge and charge." Moreover, in a case where a power generating device of natural energy such as wind power and photovoltaic generation is applied instead of the battery storage (BMU) 42, since the power electronics device basically performs only power output, in the use application in this case, the power output through the power electronics device may be referred to as "discharge." In a power system formed with multiple power electronics devices, although the power electronics devices play a role to switch the flow volume of input/output of power, this is described in detail in FIG. 4.

Although the EV system in FIG. 3 employs a configuration similar to the battery storage system/natural energy in FIG. 2, they are different in that a second power electronics device 54 operating as a battery charger exists in addition to a first power electronics device 53 that is connected to the battery storage 52 and operates. The EV system 51 is connected to each EMS 56 through a communication network and power network 55.

The first power electronics device 53 connected to the battery storage 52 in the EV system 51 in FIG. 3 relays power and communication information between the battery storage (BMU) 52 and the second power electronics device (i.e. battery charger) 54. In this case, the first power electronics device 53 does not necessarily have to have a communication capability to communicate with each EMS 56 on the power system network or in customer's equipment. That is, in the example of FIG. 3, there is a difference that an alternating-current/direct-current conversion function in the power electronics device in the battery storage system in FIG. 2 is shifted to the battery charger side corresponding to the second power electronics device 54. In the configuration in FIG. 3, the first power electronics device 53 implements direct-current/direct-current conversion and the second power electronics device 54 implements direct-current/alternating-current conversion.

However, a specific procedure to realize an embodiment of the present invention is common in both FIG. 2 and FIG. 3, and, furthermore, the role of the EV system can be defined to the same role as the battery storage system. Further, although there are multiple formats that: algorithm control related to discharge and charge with respect to the battery storage (BMU) 52 is integrated into the first power electronics device 53; the algorithm control is integrated into the second power electronics device (i.e. battery charger) 54; and the algorithm control is integrated into HEMS/BEMS in customer's equipment or EMS in the power system, the embodiment of the present invention can be realized in the same framework even if any format is used.

In addition to the examples of FIG. 2 and FIG. 3, the power electronics device according to the embodiment of the present invention can also be applied to a configuration in which multiple power electronics devices are combined as illustrated in FIG. 4. For example, in a case where multiple battery storages (and/or a power generating device of natural energy) are combined to form a logical set of power units, the set includes one or multiple local controllers, power electronics devices (AC/DC, DC/DC), and battery storages (and/or power generating device), and so on. In the example illustrated in the figure, a power system 61 serving as the set includes a local controller 62, power electronics devices (AC/DC or DC/DC) 70, 63 and 63-1 to 63-α, 64 and 64-1 to 64-α, and battery storages 66 and 66-1 to 66-α.

In this case, the space between an outside EMS 68 and the local controller 62 (the local controller itself can be omitted) corresponds to the example of FIG. 2 or FIG. 3, and it is possible to realize a power application such as control of effective power/reactive power. In addition to this, in a case where multiple power electronics devices perform an operation together, when multiple power electronics devices are driven in parallel, it is possible to intend the output increase of power.

In the example of FIG. 4, when it is assumed that the rating of the input/output power of each power electronics device (AC/DC) connected to the alternating current side is AkW (kilo watt), by driving 1+α items in parallel, it is possible to increase the output to A×(1+α) kW and realize a power application function called "phase synchronization of output power."

The phase synchronization of output power is realized by preventing an occurrence of cross current (e.g. reactive current caused by a difference of electromotive force, synchronization cross current caused by a phase difference of electromotive force and harmonic cross current caused by a waveform difference of electromotive force) in an output on the alternating-current side. To this end, however, there is a problem of failure to find correct synchronization unless a control subject to identify a synchronization source device of parallel driving is correctly decided (i.e. master-slave determination) between multiple power electronics devices operating in parallel.

To be more specific, there is a feature that, for example, in the case of connection to a large power signal such as the power system network, a power electronics device does not especially have to exchange information for synchronization via a communication network and gradually synchronizes with the power network signal by electrical characteristics. However, a problem in a case where the scale of input/output electric energy is substantially constant and multiple items operate at the same time as illustrated in FIG. 4 is that, unless information of a place for synchronization is exchanged via a communication network, a power input/output intended by the user of the power electronics device is not performed.

When three or more power electronics devices are connected, since it is difficult only by information on the power line to recognize individual actual values with respect to the planned values of respective devices, it is essential to synchronize with the master by the use of information on the communication line. Meanwhile, since the input and output power is direct current, a power electronics device (DC/DC) connected to the direct current side does not find synchronization like phase synchronization of output power. However, in a case where a power application function such as the power increase and the allocation of output/input power amount is realized by multiple devices, similar to phase synchronization of output power, the assigned amount is selected (e.g., a battery storage to be charged or discharged is selected) after a control subject is determined (i.e., master-slave determination). Also, by connecting a display terminal 69 to a power electronics device or a local controller through the communication network, it is possible to realize a power application for a data monitor, abnormal notification or parameter adjustment.

Also, as described above, on the power system network side, to respond to an instantaneous load change, each battery storage generally has a system corresponding to a function called "ancillary service." In this case, since it is necessary to secure a large storage capacity equal to a power plant, as illustrated in FIG. 4, it is effective to install a set of battery storage/natural energy power generating devices connected to a power electronics device.

Even on the customer side, it is a common practice to provide a function called "peak shift" to store nighttime power of a lower unit price to implement interchange in a time period in which the diurnal power use is peak. Under a condition to give a certain incentive to the customer side, it is an activation format that an electric power provider uses the battery storages installed on the customer side or power of natural energy.

Thus, depending on various utilization forms, since multiple control subjects and multiple controlled subjects may be provided, it is necessary to apply a master-slave determination procedure and avoid the conflict of supervisory control.

FIG. 5A, FIG. 5B, FIG. 5C and FIG. 5D present four kinds of power application functions focusing on the use of multiple power electronics devices in an embodiment of the present invention.

Figure 5A:
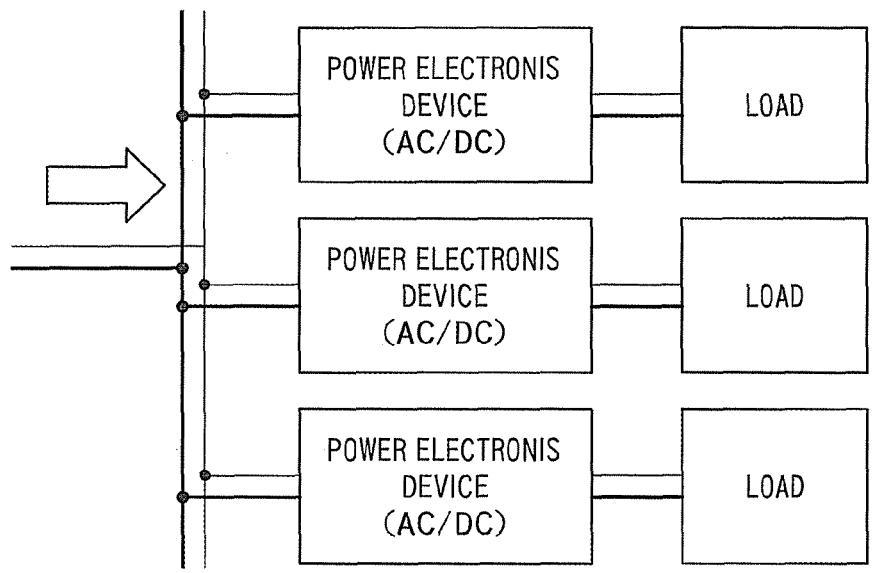
FIG. 5A is a system configuration view of multiple power electronics devices according to an embodiment of the present invention.
Figure 5B:
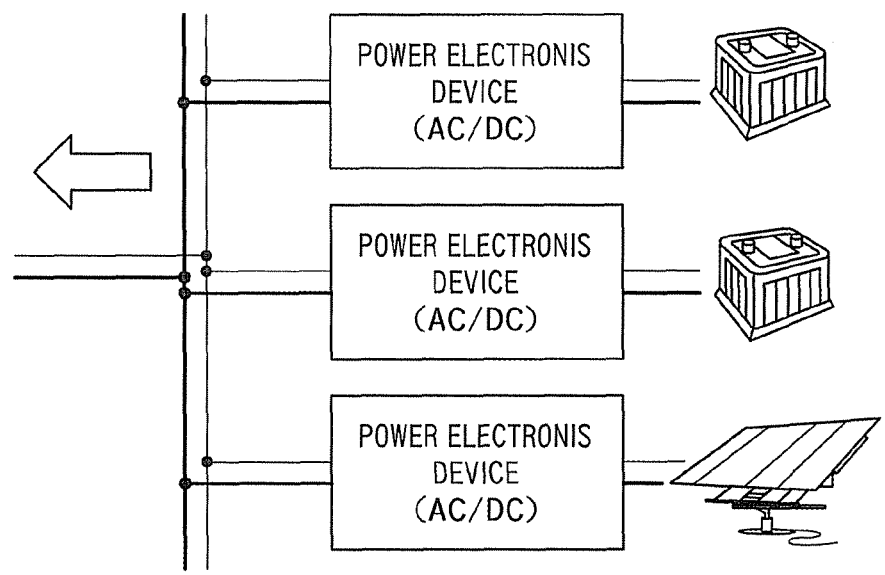
FIG. 5B is a system configuration view of multiple power electronics devices according to an embodiment of the present invention.
Figure 5C:
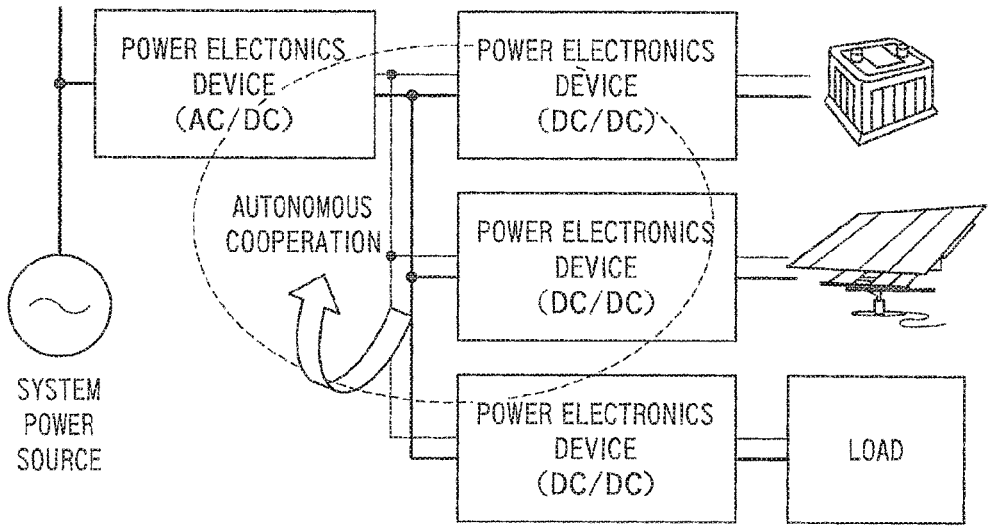
FIG. 5C is a system configuration view of multiple power electronics devices according to an embodiment of the present invention.
Figure 5D:
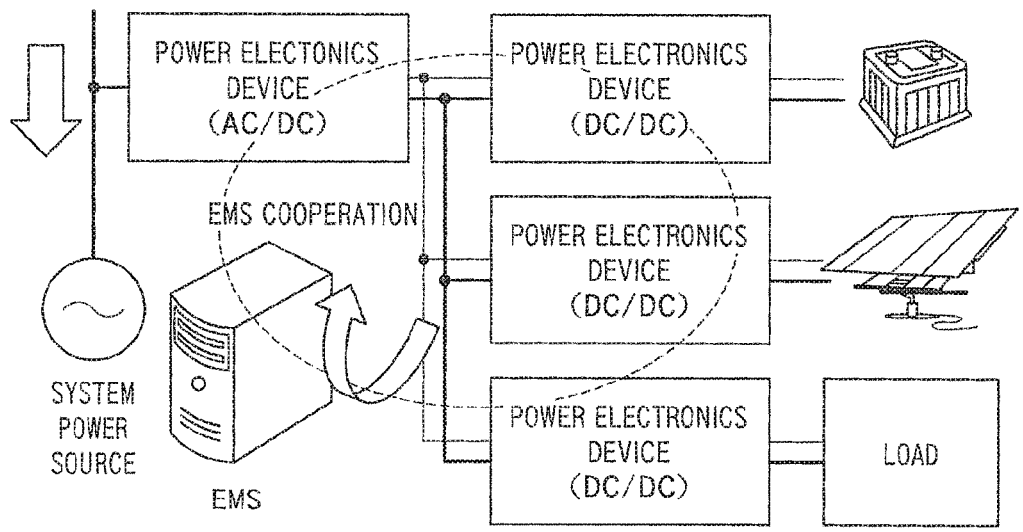
FIG. 5D is a system configuration view of multiple power electronics devices according to an embodiment of the present invention.

FIG. 5A, illustrates "autonomous cooperation: allocation of output/input power amount in the electrical power handling capability," FIG. 5B illustrates "autonomous cooperation: synchronization operation of multiple power sources (phase synchronization of output power)," FIG. 5C illustrates "autonomous cooperation: start from blackout" and FIG. 5D illustrates "EMS cooperation: supervisory control of effective power and reactive power." These are provided by revising the configuration view in FIG. 4 from a viewpoint of the application function and a viewpoint of the installation configuration.

The input allocation of output/input power amount illustrated in FIG. 5A is provided in a case where there is connection with the alternating current side and multiple power electronics devices (AC/DC) connected to the load input power, and the phase synchronization of output power illustrated in FIG. 5B is provided in a case where multiple power electronics devices (AC/DC) connected to the power source output power. Besides this, as presented in FIG. 4, in a case where multiple power electronics devices (DC/DC) which have connection with only the direct current side and which are connected to the power source output power, output allocation of output/input power amount is provided.

Meanwhile, a configuration is possible in which multiple power electronics devices are connected in a layered manner. There is a case where the exchange is performed between power electronics devices without using an EMS, and, as illustrated in FIG. 5D, there is a case where supervisory control of centralized control is performed using an EMS. In an embodiment of the present invention, a configuration without using an EMS like FIG. 5C is defined as autonomous-cooperation supervisory control.

Figure 6:
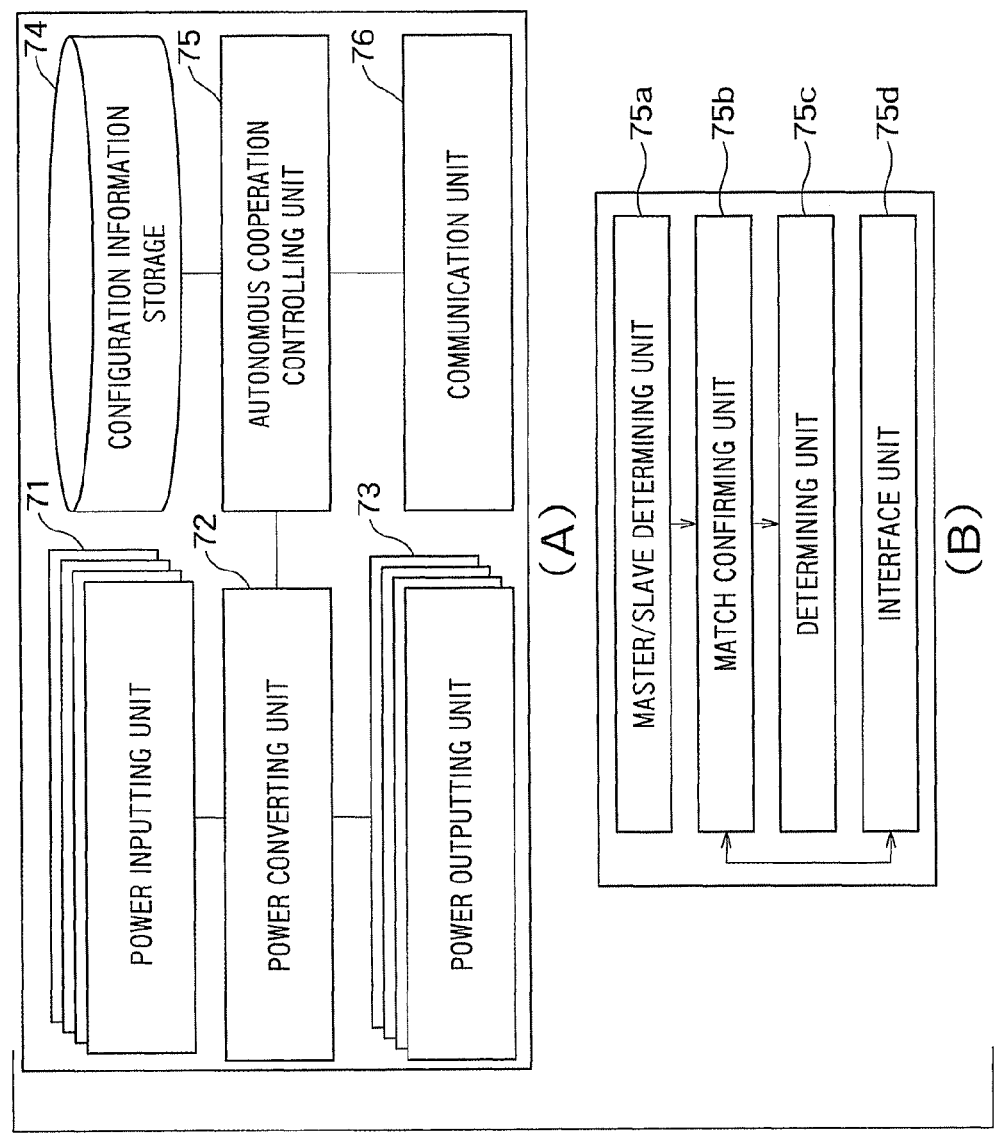
FIG. 6 is a configuration view of multiple power electronics devices according to an embodiment of the present invention.

FIG. 6(A) presents a configuration example of a power electronics device according to an embodiment of the present invention. As described above, the power electronics device corresponds to a power electronics device connected to the battery storage (BMU) or power generating device in the battery storage system/natural energy system in FIG. 2. Alternatively, it corresponds to the first power electronics device connected to the battery storage (BMU) in the EV system in FIG. 3 or the second power electronics device connected to a battery charger. Besides this, it similarly corresponds to each power electronics device in FIG. 4 and FIG. 5.

The power electronics device in FIG. 6(A) includes a power inputting unit 71, a power converting unit 72, a power outputting unit 73, a configuration information storage 74, an autonomous cooperation controlling unit 75 and a communicating unit 76. Part or all of the components of FIG. 6(A) are not limited to the application on the power electronics device, and can be similarly applied to an EMS or local controller and implemented.

Specifically, the power inputting unit 71, the power converting unit 72 and the power outputting unit 73 play roles of direct-current/alternating-current, direct-current/direct-current or alternating-current/alternating-current power conversion, frequency monitoring and adjustment of power and change detection and adjustment of voltage.

In addition to a configuration in which there are multiple power inputting units 71 and multiple power outputting units 73, a configuration is possible in which the number of each of them may be one. In actual implementation, there is a case where the power electronics device causes the power inputting unit 71 to input power from a battery storage (BMU) or power generating device of natural energy, and there is a case where the power electronics device causes the power inputting unit 71 to input power from a power system network. Moreover, the power input from the power inputting unit 71 is subjected to direct-current/alternating-current, direct-current/direct-current or alternating-current/alternating-current power conversion and is subsequently output from the power outputting unit 73, in which case, in addition to a configuration in which the power inputting unit 71 and the power outputting unit 73 are prepared as physically different power circuits, there is a configuration in which they are commonly prepared in physically the same circuit. Any configuration can be used.

In an embodiment of the present invention, the electric energy at the time of charge/discharge control of the battery storage (BMU) or power generating device is expressed as the electric energy expressed in Ah (Ampere hour), the electric energy expressed in Vh (Volt hour) or the instantaneous electric energy W in addition to the electric energy expressed in Wh (Watt hour).

The communicating unit 76 plays a role to generate supervisory control information after starting driving, in addition to characteristic information or configuration information stored in the configuration information storage 74 described later, as a communication message, and perform transmission and reception through an EMS, a local controller, another power electronics device and a communication network. In addition to a case where the communicating unit 76 performs processing of transmitting/receiving a communication message, there is a case where it has a first communicating unit and a second communicating unit as multiple communication media.

For example, it is considered that the first communicating unit is realized by a wireless communication medium such as IEEE802.11 wireless LAN in addition to a wire communication medium such as an optical fiber, telephone line and Ethernet, and the second communicating unit is realized with Ethernet or CAN. The communication medium in the embodiments does not depend on a specific communication medium.

The power electronics device acquires a communication message from the EMS, the local controller and other power electronics devices through the first communicating unit. Meanwhile, the second communicating unit acquires unique information (such as rated capacity, charge/discharge start/end voltage, upper limit temperature, lower limit temperature, maximum charge/discharge current and rated voltage) of the battery storage (BMU) or natural energy generator connected to the power electronics device, and further acquires measurement information or setting information during operation.

In a case where the battery storage (BMU) is connected to the power electronics device, measurement information (such as SOC, SOH, charge/discharge current and charge/discharge voltage) which is variation information at the time of an operation of the battery storage (BMU) is periodically acquired. As described above, the second communicating unit can be realized by a wire communication medium such as Ethernet and CAN or an electrical signal line uniquely defined by a vendor, but the embodiment of the present invention does not depend on a specific medium.

Also, in a case where the battery storage is connected to the power electronics device, since an internal battery cell generally has a feature of self-discharge, at the time of transmitting information such as SOC and SOH to the EMS, the local controller or other power electronics devices, it is not necessarily completed by only one transmission, and, similar to information of voltage or current, it is desirable to adequately notify it taking into account a feature that the value changes over time.

Also, it is needless to say that the power electronics device operating as an inverter in the embodiment of the present invention is not limited to be connected to the battery storage (BMU), but it can be applied to photovoltaic generation and wind power generation or various EMS's and local controllers that communicate with them, and is not restricted by a specific device.

The configuration information storage 74 stores "characteristic information" to determine a master and slave, and "configuration information" to express the master-slave relationship decided between devices. The information stored in the storage is not limited to these two kinds. By transmitting and receiving the information of the configuration information storage 74 by the above-mentioned communicating unit 76, it is possible to automatically change a logical configuration between multiple devices at the time of initial installment of the power electronics devices or the time of anomalous occurrence after starting an operation, and increase the throughput of power input/output while securing the operation flexibility.

As presented in FIG. 7, the characteristic information is formed with information on "device ID (Identifier)," "device type," "communication connection," "power connection" and "master/slave." The "device ID" denotes an individual identification number (e.g., production number). The "device type" expresses a role in the system, which includes an EMS, a local controller and a power electronics device. To be more specific, it is classified into EMS, INV(AC/DC), INV(DC/DC), INV(DC/DC): power source (i.e., battery storage), INV(DC/DC): power source (PV) and INV(DC/DC): load.

INV (AC/DC) is synonymous with a power electronics device that performs conversion between the alternating current and the direct current, that is, a power electronics device (AC/DC).

INV(DC/DC) is synonymous with a power electronics device that performs conversion between direct currents, that is, a power electronics device (DC/DC).

INV(DC/DC): power source is synonymous with a power electronics device (DC/DC) connected to the power source. INV(DC/DC): power source is further classified depending on whether to connect to the battery storage (BMU) or connect to a power generating device of natural energy such as solar light. INV(DC/DC): power source (battery storage) is synonymous with INV(DC/DC) connected to the battery storage (BMU). INV(DC/DC): power source (PV) is synonymous with INV(DC/DC) connected to the power generating device of natural energy.

INV(DC/DC): load is synonymous with a power electronics device (DC/DC) connected to the load.

Although it is considered that such information is acquired using a communicating unit such as Ethernet and CAN when the power source or the load is connected to the power electronics device, a format is also considered in which it is fixedly set.

The "communication connection" denotes information of a power electronics devices (group) on the same communication broadcast domain and the "power connection" denotes information of a power electronics devices (group) on the same bus line.

The "master/slave" denotes identification information of a master (i.e., device of a control subject) and a slave (i.e., device of a controlled subject).

Here, regarding the setting of information on "power connection," there are several following possibilities.

"manual input and confirmation by the use of a display terminal by a worker"

"first automatic recognition method (after output of a specific power signal is notified by communication, behavior on the power line is checked) between power electronics device"

"second automatic recognition method (output of a specific power signal is notified by communication after behavior on the power line is checked) between power electronics device"

"medium between automatic recognition and manual input (for example, a power electronics device shifted to a specific operation state by an operation from the worker in the same time interval is recognized that it is located on the same bus line)." The embodiment of the present invention is not influenced by a specific unit.

When the automaticity of detection of power connection information is described in more detail, it denotes the standard as to how it can be realized without worker's hands at the time of checking connection relationships in the power aspect and the communication aspect.

The above-mentioned "manual input and confirmation by the use of a display terminal by a worker" assumes a format in which a worker confirms individual connection relationships and performs an input in power electronics devices by the use of visual observation or blueprint individually.

The "first automatic recognition method between power electronics device" denotes a format in which, for example, a pulse such as voltage is applied to a power bus line from the one side and detected from the other side, detected information is mutually exchanged using a communication network, and, in a case where it is decided to be within a range of a predetermined error, the power connection is decided.

In contrast with the "first automatic recognition method between power electronics device," the "second automatic recognition method between power electronics devices" does not confirm behavior on the power line after performing notification in communication but performs notification in communication after confirming behavior on the power line. In these two kinds of automatic recognition methods between power electronics devices, it is possible to adopt a method of automatically detecting a system configuration unique to the energy/industry field using power line communication of a few bits and wire/wireless communication of many bits. As for behavior on the power line, in addition to a method of confirmation using a weak inspection signal, there is a possible method of confirmation using actually constant voltage or frequency. By using these methods, it is possible to detect the interruption of communication or power at not only the time of initial installation but also the time of normal operation after a master and a slave are determined. Next, the configuration information stored in the configuration information storage 74 is described. The configuration information denotes information on a master device and slave device for the power electronics devices. As presented in FIG. 8, the configuration information is formed with "device ID," "device type," "communication connection," "power connection" and "master/slave."

These items of information are synonymous with information forming the above-mentioned characteristic information. For example, a power electronics device with a device ID of 1 denotes a power electronics device (INV (AC/DC)) to perform power conversion between the alternating current and the direct current, can perform communication with power electronics devices 2, 3 and 4 and are connected to the same power line as the power electronics devices 2, 3 and 4, where the power electronics devices 2, 3 and 4, are slaves of the power electronics device 1 (i.e., the power electronics device 1 is a master).

Each power electronics device makes a master-slave determination in the autonomous cooperation controlling unit 75 based on the content of the characteristic information and updates the content of the configuration information. Every time the content of the configuration information is updated according to the master-slave determination, the sequence number of the configuration information is updated.

FIG. 6(B) illustrates a configuration view of parts related to the master-slave determination in the autonomous cooperation controlling unit 75. The master/slave determining unit 75a determines a master device and a slave device on the basis of power characteristic information of another power electronics device connected through a power line (for example, connected to the same power line).

A match confirming unit 75b confirms whether the master and slave devices determined by the master/slave determining unit 75a and the master and slave devices determined by another power electronics device are matched. An arbitrary method can be used as the confirmation method.

For example, power electronics devices transmit their own configuration information to worker's management unit, and the worker confirms the content of the configuration information collected from each power electronics device by a displaying unit of the management unit. Alternatively, the power electronics devices may be caused to include a displaying unit and display the configuration information on the displaying unit. In this case, the clerk in charge checks each power electronics device and confirms the configuration information. The displaying unit or the communicating unit corresponds to an outputting unit that outputs the configuration information to the outside. When the matching is confirmed, acknowledgement is sent to each power electronics device. By receiving this acknowledgement, each power electronics device decides the matching. Here, the power electronics device may be provided with an inputting unit and the worker may input acknowledgement from this inputting unit. An interface unit 75d denotes the above-mentioned displaying unit or inputting unit. Since the interface unit 75d is not essential, it may be omitted from the configuration if unnecessary.

Alternatively, as another confirmation method, the match confirming unit 75b performs an operation sequence to automatically confirm whether the decision contents in power electronics devices are matched, on the basis of its own configuration information and configuration information showing the master and slave devices determined in another power electronic device. In a case where it is decided that they are not matched, the processing in the master/slave determining unit 75a is performed again or configuration information is sequentially acquired from another power electronics device through the communicating unit 76 after a fixed time again, so as to match information between multiple devices existing in the system.

When the match confirming unit 75b decides that they are matched, a determining unit 75c allows the operation start of monitoring and control with respect to input/output of power to a power line with another power electronics device. By this, the power electronics device shifts to a normal operation and performs an operation in cooperation with another power electronics device under the control of the autonomous cooperation controlling unit 75.

A decision method of a master-slave relationship is described in detail. In the present embodiment, the master-slave relationship is decided on the basis of priority.

Regarding the specific master-slave determination priority, the device types in characteristic information are compared between two devices and the decision criteria are weighted such that the priority is higher in order from EMS>>INV(AC/DC)>>INV(DC/DC): power source (battery storage)>>INV(DC/DC): power source (PV)>>INV (DC/DC): load.

At the time of activation first, each power electronics device understands its own system type (for example, its own system type is decided from information on the power source and load connected to the power electronics device), and reflects it to the master-slave determination priority. In a case where the characteristic information is matched, for example, it is considered that a device with a larger sequence number of configuration information is determined as a master. This intends the stabilization of the system by suppressing the variation in the master-slave relationship as much as possible.

Moreover, in a case where the above-mentioned priority is not applied, the master and the slave are determined on the basis of standards such as "device activated earlier,", "device activated later," "pre-configuration" and "random."

Since an EMS is realized by a calculator to which advanced algorithm processing is generally applicable, in a case where there is the EMS in the system, it is preferable to select the device as a master from the viewpoint of performance. A local controller is classified into the EMS.

As illustrated in FIG. 5C and FIG. 5D, since a power electronics device (AC/DC) is provided at a high level on the system configuration, taking into account the cooperation between the power system network and the EMS, it is preferable to select it from the viewpoint of efficiency.

Regarding a power electronics device (DC/DC), there are multiple connection targets such as a power source (battery storage), a power source (PV) and a load, but, taking into account a device with the highest probability that it operates at the time of anomalous occurrence, it is preferable to select the power source (battery storage) that can store power required for operation before the anomalous occurrence, from the viewpoint of controllability.

Here, in power electronics devices, it may be considered that physical device components are divided for each power conversion function or the functions are shared. For example, in a case where the power conversion functions coexists in the power electronics device, the power electronics device can perform both alternating-current/direct-current (AC/DC) conversion processing and direct-current/direct-current (DC/DC) conversion processing. At this time, as for expression of power characteristic information, in addition to a method of describing all possible power conversion functions, there is a possible method of using a role in the system that is actually operated.

For example, even if the power electronics device can perform both the alternating-current/direct-current (AC/DC) conversion processing and the direct-current/direct-current (DC/DC) conversion processing, in a case where it is detected that it is connected on the alternating-current power line in an actual system, it serves as a power electronics device (AC/DC).

To be more specific, there is a possible method of deciding the device type as the power electronics device (AC/DC) or the power electronics device (DC/DC) by considering the role of input/output of power as when connected to the power line. In a case where there are at least one connection with the alternating-current bus line and at least one connection with the direct-current bus line, the device type of the power electronics device may be decided to be alternating-current/direct-current (AC/DC). In a case where there is connection with any one kind of bus line, it decides to be alternating-current/alternating-current (AC/AC) or /direct-current/direct-current (DC/DC).

Also, in addition to operation at the time of initial installation or anomalous occurrence such as master-slave determination, the autonomous cooperation controlling unit 75 of the power electronics device can process real-time supervisory control information and non-real-time supervisory control information required for a power application function at the time of normal operation.

For example, in the case of a phase synchronization of output power function, the real-time supervisory control information processes information for time synchronization in addition to an instruction value and actual measurement value of voltage and frequency. Meanwhile, the non-real-time supervisory control information includes operation plan information.

The operation plan information denotes plan information based on demands from the battery storage (BMU), power generating device of natural energy and power system network connected to the power electronics device, and can be expressed in a format in which "the horizontal axis indicates the time and the vertical axis indicates the electric energy." To form this information, as an example, there is a method of using information unique to charge/discharge control of the battery storage (BMU) or the power generating device of natural energy. For example, in the case of the battery storage (BMU), there are generally concepts of rated charge/discharge power expressed in W (Watt), rated capacity expressed in Wh (Watt hour), SOC (State Of Charge) expressed in percentage and dischargeable time and chargeable time associated with the SOC.

In the constant-current charge method in which is a general charge method of the battery storage (BMU), the electric energy (or current amount) input/output by the battery cell in the battery storage (BMU) remains in a constant state until the SOC expressed in percentage reaches a predetermined threshold. In view of this, by acquiring a value of the SOC from the battery storage (BMU), it is possible to calculate the chargeable time and dischargeable time, the maximum charge/discharge power and the electric energy required for discharge and charge (i.e. product of the dischargeable and chargeable time and the power), which are associated with that information. In the constant current charge, since there is a characteristic that the current amount required for charge is minimized after the SOC exceeds the predetermined threshold, it is possible to calculate an approximation of information required for a charge/discharge plan.

Also, as the electric energy at the time of charge/discharge control, it is possible to use the current amount expressed in Ah (Ampere hour) and the voltage amount expressed in Vh (Volt hour) in addition to the electric energy expressed in Wh (Watt hour).

Also, since it is not possible to store (charge) power in the case of a power generating device of natural energy such as photovoltaic generation and wind power generation, there is no concept of the SOC and it operates as a dedicated device for discharge. By contrast, in a case where a device connected to a power electronics device is an accumulator, since it is not possible to discharge power, it is controlled as a dedicated device for charge.

Based on these items of information, the operation plan of the power electronics device is made to implement specific charge/discharge operation with respect to the power source (or load) connected to the device.

At the time of preventing the instantaneous interruption of power supply in the power system network, it is desirable that real-time operation to adequately transmit and receive communication message is performed. Meanwhile, at the time of control at relatively gradual time intervals in the nighttime period, it is desirable to perform non-real-time operation in which the operation timing intervals are set. The embodiment of the present invention does not depend on specific activation operation such as real time and non-real time.

Figure 9A:
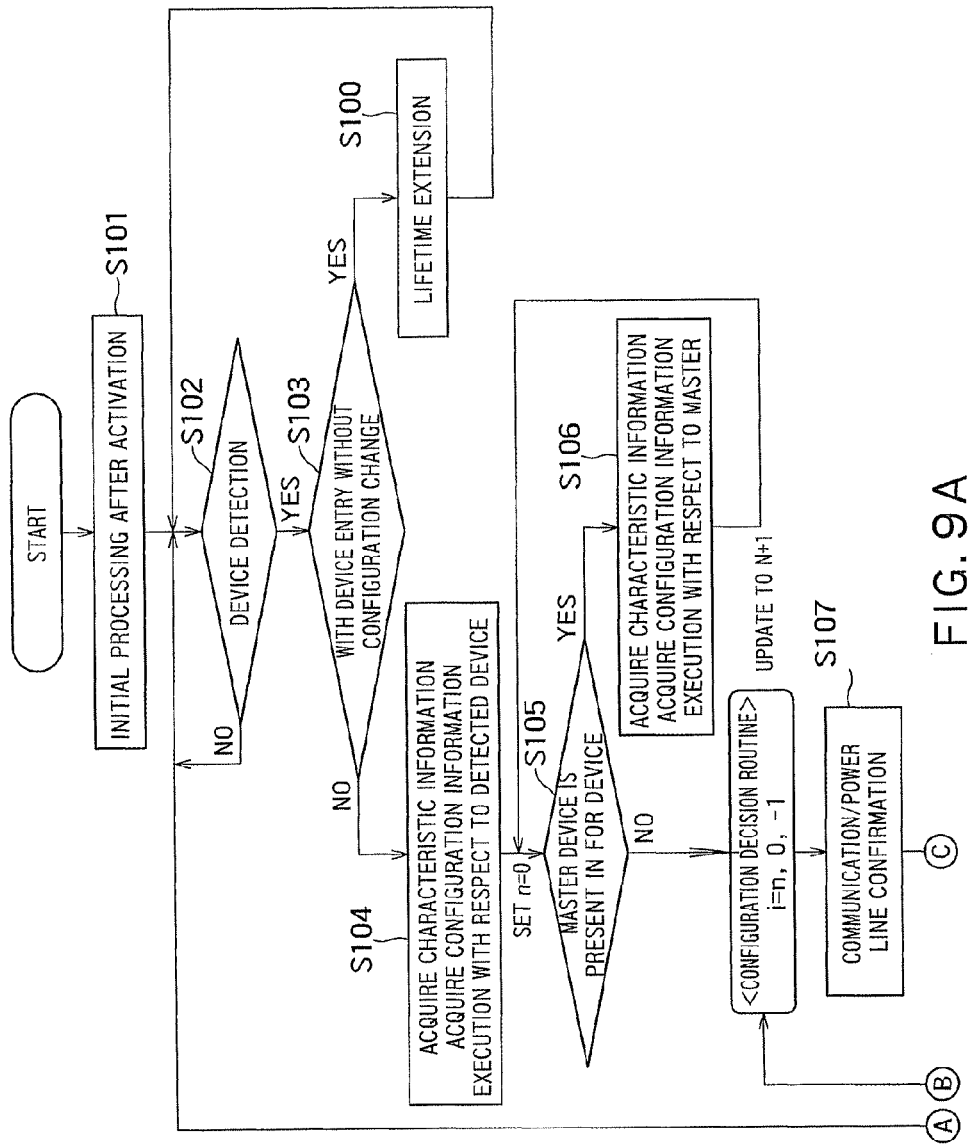
FIG. 9A is an operation flowchart view of a power electronics device according to an embodiment of the present invention.
Figure 9B:
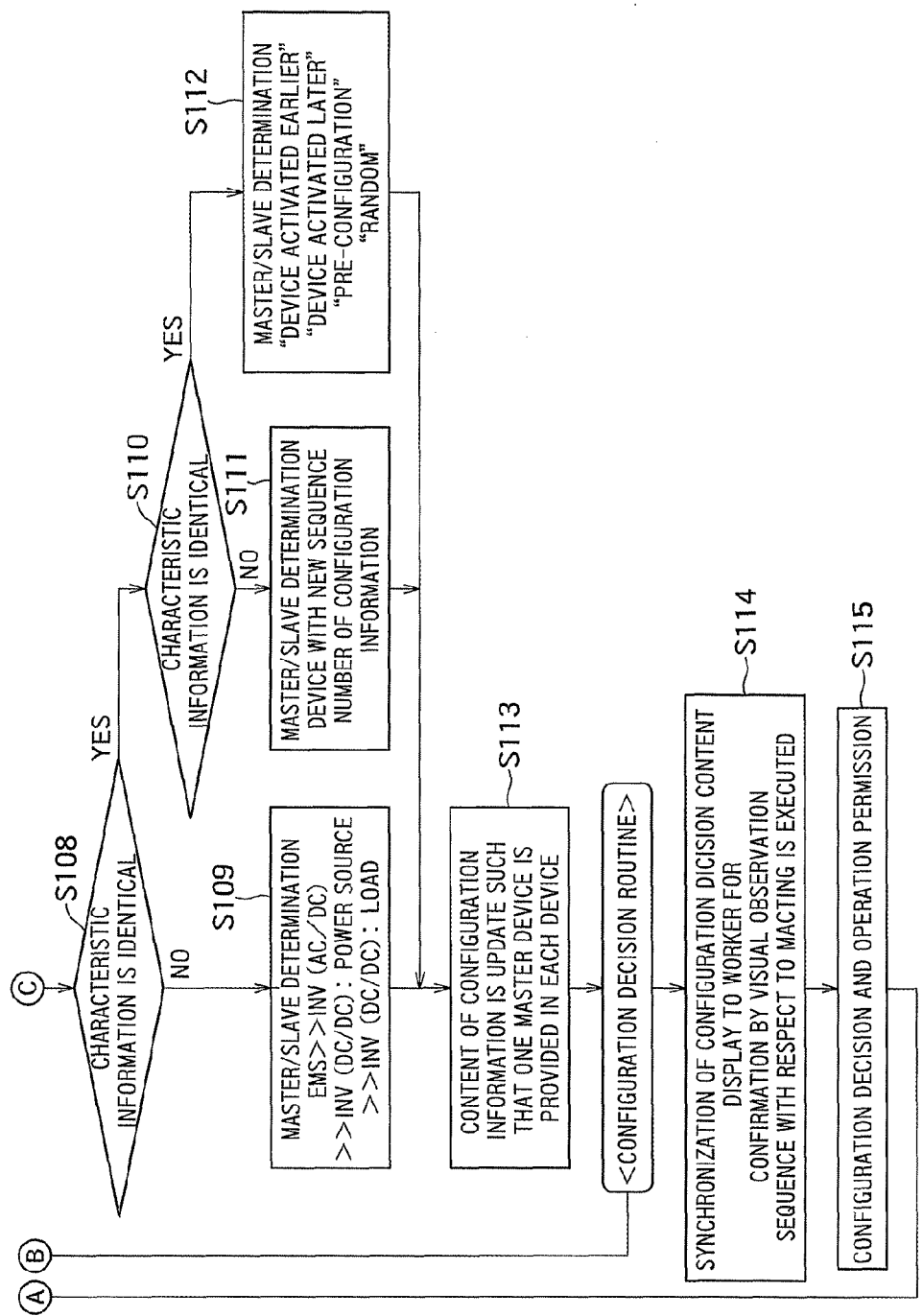
FIG. 9B is a flowchart diagram following FIG. 9A.

FIG. 9A and FIG. 9B present an operation flowchart of a power electronics device according to an embodiment of the present invention. Although the flow of operation process includes the initial installment, normal operation and anomalous occurrence, the flowchart of the figures targets other cases than the normal operation, that is, the configuration detection and configuration decision at the time of initial installment. Although it is almost the same at the time of anomalous occurrence, this is described later in detail.

In step S101, at the time of initial installment (initial processing after activation), a power electric device acquires its own characteristic information and decides which of EMS, INV(AC/DC) and INV(DC/DC) it is. Characteristic information of a device such as a power source and load directly connected to the power electronics device is acquired to further decide which of INV: power source (battery storage), INV: power source (PV) and INV: load the device is.

When the device on the same power line is found, characteristic information and configuration information are acquired from other devices via a communication network (S102, S103 and S104). In a case where all devices have been found and the characteristic information and the configuration information have been acquired (YES in S103, S104), it waits for a fixed time (i.e., the lifetime is extended) and returns to step S102 (S100).

Master/slave information is checked from the configuration information acquired in step S104, and, in a case where there is a master for the other-party device (YES in S105), the characteristic information and the configuration information are acquired from the master (S106).

These steps S105 and S106 are described in more detail. In a case where the power electronics device acquires the characteristic information and the configuration information from other devices, there is a case where the other-party device has already made a master-slave determination with other devices. In this case, it further tries to acquire information on the master device described in the configuration information of the device. By this, in a system in which multiple power electronics devices are installed, it is possible to avoid the overlap of master devices and prevent collision of control at the time of realizing an autonomous-cooperation power application function such as the phase synchronization of output power and allocation of output/input power amount.

After a series of acquisition processing of the characteristic information and configuration information is completed, it shifts to a configuration decision routine for master-slave determination on the basis of the acquired characteristic information and configuration information of multiple devices, but, before that, connection in the communication aspect and connection in the power aspect are verified between devices to be decided. For example, if there is connection in at least the same power line, master-slave determination processing is performed between individual devices.

As described above, although the power electronics device according to an embodiment of the present invention is realized by combining different power applications (e.g. phase synchronization of output power and allocation of output/input power amount) in multiple devices depending on the intended purpose, there is a case where the connection relationship in the communication aspect and the connection relationship in the power aspect do not have a one-to-one correspondence with each other depending on the system installment format.

For example, a set of multiple power electronics devices is defined as S and subsets of S are defined as S1 and S2 (S1∪S2=S, S1∩S2=0). It is assumed that a power electronics device of Si (i=1, 2) is connected to power network Pi and communication network Ci. As a result, since there are totally four kinds of connection relationships in the communication and power aspects, it is preferable to decide whether to start master-slave determination processing according to each state.

For example, when there is communication connection in the communication aspect and there is no connection on the power aspect, since two power electronics devices are not connected to the same power bus line, it can say that synchronous processing for allocation of output/input power amount and phase synchronization of output power are not necessary. That is, it can say that the master-slave relationship between these two power electronics devices is not necessary.

After confirming the connection, each power electronics device makes a master-slave determination in the autonomous cooperation controlling unit 75 on the basis of the content of the characteristic information and updates the content of the configuration information. Its details are as follows.

In the master-slave determination processing, comparison by the characteristic information and comparison by the configuration information are performed. Regarding specific master-slave determination priority, the device types in the characteristic information are compared between two devices in a looped manner. If the characteristic information is not identical (NO in S108), the above-mentioned priority is applied the decision criteria are weighted in order of EMS>>INV(AC/DC)>>INV(DC/DC): power source (battery storage)>>INV(DC/DC): power source (PV)>>INV (DC/DC): load (S109). It is assumed that, at the time of initial activation, each device understands its own system type (for example, understands it from information on the power source and load connected to the power electronics device) and reflects it to the master-slave determination priority in advance.

Since an EMS is realized by a calculator to which advanced algorithm processing is generally applicable, in a case where there is the EMS in the system, it is preferable to select the device as a master from the viewpoint of performance. A local controller is classified into the EMS. As illustrated in FIG. 5, since a power electronics device (AC/DC) is provided at a high level on the system configuration, taking into account the cooperation between the power system network and the EMS, it is preferable to select it from the viewpoint of efficiency. Regarding a power electronics device (DC/DC), there are multiple items such as a power source (battery storage), a power source (PV) and a load, but, taking into account a device with the highest probability that it operates at the time of anomalous occurrence, it is preferable to select the power source (battery storage) that can store power required for operation before the anomalous occurrence, from the viewpoint of controllability.

If the characteristic information is identical and the configuration information is not identical (YES in S108 and NO in S110), for example, it is considered that a device with a large sequence number of the configuration information is determined as a master (S111). If both the characteristic information and the configuration information are identical (YES in S108 and YES in S110), the master and the slave are determined on the basis of methods such as "device activated earlier,", "device activated later," "pre-configuration" and "random" (S112).

After that, if there are a plurality of master devices, the content of the configuration information is updated so as to the number of master devices is one (S113). Moreover, the sequence number is updated in this step.

Next, when the above-mentioned processing is completed for individual devices of decision targets, next, in step S114, whether the content of the configuration information in each device connected to the same power bus line is synchronized, that is, whether the master-slave devices are matched between devices is confirmed (S114). Regarding the confirmation method, as described above, a worker may check the configuration information registered in each device and confirm whether they are synchronized, or, in a predetermined operation sequence, each device may confirm whether the content of the configuration information collected from other devices and the content of its own configuration information are matched.

If the matching of the content of the configuration information can be confirmed in each device, the master-slave configuration is fixed by this content and each device decides operation permission. Each device having decided the operation permission performs cooperation (S115). That is, if an autonomous-cooperation power application function is executed in a state during master/slave configuration decision, there is a possibility that the collision of control is caused. Therefore, it is preferable to display the configuration decision content to the worker so as to confirm it by visual observation or execute an operation sequence whether they are matched.

FIG. 10A, FIG. 10B, FIG. 10C and FIG. 10D present a master-slave configuration decision example in a system in which multiple power electronics devices are installed. Regarding the order of master-slave determination, since the master-slave determination is made in a case where other devices are found on the communication network or power network, it is not always necessary to provide the same order.

The example in the figures illustrates a state where a configuration decision is made four times until master-slave configuration information is matched between all of four power electronics devices.

Figure 10A:
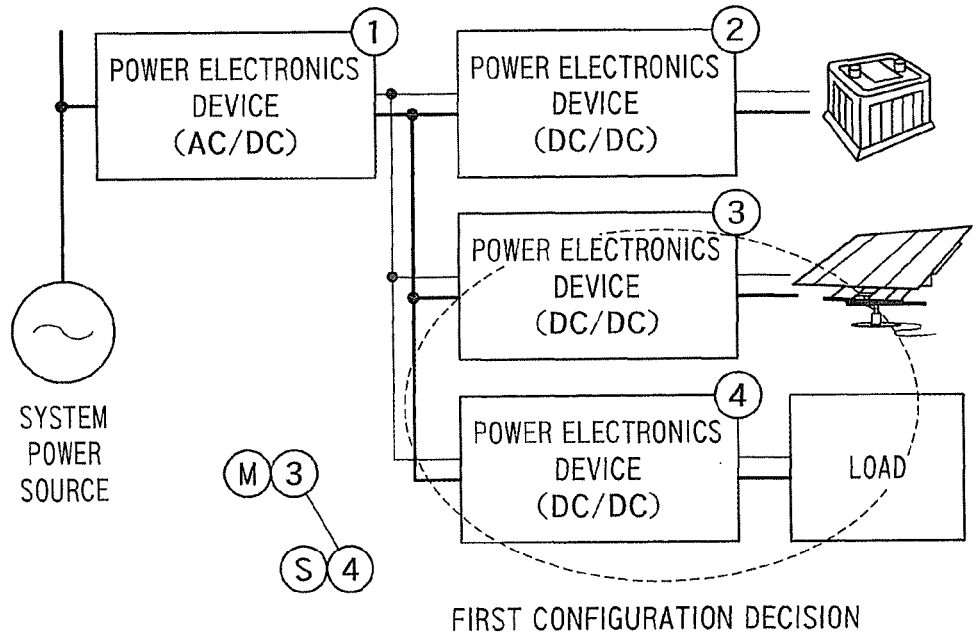
FIG. 10A is a view illustrating a configuration decision example of multiple power electronics devices according to an embodiment of the present invention.
Figure 10B:
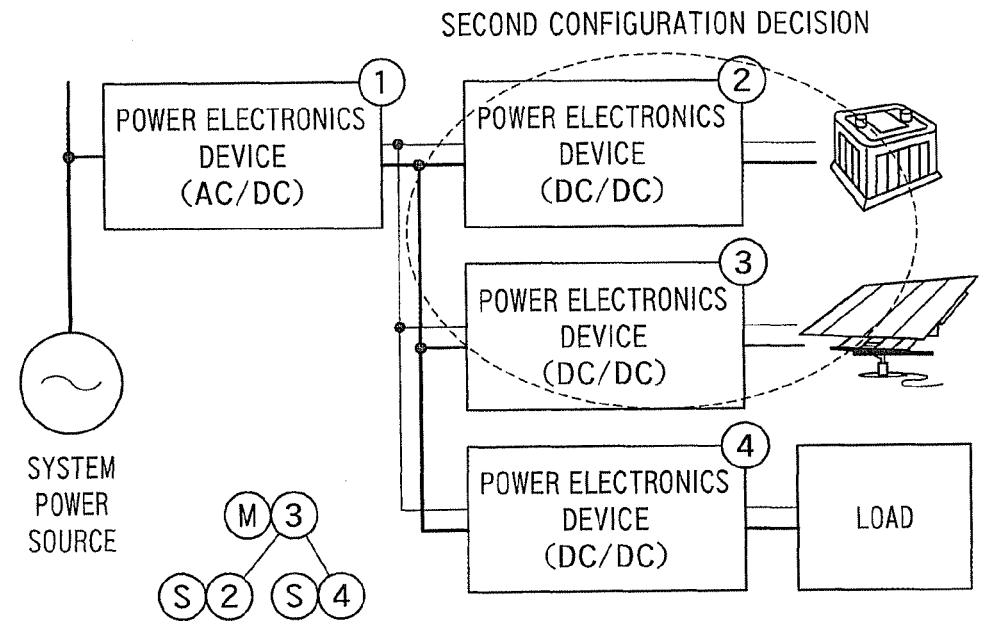
FIG. 10B is a view illustrating a configuration decision example of multiple power electronics devices according to an embodiment of the present invention.
Figure 10C:
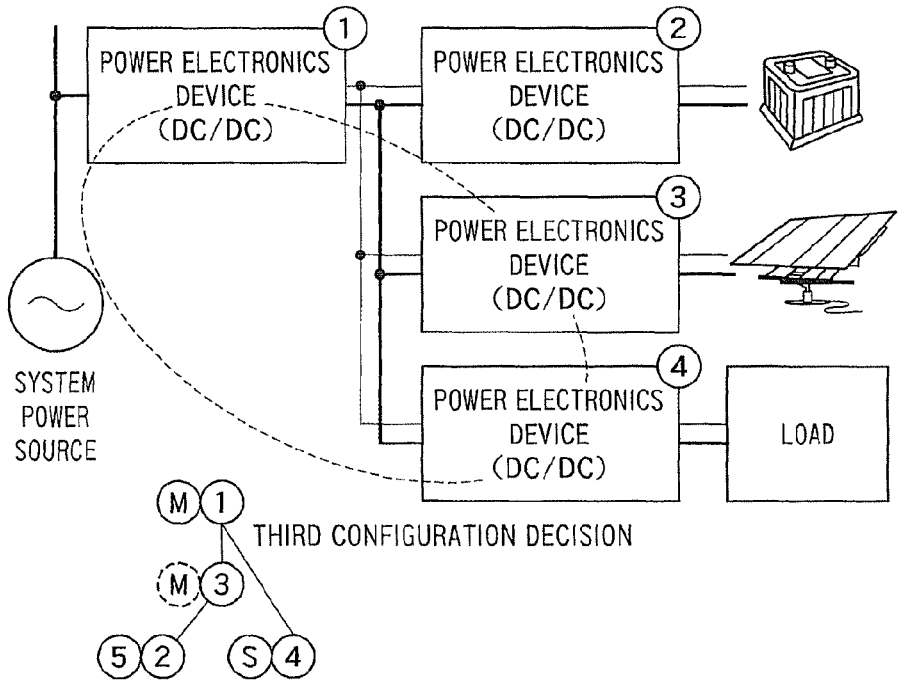
FIG. 10C is a view illustrating a configuration decision example of multiple power electronics devices according to an embodiment of the present invention.
Figure 10D:
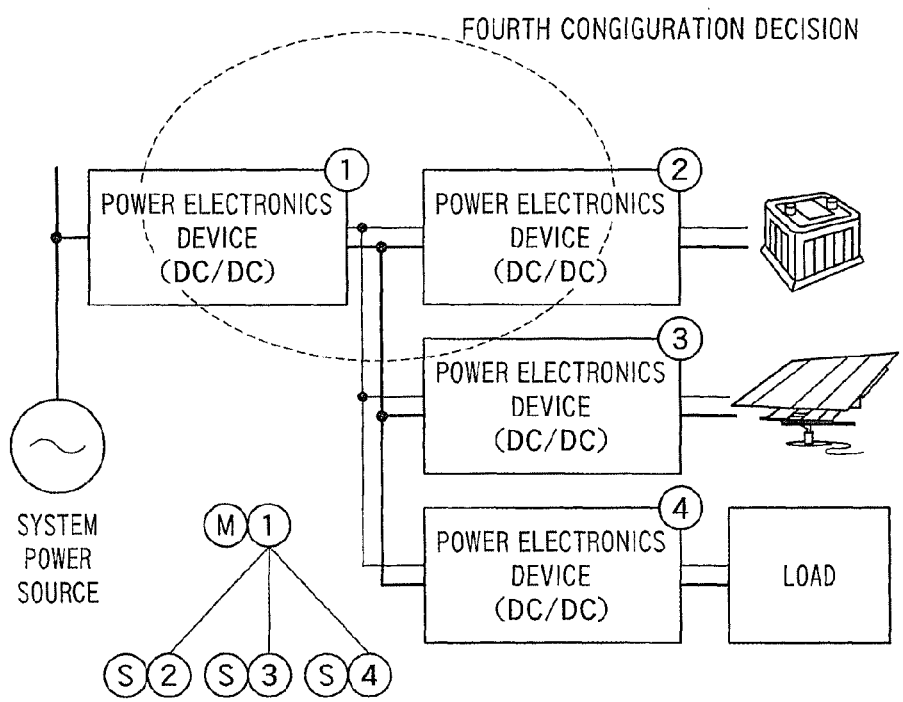
FIG. 10D is a view illustrating a configuration decision example of multiple power electronics devices according to an embodiment of the present invention.

By making the first configuration decision illustrated in FIG. 10A and the second configuration decision illustrated in FIG. 10B, a configuration decision is made between three power electronics devices (DC/DC). From the third configuration decision in FIG. 10C, the power electronics device (AC/DC) starts a configuration decision with these. In the third configuration decision, there are a plurality of control subject masters in the system. In the example in the figure, since there are not a plurality of masters and there is no collision in the supervisory control of power in slave power electronics devices, there is no problem if the shift to normal operation is permitted, but a logical hierarchy configuration is subjected to multistage from a power electronics device (AC/DC) of the highest-order master to power electronics devices (DC/DC) of the lowest-order slave, and therefore there is a problem of ineffective information propagation. Actually, in the example in the figure, since there are both communication connection and power connections between one power electronics device (AC/DC) and three power electronics devices, it is preferable to adopt a logical hierarchy configuration of the direct connection type as presented by the fourth configuration decision in FIG. 10D.

Figure 11:
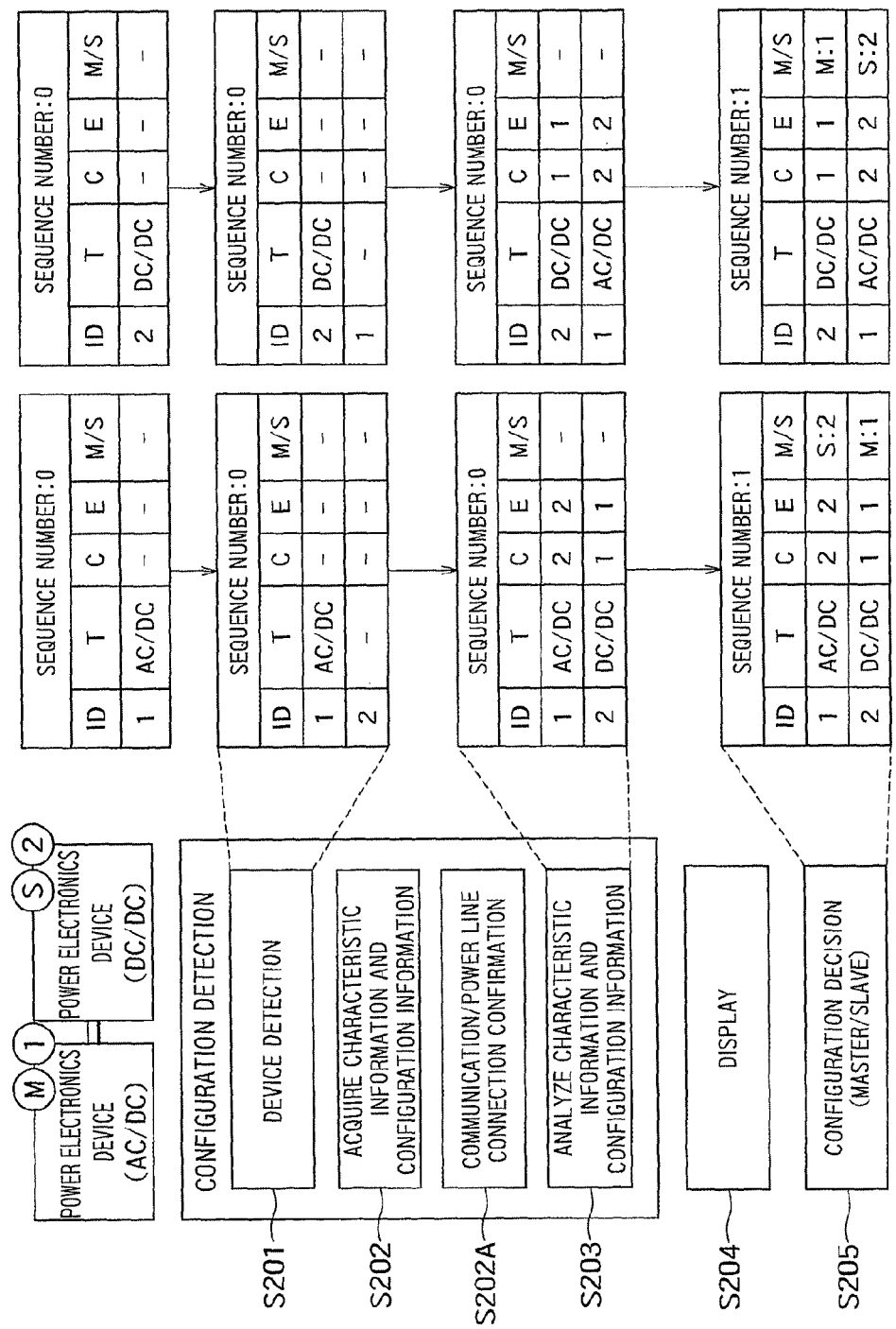
FIG. 11 is a view illustrating a configuration decision example of multiple power electronics devices according to an embodiment of the present invention.

FIG. 11 illustrates a state where, under the assumption that a power electronics device (AC/DC) and a power electronics device (DC/DC) are installed as two devices in the system, characteristic information and configuration information are exchanged, a configuration decision is made, and, after the master-slave determination, the configuration information is updated. The right of the figure illustrates a state where the configuration information of each device changes, the "T" field shows a conversion characteristic, the "C" field shows the ID of the other party connected in the communication aspect, the "E" field shows the ID of the other party connected in the power aspect and "M/S" shows the ID of a master or slave device for oneself.

Other devices on the same power line are detected by device detection (S201), characteristic information and configuration information of the detected device are acquired in step S202 and the information acquired from the other-party device is reflected to own configuration information in step S203. It may be considered that unit S202A for connection confirmation of a communication/power line is put between step S202 and step S203. In step S204, the clerk in charge performs display in the own device and checks whether the master-slave configurations are matched between devices. As another method, as described above, it may be possible to automatically perform an operation sequence to check whether the master-slave configuration recognized by the own device and the master-slave configuration recognized by the other-party device are matched.

If it is confirmed that the configurations of the devices are matched, the master-slave configuration is decided by this content and the configuration information is updated (S205). The sequence number is incremented by this update.

Here, in a case where there are three or more devices, as illustrated in the operation flowcharts in FIG. 9 and FIG. 10A to FIG. 10D, it is checked whether there is already a master in a device that is the other party for comparison of configuration decision.

Figure 12A:
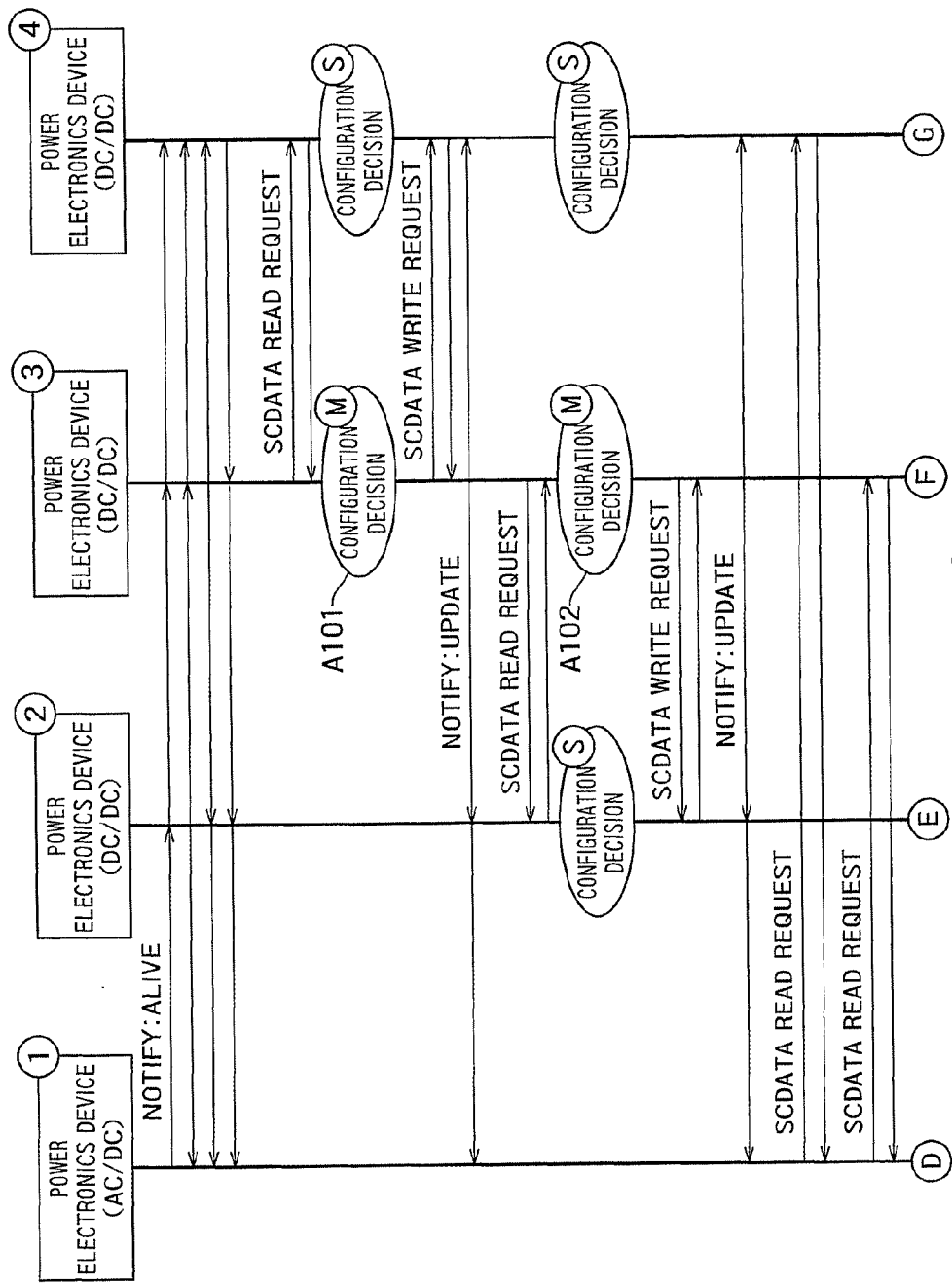
FIG. 12A is an operation sequence diagram of multiple power electronics devices according to an embodiment of the present invention.
Figure 12B:
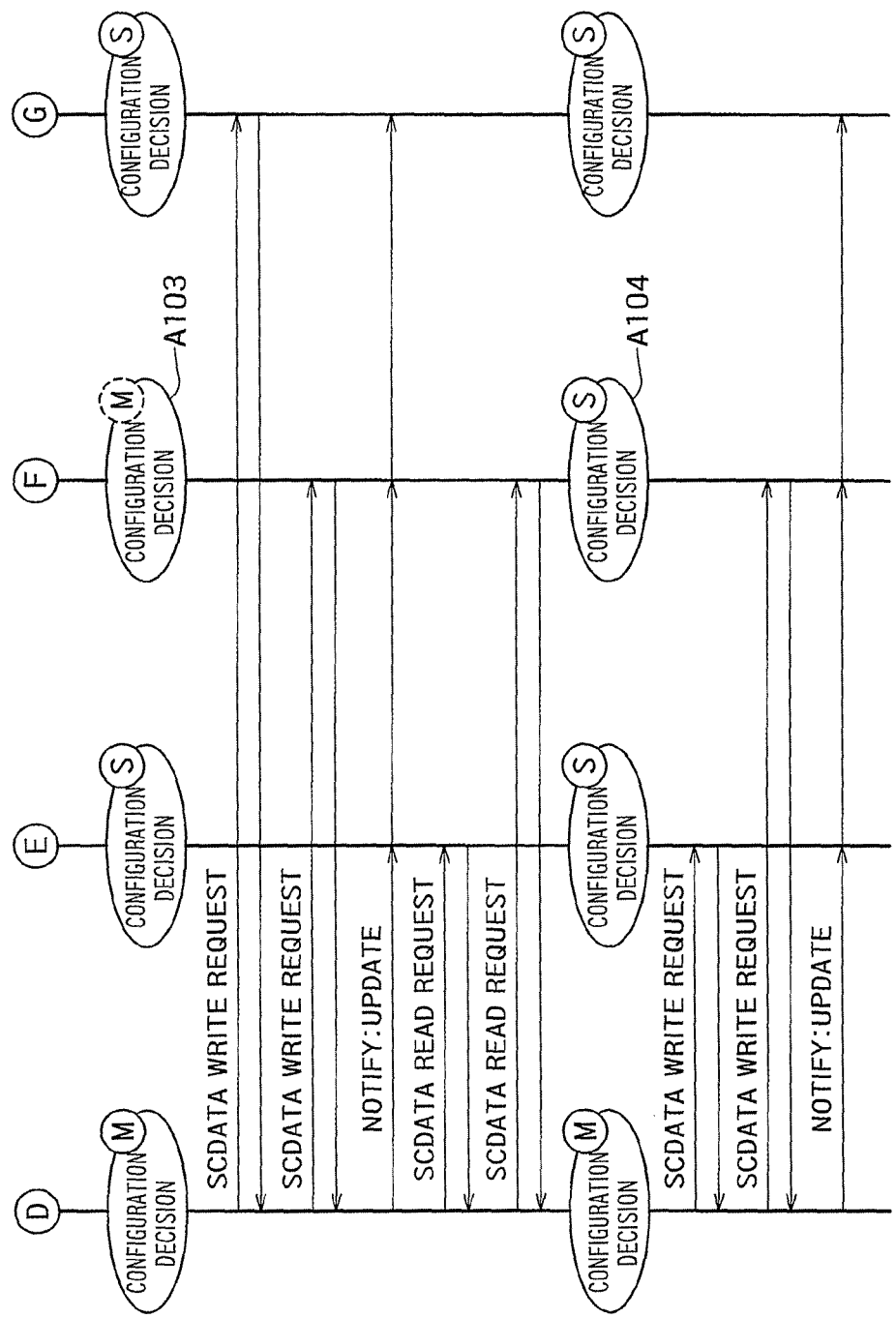
FIG. 12B is an operation sequence diagram following FIG. 12A.

FIG. 12A and FIG. 12B present an operation sequence example between multiple power electronics devices according to an embodiment of the present invention. These figures illustrate detailed operation to actually exchange communication messages in the system configuration in FIG. 10. The configuration and details of exchanged communication messages are presented in FIG. 16, FIG. 17, FIG. 18, FIG. 19, FIG. 20, FIG. 21 and FIG. 22.

FIG. 12C(A) to FIG. 12(E) illustrate a state where the master-slave values and sequence numbers of the configuration information of a power electronics device 3 are updated in the operation sequence in FIG. 12A and FIG. 12B. FIG. 12C(A) illustrates the initial configuration information and FIG. 12C(B), FIG. 12C (C), FIG. 12C (D) and FIG. 12C (E) illustrate configuration information when being updated in master-slave determinations A101, A102, A103 and A104 in the operation sequence. To be more specific, configuration information is written between power electronics devices 3 and 4 in master-slave determination A101, configuration information is written between power electronics devices 2 and 3 in master-slave determination A102, configuration information is written between power electronics devices 1, 3 and 4 in master-slave determination A103 and configuration information is written between power electronics devices 1, 2 and 3 in master-slave determination A104, which are shared by FIG. 12C(B), FIG. 12C(C), and FIG. 12C(D) and FIG. 12C(E), respectively. It is considered that a power electronics device (example: power electronics device 1 in A101) which does not participate in the master-slave determination receives an update notification and subsequently performs a master-slave confirmation procedure to synchronize with information.

Figure 13A:
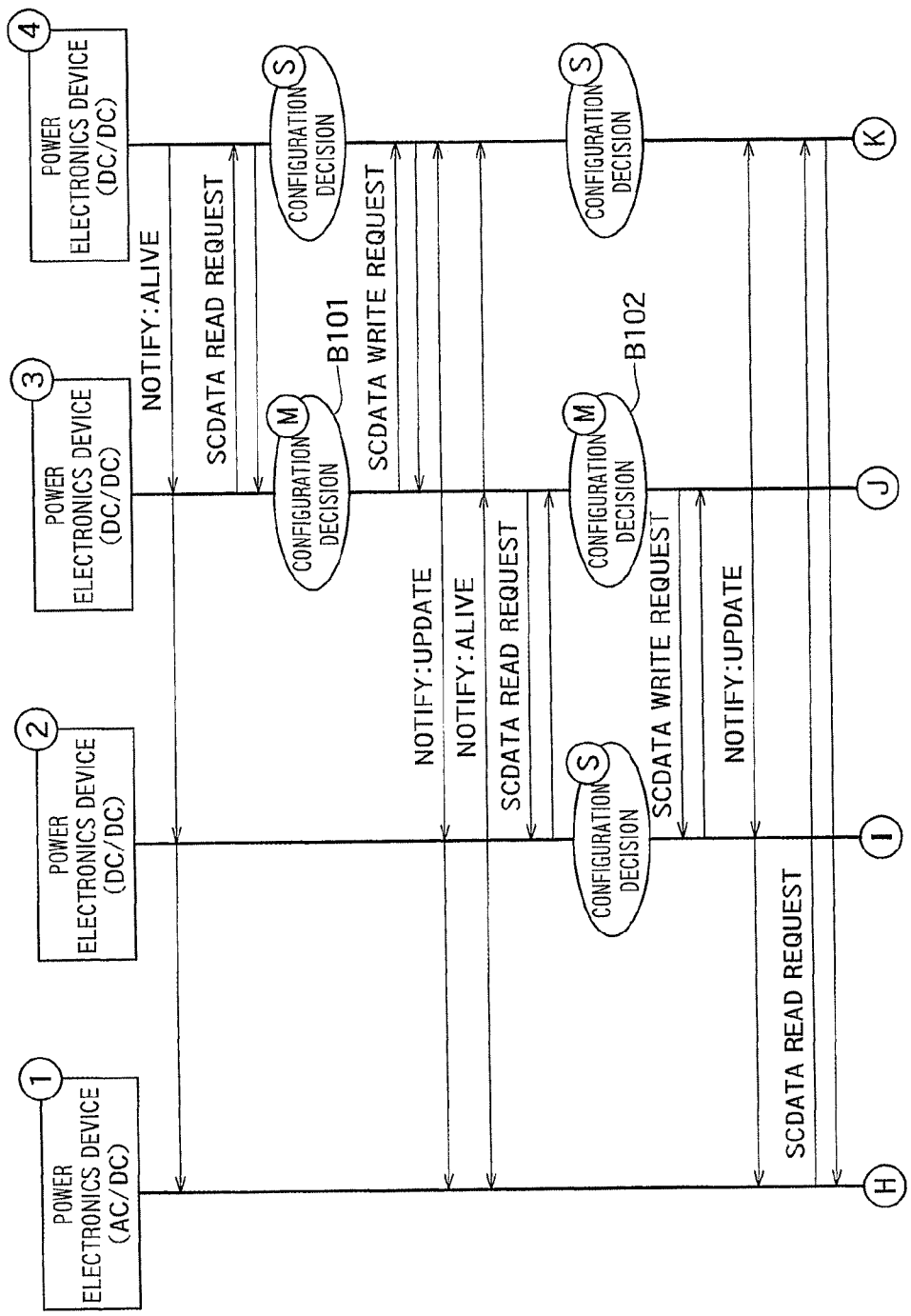
FIG. 13A is an operation sequence diagram of multiple power electronics devices according to an embodiment of the present invention.
Figure 13B:
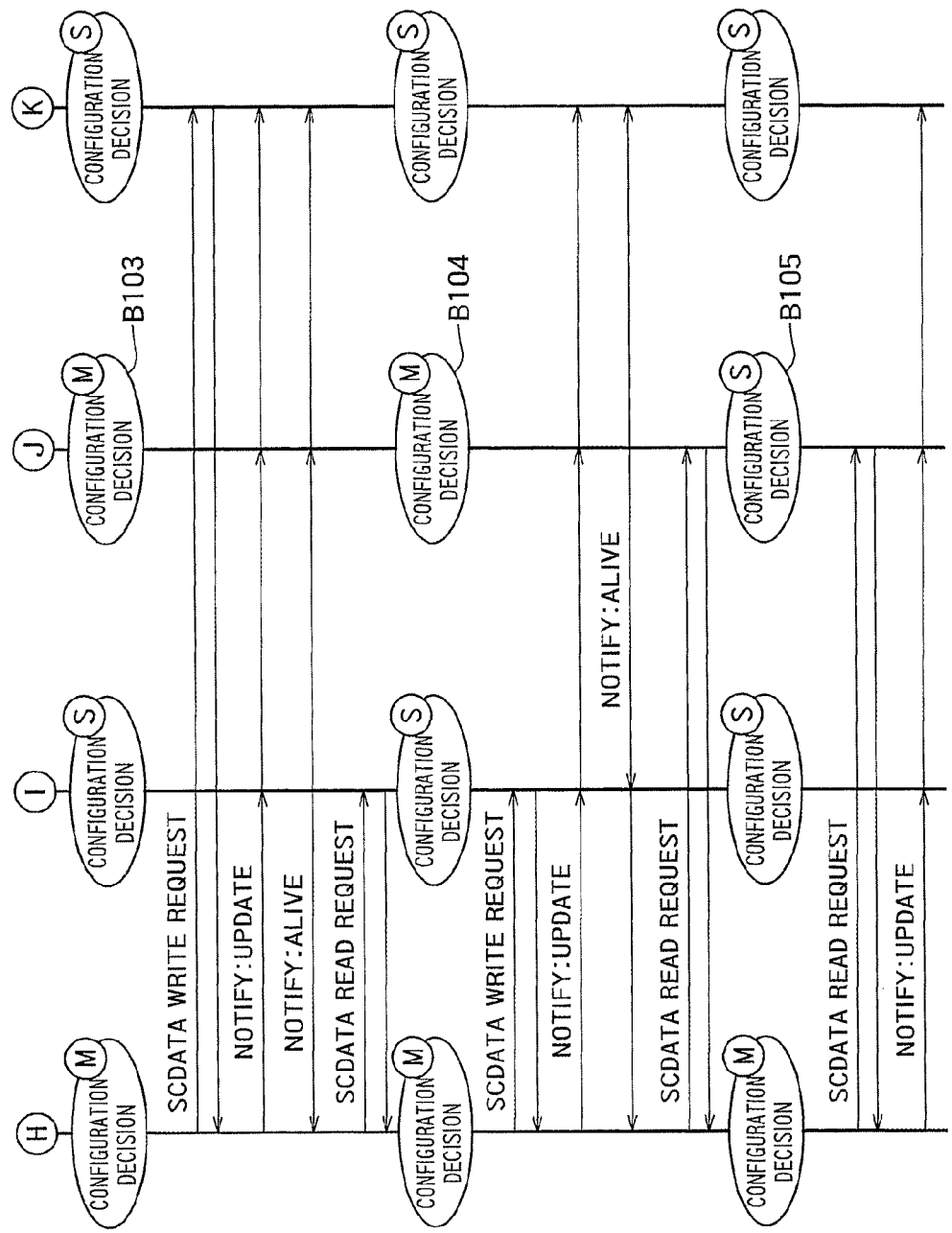
FIG. 13B is an operation sequence diagram following FIG. 13A.

FIG. 13A and FIG. 13B present other examples of an operation sequence between multiple power electronics devices according to an embodiment of the present invention. FIG. 13C(A) to FIG. 13C(F) illustrate an operation sequence of FIG. 13, FIG. 13C(A) illustrates initial configuration information and FIG. 13C(B), FIG. 13C(C), FIG. 13C(D), FIG. 13C(E) and FIG. 13C(F) illustrate configuration information updated in master-slave determinations B101, B102, B103, B104 and B105 in the operation sequence. To be more specific, configuration information is written between power electronics devices 3 and 4 in master/slave determination B101, configuration information is written between power electronics devices 2 and 3 in master/slave determination B102, configuration information is written between power electronics devices 1 and 4 in master/slave determination B103 and configuration information is written between power electronics devices 1 and 2 in master/slave determination B104, which are shared by FIG. 13C(B), FIG. 13C (C), FIG. 13C (D) and FIG. 13C (E), respectively. It is considered that a power electronics device (example: power electronics device 1 in B101) which does not participate in the master-slave determination receives an update notification and subsequently performs a master-slave confirmation procedure to synchronize with information.

In the operation sequences in FIG. 12A, FIG. 12B, FIGS. 13A and 13B, a power electronics device exchanges a NOTIFY message (which notifies notification/update/separation) in FIG. 16 by the use of a communication network in order to find other devices. As another method, it is also possible to use the SEARCH message (which inquires the existence of other devices) in FIG. 17 and the SEARCH-RESPONSE message (which notifies the existence of the device by a response to the SEARCH message) in FIG. 18.

Besides this, as described above, information on the power network (confirmation of connection with other devices on the same bus line) may be used or manual setting by a worker may be provided.

These communication messages include the device ID of the transmission source in addition to a communication header such as TCP/IP (Transmission Control Protocol/Internet Protocol) and UDP/IP (User Datagram Protocol/Internet Protocol) and information on the message type to distinguish messages. Moreover, the SEARCH message includes information on the stand-by time which shows a time period to wait by responding SEARCH-RESPONSE after the SEARCH message is received.

Figure 19:
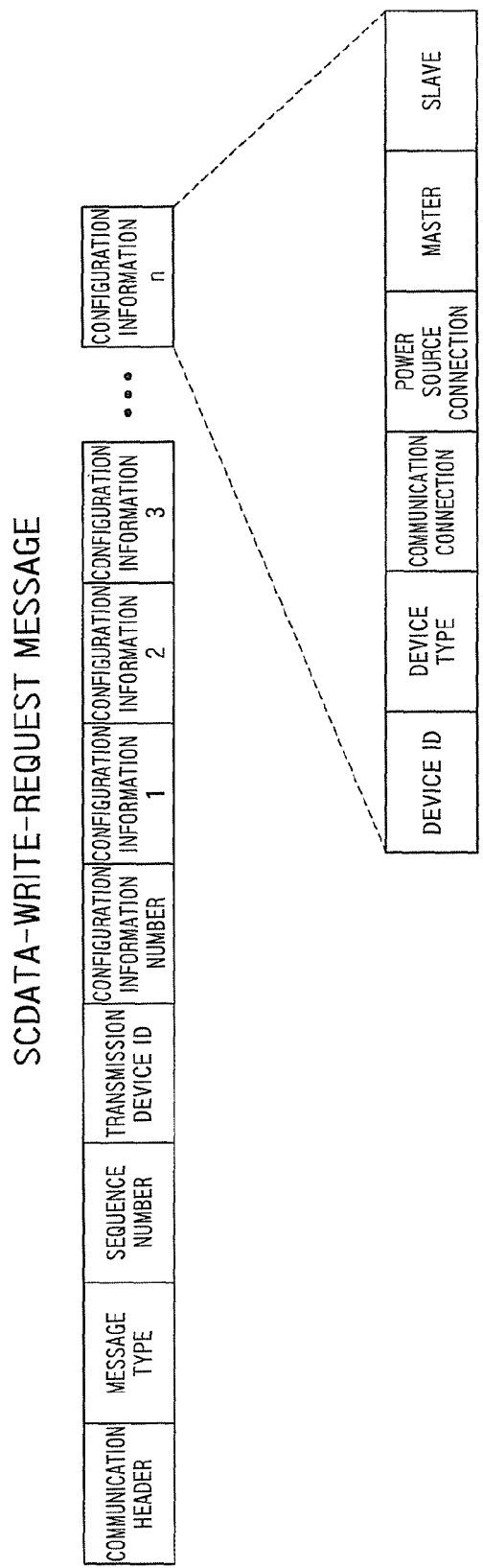
FIG. 19 is a view illustrating a communication message configuration example according to an embodiment of the present invention.
Figure 22:
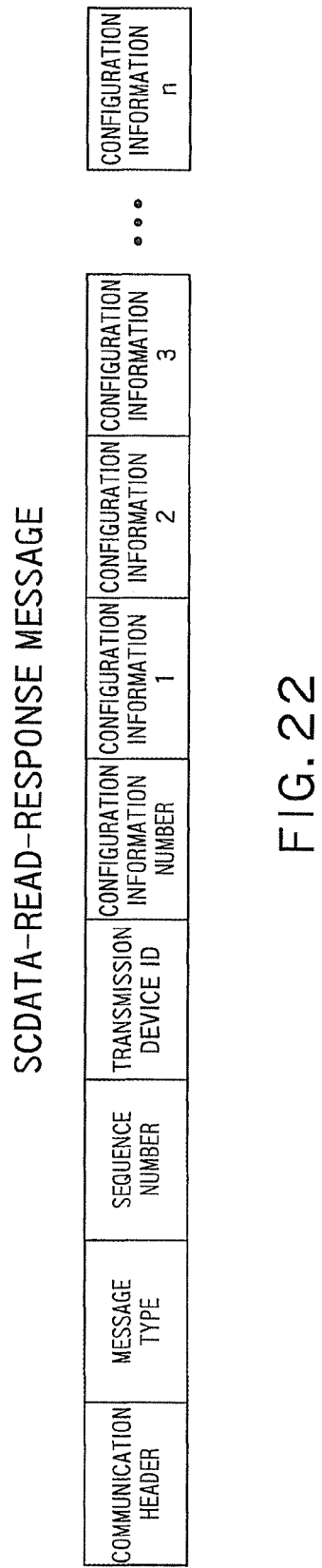
FIG. 22 is a view illustrating a communication message configuration example according to an embodiment of the present invention.

Actual characteristic information and configuration information are exchanged between devices by the use of the SCDATA-WRITE-RESPONSE message (which demands the writing of the configuration information) in FIG. 19, the SCDATA-WRITE-REQUEST message (which responds to the writing result of the configuration information) in FIG. 20, the SCDATA-READ-REQUEST message (which demands the reading of the configuration information) in FIG. 21 and the SCDATA-READ-RESPONSE message (which responds to the reading result of the configuration information) in FIG. 22.

As presented in FIG. 7 and FIG. 8, the relationship between characteristic information and configuration information is different in individual information or the set of multiple items of information. However, like the communication message formats in FIG. 19 to FIG. 22, in addition to a method of integrating characteristic information of multiple devices and delivering the result as configuration information (table format in FIG. 8), there is a possible method of individually delivering characteristic information of individual devices. The embodiments of the present invention do not depend on a specific delivery method. The configuration information contains the device ID, device type, communication connection, power connection and master/slave for each device, and the communication connection, the power connection and the master/slave among these can be include multiple times according to circumstances.

FIG. 12A and FIG. 12B are different from FIG. 13A and FIG. 13B in the following points. In FIG. 12A and FIG. 12B, after each power electronics device recognizes the existence of all power electronics devices in the system (mutual existence is notified by the NOTIFY message in first four sequences in FIG. 12A), the exchange of characteristic information/configuration information for master-slave construction and the configuration decision are started. In FIG. 13A and FIG. 13B, at the same time when each power electronics device recognizes the existence of other individual power electronics devices, the exchange of characteristic information/configuration information for master-slave construction and the configuration decision are started. For example, in FIG. 13A, at the same time of recognizing device 4 by receiving the NOTIFY message from device 4, device 3 starts information exchange and configuration decision.

As described above, the device ID is information to uniquely identify the device. In a case where the ID uses the communication address such as IP addresses, it is possible to access other power electronics devices in the system described therein at the same time of acquiring characteristic information/configuration information from other power electronics devices. Meanwhile, in a case where others than the communication address are used for the device ID, it is not possible to access other power electronics devices in the system only by acquiring characteristic information/configuration information. Therefore, in this case, the repetitive-type acquisition of characteristic information/configuration information as described above (FIG. 13A and FIG. 13B) is terminated once. In view of this, in FIG. 12A, FIG. 12B, FIG. 13A, and FIG. 13B based on the system configuration of FIG. 10, although the final master-slave configuration information is identical, there is a difference in the number of configuration decisions to derive it.

Figure 14:
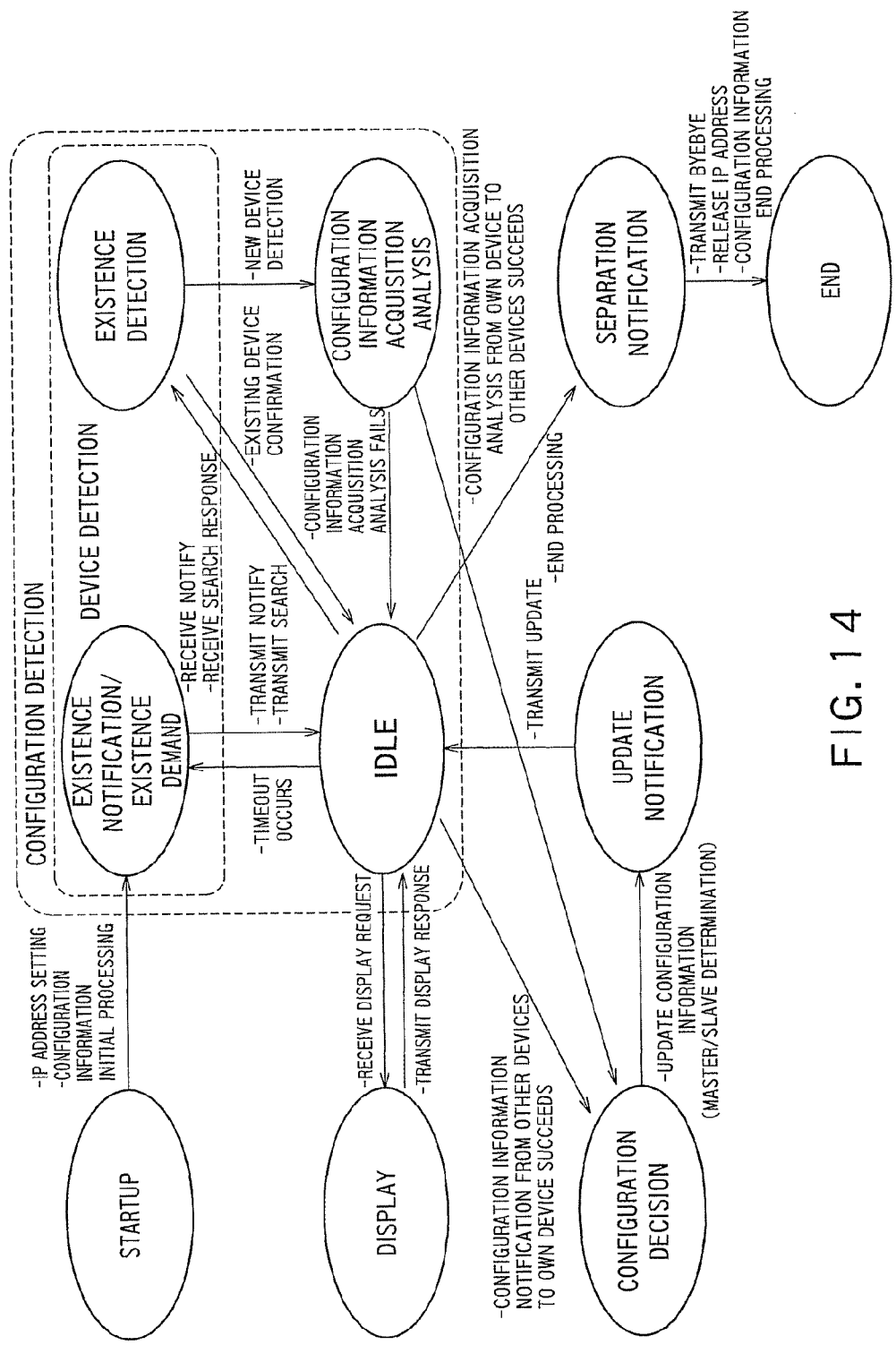
FIG. 14 is an internal state transition diagram of a power electronics device according to an embodiment of the present invention.

FIG. 14 is a state transition diagram related to configuration decision in a power electronics device according to the present invention. In the figure, the device state is represented by an oval in which a character is written. The event occurrence is represented by the event name with an arrow, and the state changes every time an event occurs. The device starts from the state of "startup" and ends in the state of "end." The states that can be changed during the time include the states of "existence notification/existence demand," "IDLE," "existence detection," "configuration information acquisition analysis," "configuration decision," "display," "update notification" and "separation notification."

For example, when it becomes the "startup" state by power-on, the IP address setting and the initial processing of configuration information (i.e., initial setting of the configuration information) are performed to shift to the "existence notification/existence demand" state. When it shifts to this state, the NOTIFY message or the SEARCH message is transmitted to shift to the "IDLE" state. When NOTIFY is received in the "IDLE" state, it shifts to the "existence detection" state in the state, and, when a new device is detected, it shifts to the "configuration information acquisition analysis" state. When the configuration information is acquired and analyzed, it shifts to the "configuration decision" state. When it is confirmed that the master-slave configuration is matched with other devices, the configuration information is updated, it shifts to the "update notification" state, the updated update information is transmitted to other devices and it returns to the "IDLE" state. The transition between other states is similarly performed according to a corresponding event.

Figure 15A:
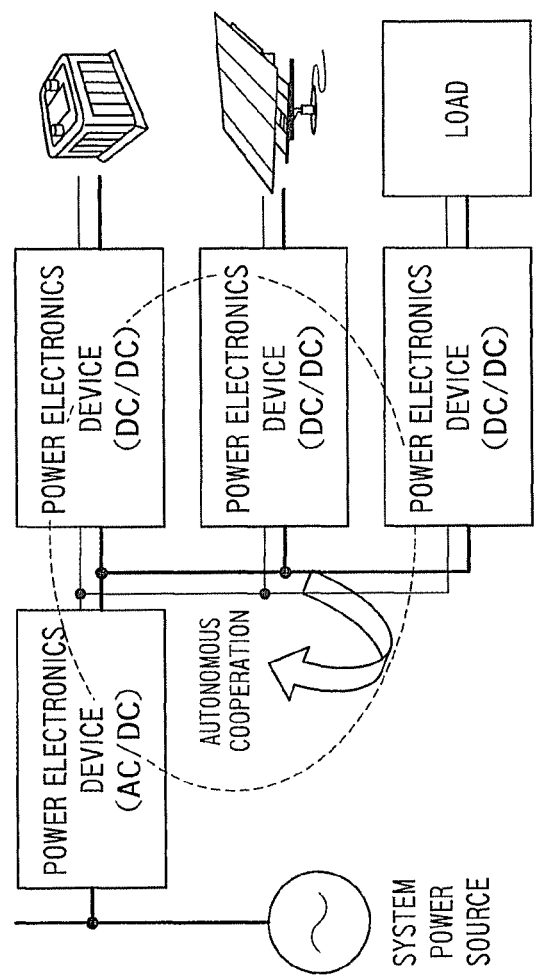
FIG. 15A is a view illustrating a configuration example of multiple power electronics devices to describe an operation at the time of anomalous occurrence according to an embodiment of the present invention.
Figure 15B:
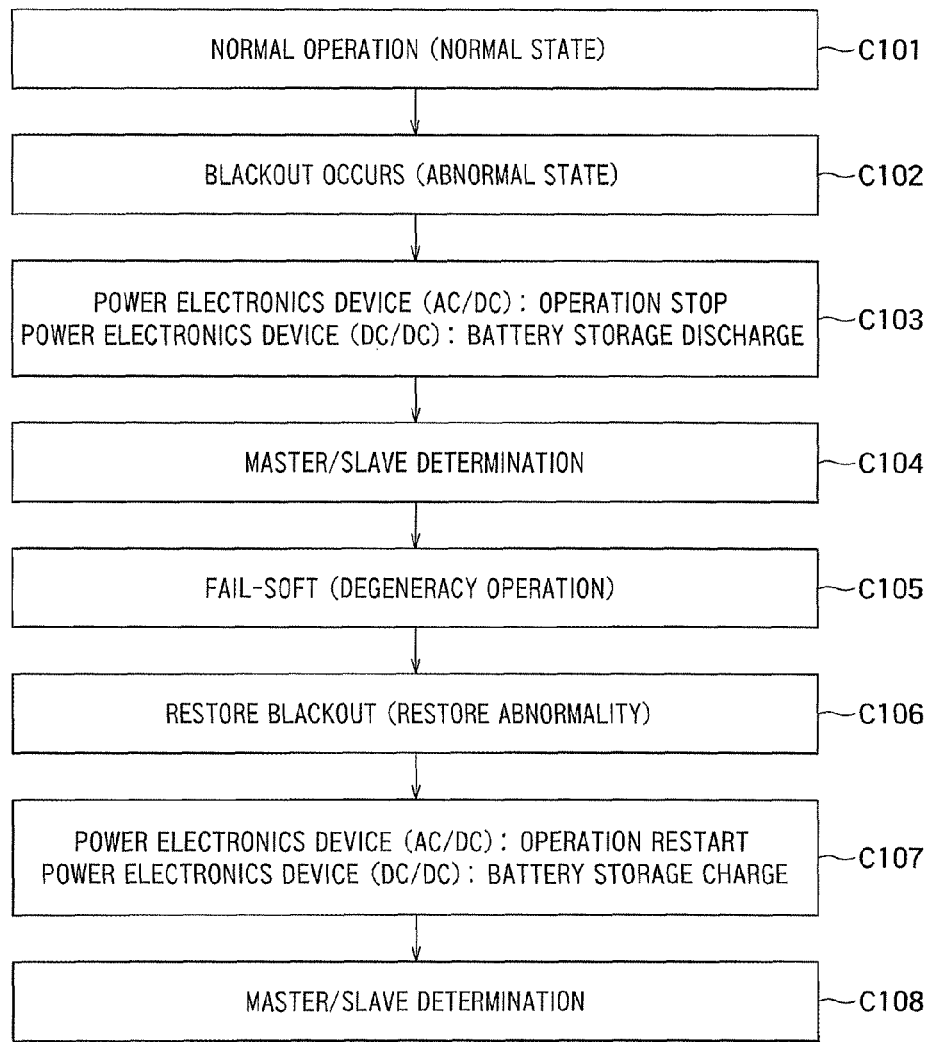
FIG. 15B is a flowchart diagram illustrating a configuration decision example of multiple power electronics devices at the time of anomalous occurrence according to an embodiment of the present invention.

Although operation from the startup state has been described in FIG. 14, an embodiment of the present invention is applicable even at the time of anomalous occurrence in addition to the time of initial installation by a similar mechanism. To be more specific, in "autonomous cooperation: start from blackout" in FIG. 5C, it is presumed that abnormality occurs by the single fault of the power line (i.e., power system network on the supply side) and the fail-soft (degeneracy operation) is realized. FIG. 15A, FIG. 15B, and FIG. 15 C are figures to describe the operation of each device when abnormality occurs. FIG. 15A is a connection configuration diagram indicating a state where each power electronics device performs autonomous cooperation at normal time. FIG. 15B is an operation flowchart when abnormality occurs. FIG. 15 C is a view illustrating the output state of each power electronics device in each phase of the flowchart of FIG. 15B.

At normal operation, a power electronics device (AC/DC) operates in response to the power supply from a system power source and a power electronics device (DC/DC) operates in response to the power supply from a power source such as a battery storage/PV in addition to the power supply from the system power source through the power electronics device (AC/DC) (C101). The top table in FIG. 15C illustrates the output (i.e., actual value) of each power electronics device at the time of normal operation. Moreover, the figure illustrates the rated value of each power electronics device.

When the blackout happens (C102), the power electronics device (AC/DC) stops operation (C103). Moreover, the power electronics device (AC/DC) generally monitors the power line, and, in a case where the actual value of the voltage or frequency exceeds a threshold, executes the fail-safe (shutdown). As described above, since the power electronics device (DC/DC) operates in response to the power supply from a power source such as a battery storage/PV in addition to the power supply from the system power source through the power electronics device (AC/DC), the power electronics device (DC/DC) can continue operation and perform communication by switching a power system to be driven at the time of blackout. Since the power electronics device (DC/DC) is not directly connected to the alternating current side, the above-mentioned fail-safe is not executed. The power electronics device (DC/DC) connected to the battery storage or power generating device prepares for electrical discharge at this time. The second top table in FIG. 15C illustrates the output of each power electronics device when the blackout happens. The blackout stops operation of the power electronics device (AC/DC) and power electronics device (DC/DC): load that have operated up to now. For example, the power electronics device (DC/DC) can detect the generation of the blackout of the power electronics device (AC/DC) by interruption of communication with the power electronics device (AC/DC). The determining unit 75c of the power electronics device (DC/DC) performs this detection.

Next, when the power electronics device (AC/DC) performs the fail-safe, the remaining devices make a master-slave determination (C104). For the fail-soft (degeneracy operation), the priority standard is adopted in which a power electronics device with the highest probability of alive at the time of abnormity is selected as a master. That is, even in the power electronics device (DC/DC), a device connected to the power source is decided as a master more preferentially than a device connected to the load. In addition, even in the power source, the power electronics device (DC/DC) connected to the battery storage is given priority over the power electronics device (DC/DC) connected to the power generating device of natural energy. Detailed operation in this step C104 can apply the processing in steps S102 to S115 in FIG. 9A and FIG. 9B.

When the master and the slave are determined, this device group performs the fail-soft (degeneracy operation) (C105). The third top table in FIG. 15C illustrates the output of each power electronics device at the time of degeneracy operation. The power is output from the battery storage and power generating device that have not output the power up to now, and the load is driven by this power. Here, the power electronics device (AC/DC) remains stopping.

When the blackout is restored (C106), the power electronics device (AC/DC) restarts operation (C107) and the power electronics device (DC/DC) connected to the battery storage or power generating device prepares for switching from discharge to charge of the battery storage. The output of each power electronics device at the time of operation resumption is as illustrated in the bottom table in FIG. 15C. After that, the master and the slave are determined including the restored power electronics device (AC/DC) (C108), and it returns to the normal operation. The output of each power electronics device returns to the top table in FIG. 15C too. Detailed operation in this step C108 can apply the processing in steps S102 to S115 in FIG. 9A and FIG. 9B.

At the time of normal operation after the configuration decision is finished, supervisory control of the power is implemented while communication messages related to real-time control or non-real-time control are exchanged between devices. For example, as information on the supervisor system, there are the current value of effective power (W), the current value of reactive power (VAR) and the current values of the unit voltage or power factor per phase. Moreover, as information on the control system, there are the connection permission with respect to the power network, the use permission of the PV output, the use permission of the battery storage output, the use permission of effective/reactive power control, the target value of the effective power (W), the target value of the reactive power (VAR), the target value of the power factor, the output level value of the effective power (%), the output level value of the reactive power (%) and a frequency value. In addition, as information on the rating system, there are the rated effective power (W), the rated apparent power (VA) and the rated reactive power (VAR). The control information can be read and written, and it can be considered as a general embodiment that only reading is possible for surveillance/rating information.

As described above, according to the embodiments of the present invention, based on characteristic information and configuration information of multiple power electronics devices, a control-subject master device and controlled-subject slave device for electrical control between the multiple power electronics devices are determined. By deciding operation start permission after the configuration information is matched between the multiple devices, even at the time of initial installation of the power electronics devices or the time of anomalous occurrence after the operation start, it is possible to increase the power input/output throughput while automatically changing a logical configuration between the multiple devices and securing the flexibility of operation. The function of these power electronics devices can be provided in equipment such as a smart meter in FIG. 1 and is applicable to the topology configuration detection of the entire system including equipment other than the load and power sources such as a battery storage and photovoltaic generation, and the automation of master configuration decision for surveillance and control. Moreover, in addition to a format of physically separating the communication line and the power line into two media as described in the present embodiment, they can be consolidated in one medium like PLC (Power Line Communication).

[Management of Whole Power Connection Information]

Although the above explanation is chiefly given with respect to a connection relationship between power electronics devices (which may include a controller and an EMS) as a power connection relationship, in the following, there is a feature of generating and managing the whole power connection information showing the power connection relationships of the whole including a battery storage system, a natural energy system and a load which are connected below a power electronics device and which the power electronics device performs direct control. By presenting the whole power connection information to workers, it is possible to cause the workers to confirm the whole power connection relationship. Moreover, by notifying the whole power connection information to an EMS, it is possible to perform control in which the EMS understands the whole of each power electronics device, the battery storage system and the natural energy system.

In an embodiment of the present invention, an existing power connection design system is used as specific expression of the power connection relationship. Therefore, the power connection information or the like is converted into information which can be used by the existing power design system. In an embodiment of the present invention, IEC 61850-6 SCL (Substation Configuration Language/System Configuration Language) is used as a method of expressing the power connection relationship. IEC 61850-6 SCL is a language used to exchange power connection information of an instrument installed in a substation, communication information, the initial value set to the instrument and information on an operational interface, between different venders. A design system related to the instrument in the substation can generate and use information in which the design content is expressed in IEC 61850-6 SCL. Moreover, the instrument in the substation can perform operation based on the output information expressed in IEC 61850-6 SCL. In an embodiment of the present invention, by generating power connection information that expresses the whole power connection relationship, supplying the whole power connection information to such as design system and displaying content of the information, it is possible to cause the workers to understand the whole power connection relationship. An expression method of the power connection information is not limited to the method using IEC 61850-6 SCL.

[Entire Outline Related to Management of Power Connection Information]

The outline of exchange of power connection information managed by each device is described using FIG. 1. Here, exchange between an EMS 14 and power electronics devices P1 and P2 is described. The power electronics devices P1 and P2 notify the EMS 14 of power connection information which they manage. The power connection information which they manage includes not only information included in the power connection information described above but also information on whether there is connection of a controllable instrument (such as a battery storage system and a load) that is connected below a power electronics device and on a connection topology as described below. As a result of this, for example, the EMS 14 can understand the supervisory control of effective power and reactive power previously illustrated in FIG. 5D more in detail. The exchanging scheme of power connection information managed by a power electronics device or controller is described in detail.

Figure 23:
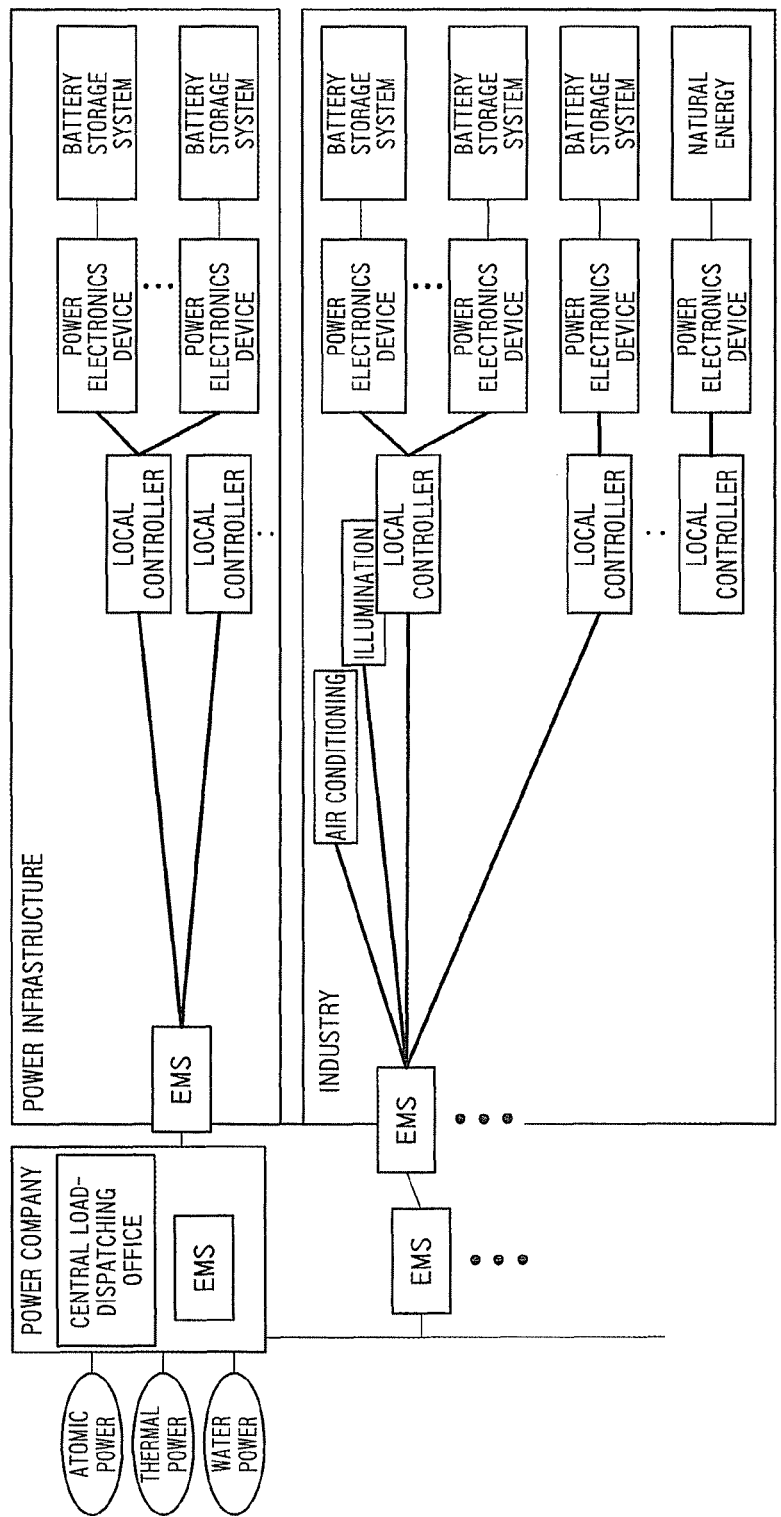

FIG. 23 illustrates the outline of an exchanging scheme of power connection information managed by a power electronics device or the like. FIG. 23 illustrates an example of a system architecture is aggregated in multiple stages by a plurality of devices. EMS's of a power company, power infrastructure and industry or the like are illustrated as devices on the side on which services are provided. The EMS of the power company is connected to a system of a central load-dispatching office. The power company possesses electric power equipment and operates the electric power equipment to generate electricity by the atomic power, thermal power and water power, and so on. The supply and demand control of generated power can be performed through the EMS. Services provided by the EMS include, for example, device schedule operation such as a way of controlling an operation instrument that cooperates with the services. The operation instrument that cooperates with the services includes a power electronics device and a control target instrument (such as a battery storage system, a natural energy and a load) connected below the power electronics device. The EMS uses a complex communication scheme to make the services flexible. Meanwhile, the operation instrument (or the power electronics device) that cooperates with the services is subject to the restriction of hardware resources and therefore uses a simple communication scheme. Moreover, a local controller as a control device that aggregates a plurality of operation instruments plays a role as a conversion gateway that switches between a complex communication scheme and a simple communication scheme. Although a used communication method may be different in each hierarchy, a case is assumed in an embodiment of the present invention where a same communication scheme is used. That is, in the embodiment of the present invention, the same communication scheme is used between the EMS, the local controller and the power electronics device.

Even in the case of the same communication scheme, a load related to processing and consumed hardware resources are different between a case where the communication scheme is a text format and a case where the communication scheme is a non-text format that compresses a text. In the embodiment of the present invention, information exchange is performed in the text format between the local controller and the EMS, and information exchange is performed in the non-text format between the power electronics device and the local controller. To be more specific, the information exchange is performed using a communication scheme that exchanges texts described in the XML (Extensible Markup Language) format as a communication scheme between the EMS and the local controller, and using the non-text format (or binary format) that encodes an XML document by the use of EXI (Efficient XML Interchange) between the local controller and the power electronics device. Here, although an example has been described where two of the information exchange by the non-text format and the information exchange by the text format are used, only one of the non-text format and the text format may be used.

Since the local controller aggregates a plurality of power electronics devices, the local controller may retain common information of the plurality of power electronics devices. To be more specific, there is interface information that collects information from the power electronics devices. In IEC 61850-6 SCL, although the interface information to access the devices is described in the DataTypeTemplate type element, this may be managed in advance on the local controller side.

In an example of the system architecture illustrated in FIG. 23, although the information exchange between the EMS, the local controller and the power electronics device has been illustrated, in addition to this, as illustrated in FIG. 4, it is also possible to notify power connection information of a display terminal 69 through the local controller. The power connection information described herein may include not only information included in the power connection information described above but also information on whether there is connection of a controllable instrument (such as a battery storage system and a load) that is connected below a power electronics device and on a connection topology. As a result of this, it is possible to present, to workers, the whole power connection relationship including the connection relationship between the power electronics device and the battery storage system, the natural energy or the load. Here, the understanding and management of the whole power connection relationship between devices may be performed by one of the power electronics device and the local controller.

[Details of Power Connection Information Management]

Figure 24:
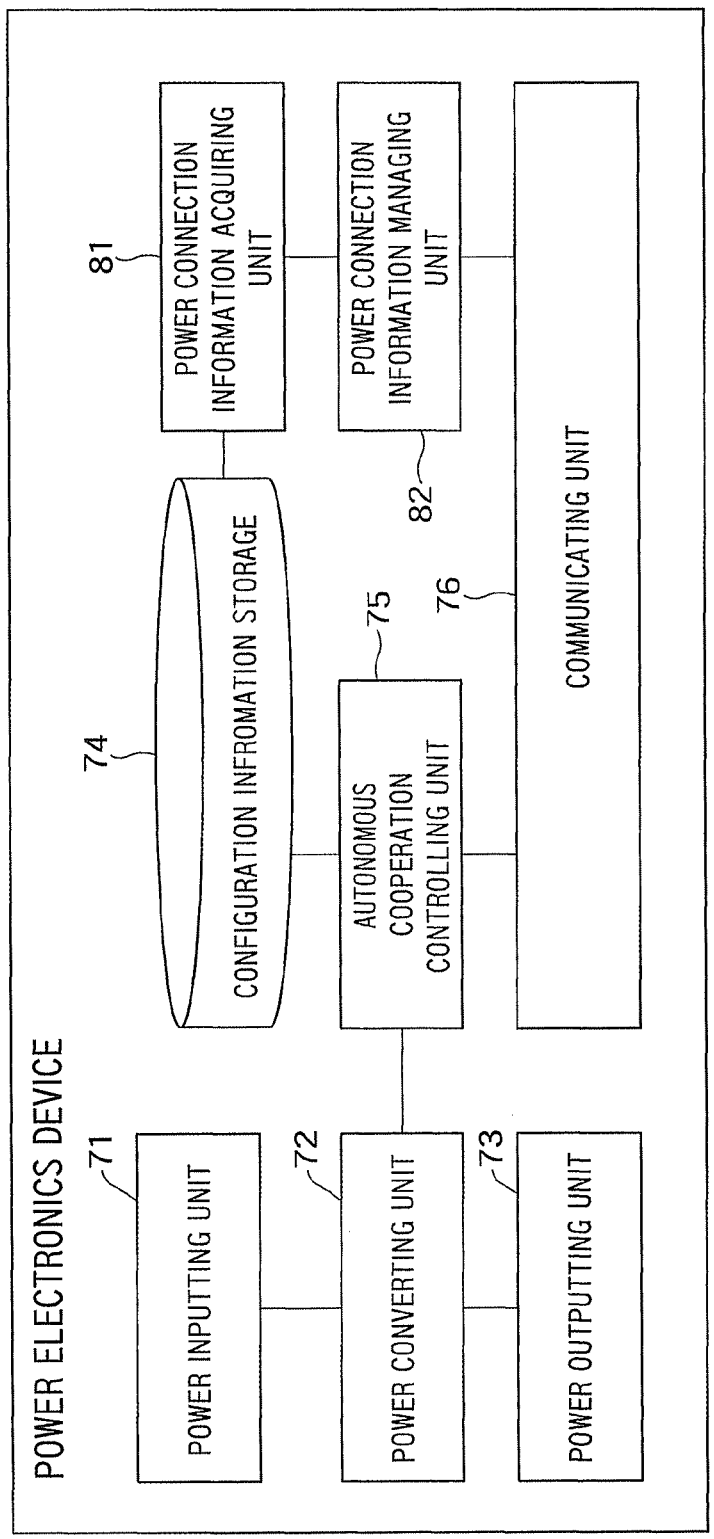
FIG. 24 is a view illustrating a block diagram of a power electronics device according to an embodiment of the present invention.

FIG. 24 illustrates a block diagram of a power electronics device according to an embodiment of the present invention. The same reference numerals are assigned to elements of the same names as those in FIG. 6(A) and an overlapping explanation is omitted. A power connection information acquiring unit 81 and a power connection information managing unit 82 are added to the configuration illustrated in FIG. 6(A). In a case where a local controller understands and manages a power connection relationship, a processing unit having the same functions as those of the power connection information acquiring unit 81 and the power connection information managing unit 82 may be installed in the local controller. Moreover, a communication device may be formed including the power connection information acquiring unit 81, the power connection information managing unit 82, a communicating unit 76 and a storage, and, by communicating with a power electronics device having a configuration as illustrated in FIG. 6(A), the communication device may collect power connection information from each device and understand and manage the whole power connection relationship.

Figure 25:
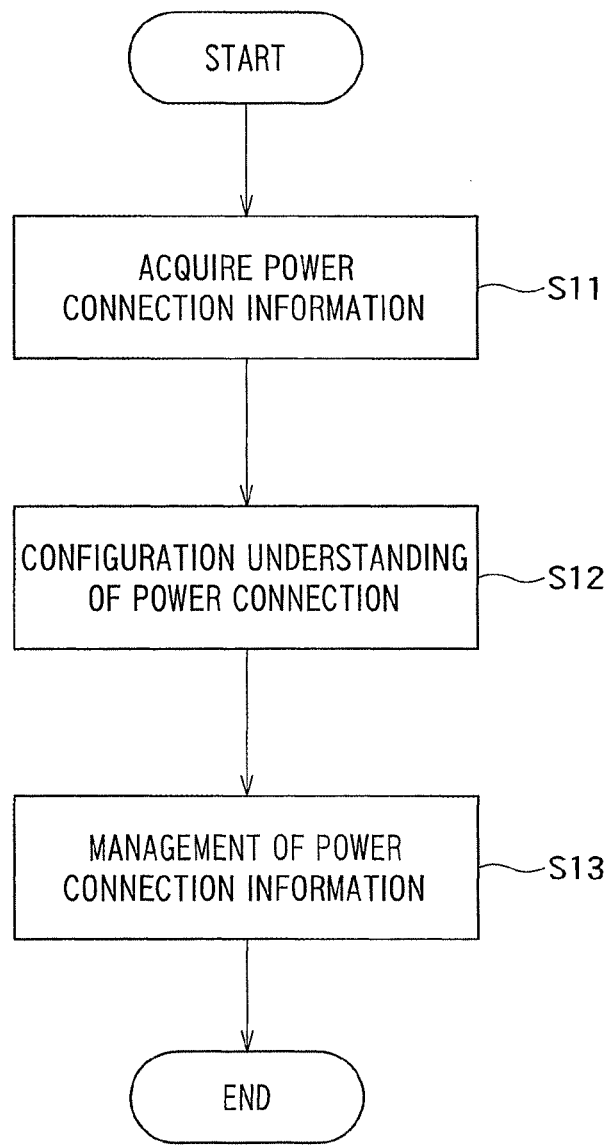
FIG. 25 is a view illustrating a management procedure of power connection information.
Figure 26:
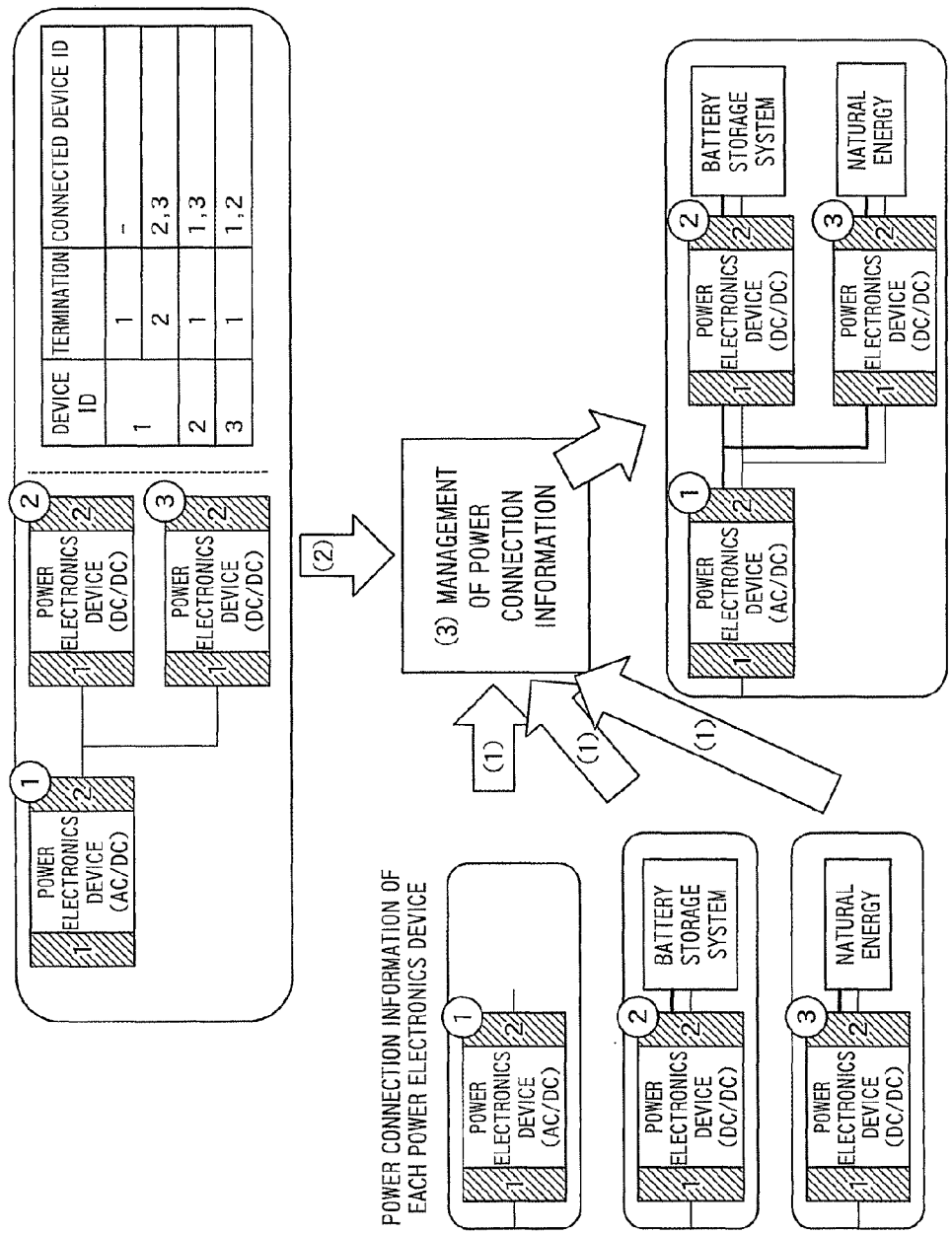
FIG. 26 is a view illustrating the outline of processing performed in the management procedure.

FIG. 25 illustrates a management procedure of power connection information. FIG. 26 illustrates a view to describe the outline of processing performed in the management procedure. The subject that performs the management procedure illustrated in FIG. 25 may be the local controller, the power electronics device or the above-described communication device that is separately prepared. In the following explanation, it is assumed to understand and manage the whole power connection relationship chiefly on the local controller side. The procedure includes steps S11, S12 and S13. The power connection information acquiring unit 81 performs processing in step S11 and the power connection information managing unit performs processing in steps S12 and S13.

First, the power connection information acquiring unit 81 communicates with a plurality of power electronics devices through the communicating unit 76 and each of the power electronics devices collects power connection information indicating the power connection relationship with a control target device. To be more specific, it is information indicating the power connection relationship between a power electronics device and a battery storage system which the power electronics device can directly control, the power connection relationship between the power electronics device and a natural energy, and the power connection relationship between the power electronics device and a load (step S11). In the example illustrated in FIG. 26, the arrow of (1) schematically stands for the processing in step S11. It collects, from each power electronics device, power connection information showing that a controllable instrument is not connected to a power electronics device 1, power connection information showing that the battery storage system is connected to a termination (or terminal) 2 of a power electronics device 2, and power connection information showing that the natural energy system is connected to a termination (or terminal) 2 of a power electronics device 3.

Next, the power connection information managing unit 82 confirms the interconnection relationships between the power electronics devices for configuration understanding of power connection (step S12). In the example illustrated in FIG. 26, the arrow of (2) schematically stands for the processing in step S11. From the power connection information (see FIG. 7) used at the time of master/slave configuration determination, the interconnection relationships between the power electronics devices are confirmed. Here, power connection information including information similar to the power connection information used at the time of master/slave configuration determination may also be gotten in step S11. Part of the power connection information used at the time of master/slave configuration determination is illustrated in a table in the upper right of FIG. 26 (see FIG. 7). Connection of the power electronics devices illustrated in the upper left of FIG. 26 represents a configuration corresponding to the upper right table. As for information of this table, the power electronics devices 1, 2 and 3 communicate with each other and there are cases where all of these devices share the same information and where they do not share the same information. However, in the latter case, by collecting power connection information from the power electronics devices 1, 2 and 3, it is possible to make the upper right table. This is as described in explanation of the above-mentioned embodiment. As an example, this table shows that there is no connection with a termination 1 of the device 1 (assumed to have a device ID of 1) and a termination 2 of the device 1 is connected to the power electronics device 2 (assumed to have a device ID of 2) and the power electronics device 3 (assumed to have a device ID of 3). The connection relationships of the devices 2 and 3 are similarly shown. This is described later in detail.

Finally, the power connection information managing unit 82 generates and manages whole power connection information indicating the whole power connection relationship including the power electronics devices, the battery storage system, the natural energy and the load, from the power connection information acquired in steps S11 and S12 (step S13). In the example illustrated in FIG. 26, the block of (3) schematically stands for the processing in step S11. The generated whole power connection information may be stored in a configuration information storage 74, a storage installed in the power connection information managing unit 82 or a different storage device from these. Moreover, the generated whole power connection information may be transmitted to other devices such as a power electronics device and an EMS, or may be transmitted to a display terminal. As a result of the processing in this step S13, as illustrated in the lower right of FIG. 26, it is possible to understand the whole power connection relationship in which the battery storage system is connected to the termination 2 of the power electronics device 2 and the natural energy system is connected to the termination 2 of the power electronics device, in addition to the connection relationships between the power electronics devices illustrated in the upper of FIG. 26.

Figure 27:
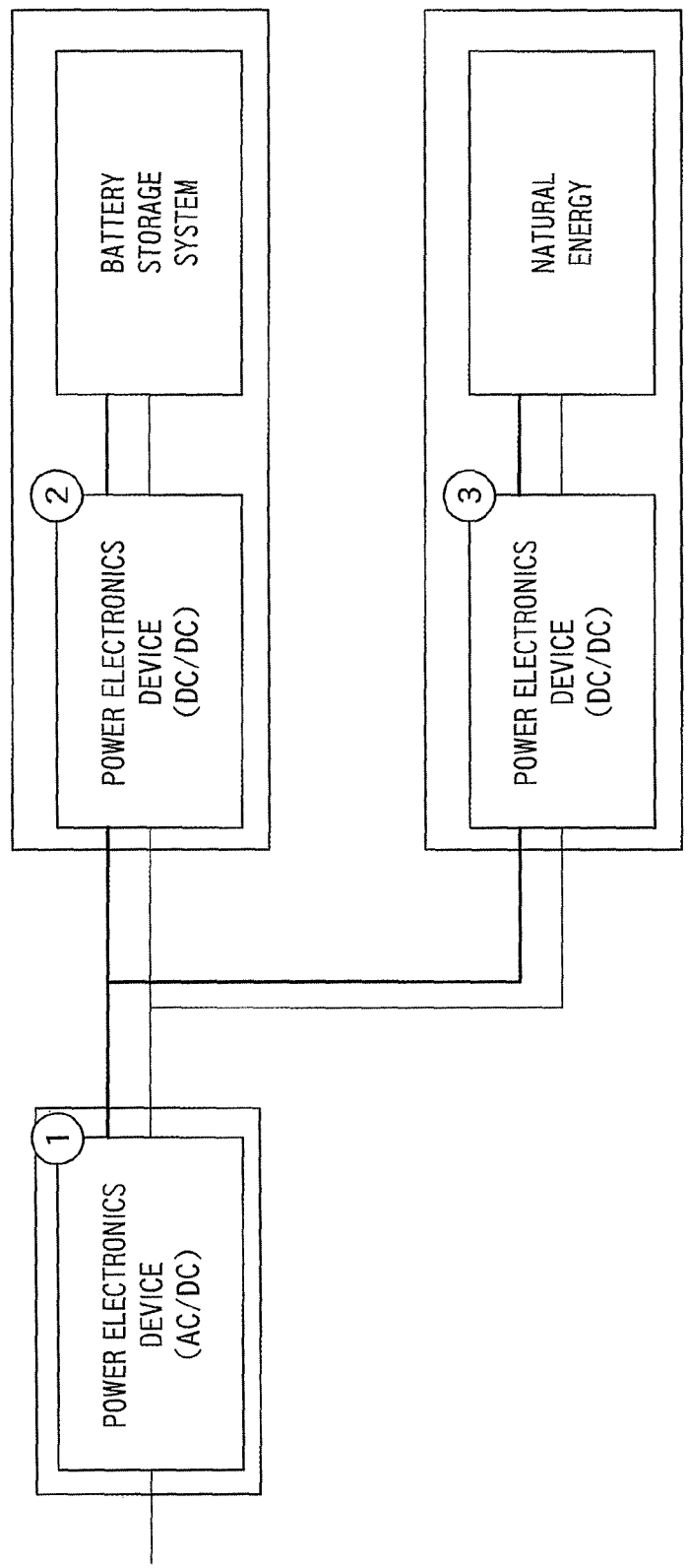
FIG. 27 is a view illustrating an example of a power connection relationship.

As described above, the power connection information exchanged in step S11 is power connection information on the instrument (such as a battery storage system, a natural energy system and a load) which the power electronics device directly controls. FIG. 27 illustrates a specific example of this. An instrument is not connected to the power electronics device 1. Therefore, from this power electronics device, power connection information showing that there is no connection with an instrument in step S11, is collected from the power electronics device (or, a configuration is possible in which no information is transmitted). The battery storage system is connected to the power electronics device 2 and therefore power connection information showing that the battery storage system is connected, is collected form the power electronics device 2. Here, only one battery storage system is connected, but, when plural items are connected, information on the plural devices and connection relationships with these devices (for example, a plurality of battery storage systems are connected in parallel or series to the power electronics device) are collected as power connection information. Since one natural energy system is connected to the power electronics device 3, power connection information showing that one natural energy system is connected, is collected from the power electronics device in step S11.

Here, an explanation is given to a difference between the power connection information collected in step S11 and the power connection information exchanged between the plurality of power electronics devices previously illustrated in FIG. 7. As for the information illustrated in FIG. 7, although it is possible to confirm which instrument can be connected to a power electronics device depending on the type of the power electronics device, it is not clear which instrument is actually connected to the power electronics device and how the instrument is connected to the power electronics device. For example, while it is found that a battery storage, a PC and a load can be connected to a power electronics device of DC/DC, it is not clear which of these is actually connected and how it is connected.

Meanwhile, as understood from FIG. 27, the power connection information collected in step S11 clarifies the power connection relationships between the battery storage system, the natural energy, the load and the power electronics devices. The power connection information may include a power connection wire, the number of connected items and electrical performance information held by each instrument.

Figure 28:
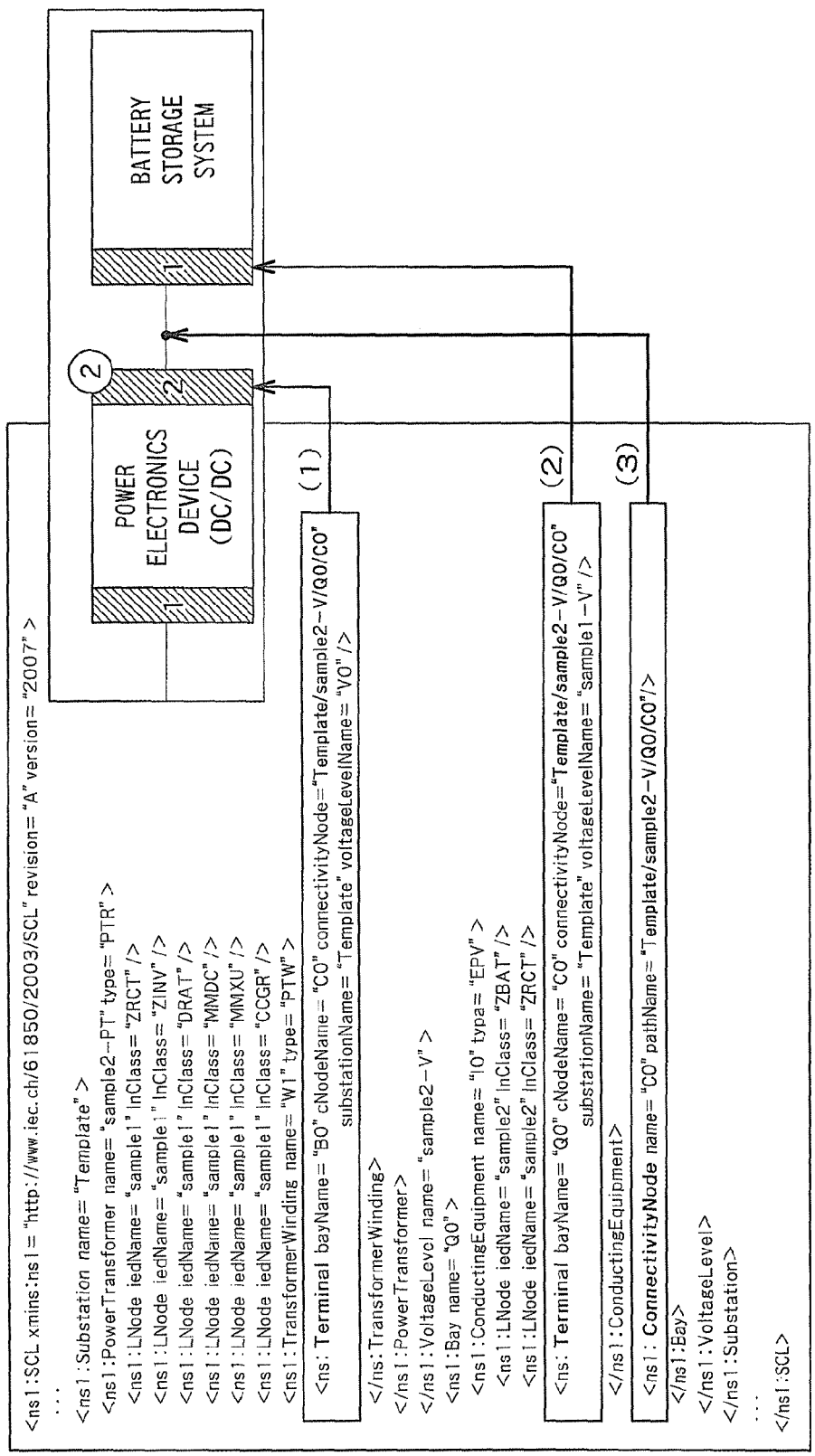
FIG. 28 is a view illustrating an example of describing power connection information by the IEC 61850-6 SCL specification.

Here, an expression method of power connection information is described. FIG. 28 expresses the power connection of a power electronics device with a battery storage system, a natural energy and a load by the use of IEC 61850-6 SCL. To be more specific, FIG. 28 expresses that the power electronics device 2 and the battery storage system, which are also illustrated in FIG. 27, are electrically connected to each other. IEC 61850-6 SCL is able to express not only power connection information but also an instrument function, the initial value related to the instrument function, communication information and a control interface. FIG. 28 illustrates extracted part of the power connection information. This is described later in detail.

[Explanation of IEC 61850-6]

To express a power connection relationship using IEC 61850-6 SCL, it is necessary to assign an identifier to each element (such as a power electronics device and an instrument). In IEC 61850-6 SCL, there are a plurality of PowerTransformer type elements and a plurality of VoltageLevel type elements in order to express the power connection relationships illustrated in FIG. 29. The elements (or power electronics devices) surrounded by broken lines L1, L2 and L3 correspond to the PowerTransformer type elements and the elements surrounded by broken lines B1, B2 and B3 correspond to the VoltageLevel type elements.

The PowerTransformer type elements and the VoltageLevel type elements have respective name attributes and identify each data type element using the name attributes. Therefore, in the same hierarchy, each data type element necessarily requires a distinguishable arbitrary identifier. Expression of the power connection relationships is not limited to the one using IEC 61850-6 SCL as illustrated in FIG. 28, and, if it is possible to express power connection between a power electronics device and an instrument, it is possible to use any expression format.

[Generation Method of Power Connection Information]

As a creation method of power connection information between a power electronics device and an instrument, there are two following methods. First, at the time of factory shipment, there is a method of containing information to express the power connection information in the power electronics device or a battery storage system, a natural energy or a load. To be more specific, in a case where the power electronics device and the battery storage system, natural energy and load connected thereto are fixed and are not changed after shipment, information on the intermediate power connection point (or connectivity node) and a termination (terminal) connected to the instrument is not changed. In the expression format in FIG. 29, the power connection point corresponds to a connectivity node and the termination (or terminal) corresponds to a terminal. The power electronics device has, for example, two terminations (or terminals).

Second, in a case where a power electronics device and a battery storage system, natural energy and load connected thereto are not clear until they are installed, there is a method of dynamically determining power connection points between the devices (i.e., the power electronics device, the battery storage system, the natural energy and the load). In this case, management of power connection information is implemented between the power electronics device and the battery storage system, natural energy and load connected thereto. To be more specific, by providing to each device its own device information at the time of shipment and generating and managing power connection information between the power electronics device and a device connected thereto, it is possible to obtain the power connection information between two devices. The power connection information example previously illustrated in FIG. 28 is an example created by the first method and contains a description format according to IEC 61850-6 SCL.

At the time of describing the power connection information using IEC 61850-6 SCL, it is necessary to assign different identifiers in the same hierarchy. For example, it is necessary to assign different identifiers to the power electronics devices 2 and 3 illustrated in FIG. 27. For example, it is possible to create a unique identifier by attaching a prefix or suffix based on the device ID.

Figure 29:
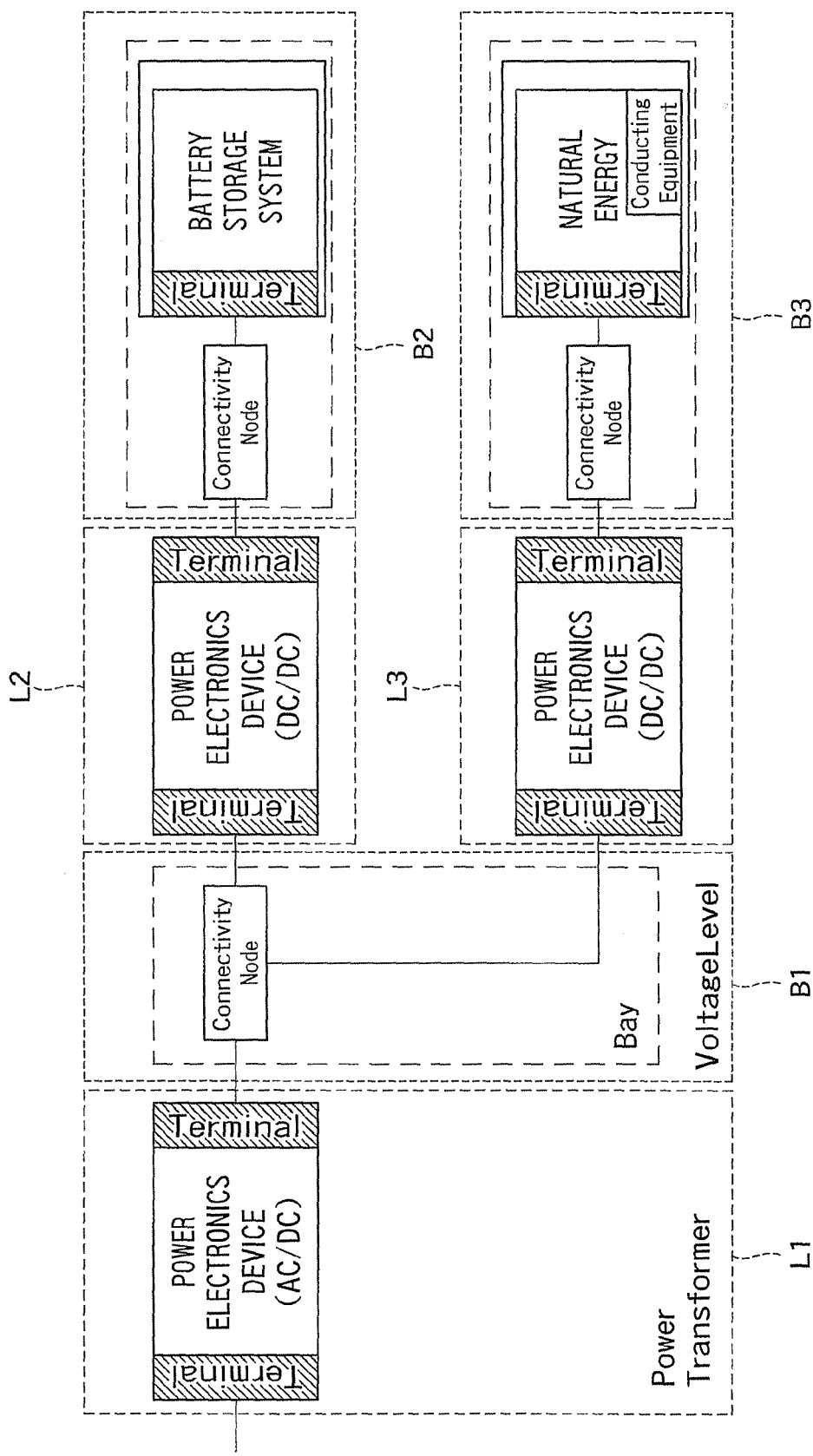
FIG. 29 is a view illustrating a power connection relationship according to the IEC 61850-6 SCL specification.

In the embodiment of the present invention, by attaching prefixes and suffixes to the name attributes of the VoltageLevel type elements and PowerTransformer type elements illustrated in FIG. 29, repetition of identifiers is avoided. In addition, it is possible to generate an identifier using an arbitrary hostname or IP address used in communication. The timing of assigning the identifier to its own managed power connection information may be the time of factory shipment, or only an indeterminate part may be explicitly described at the time when the hostname or IP address is determined. When the hostname is used, a device of a DHCP (Dynamic Host Configuration Protocol) automatically assigns the hostname to each device. Since the hostname does not overlap in the communication network, each power electronics device can use an identifier based on the hose name.

[Details of Acquisition of Power Connection Information (Step S11 in FIG. 25)]

Figure 30:
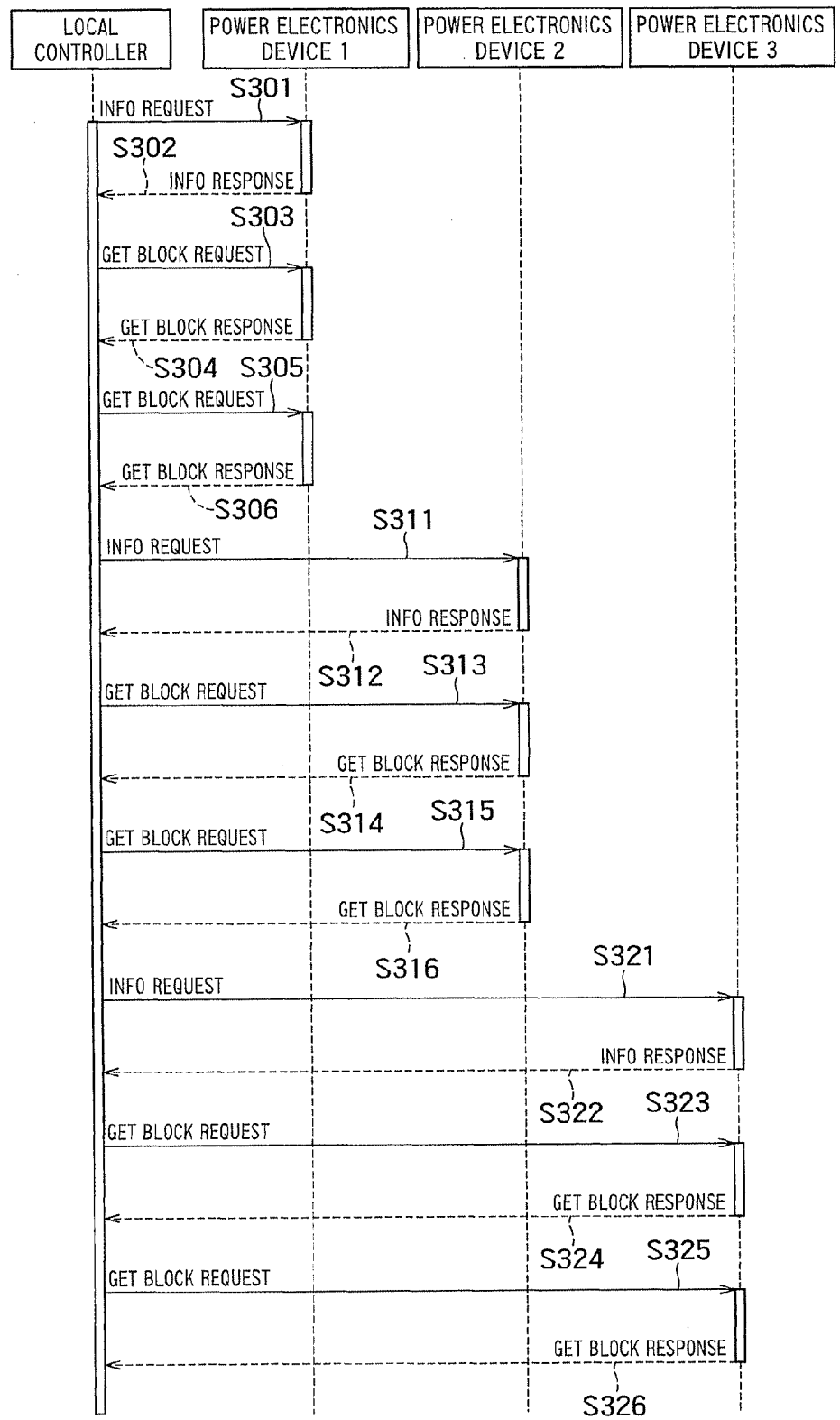
FIG. 30 is a view illustrating an exchange sequence of power connection information between a local controller and a plurality of power electronics devices.

FIG. 30 illustrates an exchange sequence of power connection information between a local controller and a plurality of power electronics devices. The sequence illustrated in FIG. 30 is formed with two sequences of a sequence to acquire information required for acquisition of power connection information and a sequence to acquire the power connection information.

The information required for acquisition of the power connection information is a power connection information access identifier and the size of the power connection information.

The power connection information access identifier is an identifier linked to the state of the power connection information, and, for example, when the power connection information is transmitted over multiple times, the power connection information access identifier is included in a demand. As a result of this, on the side of receiving the demand, it is possible to forward the power connection information linked to the power connection information access identifier. If the power connection information linked to the power connection information access identifier is updated on the receiving side during the time when it is transmitted over multiple times, when an acquisition demand with respect to it is received, a response that the power connection access identifier is not available is returned. That is, when the power connection information is updated on the receiving side, the power connection information access identifier is updated too and the power connection information access identifier before updating is not accepted. Here, when the power connection information is updated, a NOTIFY message is transmitted.

On the other hand, the size of the power connection information is the data size of the power connection information. By using this data size, at the time of implementing the acquisition sequence of the power connection information, it is possible to determine whether all data of the power connection information is received or only partial data is received.

In the sequence to acquire information required for acquisition of the power connection information, an INFO request message and an INFO response message are used. FIG. 31 illustrates a format of the INFO request message and FIG. 32 illustrates a format of the INFO response message.

The INFO request message illustrated in FIG. 31 includes a communication header, a message type, a sequence number and a power connection information identifier (which is an identifier assigned to the power connection information and differs from the power connection information access identifier described above). The communication header is a header such as TCP/IP (Transmission Control Protocol/Internet Protocol) and UDP/IP (User Datagram Protocol/Internet Protocol). The message type is information on the message type to distinguish the message. In the sequence number field, the sequence number of the message is written, and a common sequence number between the request and the response is used. The communication header, the message type and the sequence number are used for other messages (FIG. 32, FIG. 33 and FIG. 34) used in the sequence, in addition to the INFO response message.

The INFO response message illustrated in FIG. 32 includes a communication header, a message type, a sequence number, a status code, a power connection information access identifier and power connection information size. The status code includes a value showing that the INFO request and the INFO response are normally processed, and, in a case where an error occurs during processing, content of the generated error. As a case where the error occurs, for example, it is assumed that the INFO request message is in an inappropriate format or there is no power connection information corresponding to the power connection information identifier.

In the sequence to acquire the power connection information, a GET BLOCK request message and a GET BLOCK response message are used. FIG. 33 illustrates a format of the GET BLOCK request message and FIG. 34 illustrates a format of the GET BLOCK response message.

The GET BLOCK request message illustrated in FIG. 33 includes a communication header, a message type, a sequence number, a power connection information access identifier and an acquisition start point of power connection information. The power connection information access identifier uses a value received by the INFO response message illustrated in FIG. 32. The acquisition start point of power connection information indicates the acquisition start position of the power connection information. For example, in a case where the 0-th byte is specified, forwarding starts from the 0-th byte of the power connection information on the receiving side.

Figure 34:
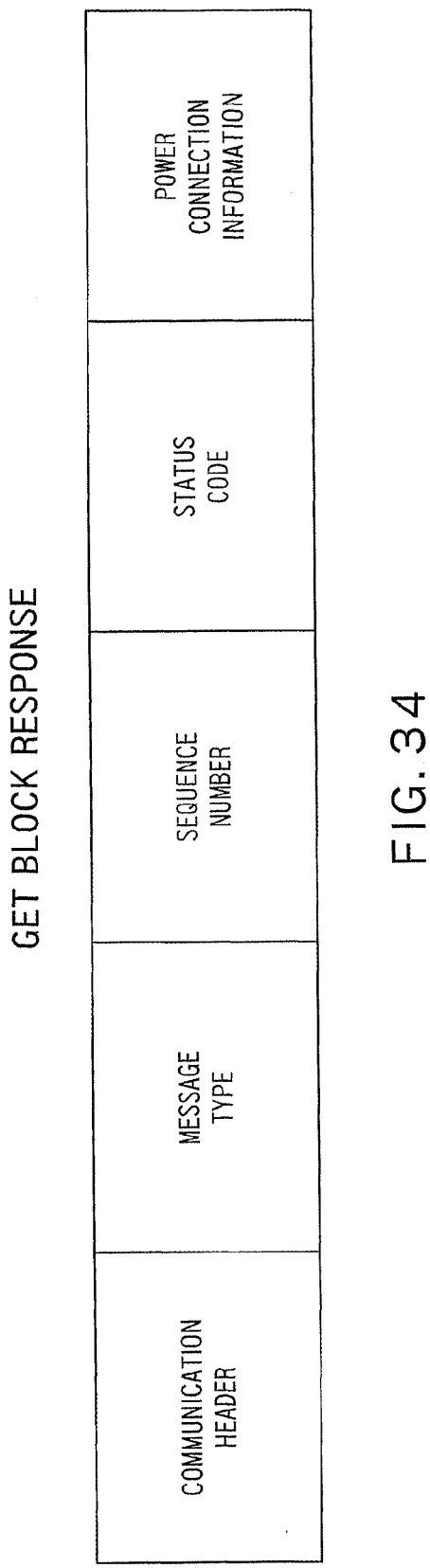
FIG. 34 is a view illustrating a format of a GET BLOCK response message.

The GET BLOCK response message illustrated in FIG. 34 includes a communication header, a message type, a sequence number, a status code and data. The data denotes data including information starting from the acquisition start point of the power connection information in the GET BLOCK request message. As for a data format at the time of forwarding, the power connection information in the format may be forwarded as it is, or may be forwarded in a format in which it is encoded by an arbitrary compression algorithm. For example, a document according to IEC 61850-6 SCL can be encoded using EXI (Efficient XML Interchange) and the encoded data can be transmitted.

In the following, the exchange sequence of power connection information is described in detail based on FIG. 30. The example illustrated in FIG. 30 shows a sequence that the local controller acquires power connection information from three power electronics devices 1, 2 and 3. The NOTIFY message reaches the local controller in advance from the power electronics devices 1, 2 and 3, and it is notified that the power connection information is registered or updated.

The local controller implements the acquisition sequence of information required to acquire the power connection information. The local controller transmits an INFO request message to the power electronics device 1 (S301). The power electronics device 1 verifies the validity of the INFO request message and transmits an INFO response message with respect to it (S302). The local controller verifies the validity of the INFO response message, and, if it does not contain error content, starts acquisition of the power connection information next.

In acquisition of the power connection information, a GET BLOCK request message is transmitted to the power electronics device 1 (S303). This GET BLOCK request message contains the power connection information access identifier included in the INFO response message transmitted from the power electronics device 1. The power electronics device 1 verifies the validity of the GET BLOCK request message, and, as a response to it, transmits a GET BLOCK response message to the local controller (S304).

The local controller verifies the validity of the received GET BLOCK response, and, if it includes an error, terminates the power connection information acquisition sequence and implements a power connection information outline acquisition sequence again. If the error is not included, data of the power connection information included in the message is acquired to compare the size of the acquired data and the power connection information size included in the INFO response message. If the acquired data size and the power connection information size are not matched, the GET BLOCK request message is transmitted again (S305). At this time, as the acquisition start point of power connection information included in the GET BLOCK request message, the sum of data sizes acquired so far is designated. As a result of this, it is possible to acquire the continuation of the power connection information previously received by the GET BLOCK response message, in the next GET BLOCK response message (S306). Subsequently, when the data size of power connection information of all received GET BLOCK response messages becomes greater than the power connection information size included in the INFO response message, the power connection information acquisition sequence is terminated. In the same way as above, the power connection information exchange sequence is implemented with respect to the power electronics devices 2 and 3. The sequence with respect to the power electronics device 2 is illustrated in a sequence of S311 to S316, and the sequence with respect to the power electronics device 3 is illustrated in a sequence of S321 to S326.

[Details of Configuration Understanding of Power Connection (Step S12 in FIG. 25)]

The entire interconnection relationship is understood using power connection information between power electronics devices used at the time of master/slave configuration determination in addition to the power connection information acquired in step S11 in FIG. 25. In the embodiment of the present invention, power connection information between a plurality of power electronics devices is managed based on the device ID's, and, furthermore, the power connection information (i.e., connection relationship) is expressed based on an identifier indicating the termination (or terminal) of a power electronics device to which a power line is connected. The identifier indicating the termination only has to be unique in the device of the corresponding device ID. The identifier indicating the termination may be one of an arbitrary numeral and a character string or combination of both. In the embodiment of the present invention, the identifier of the termination is expressed using the numeral. Moreover, information illustrated in FIG. 7 may be separately managed per termination.

Figure 35:
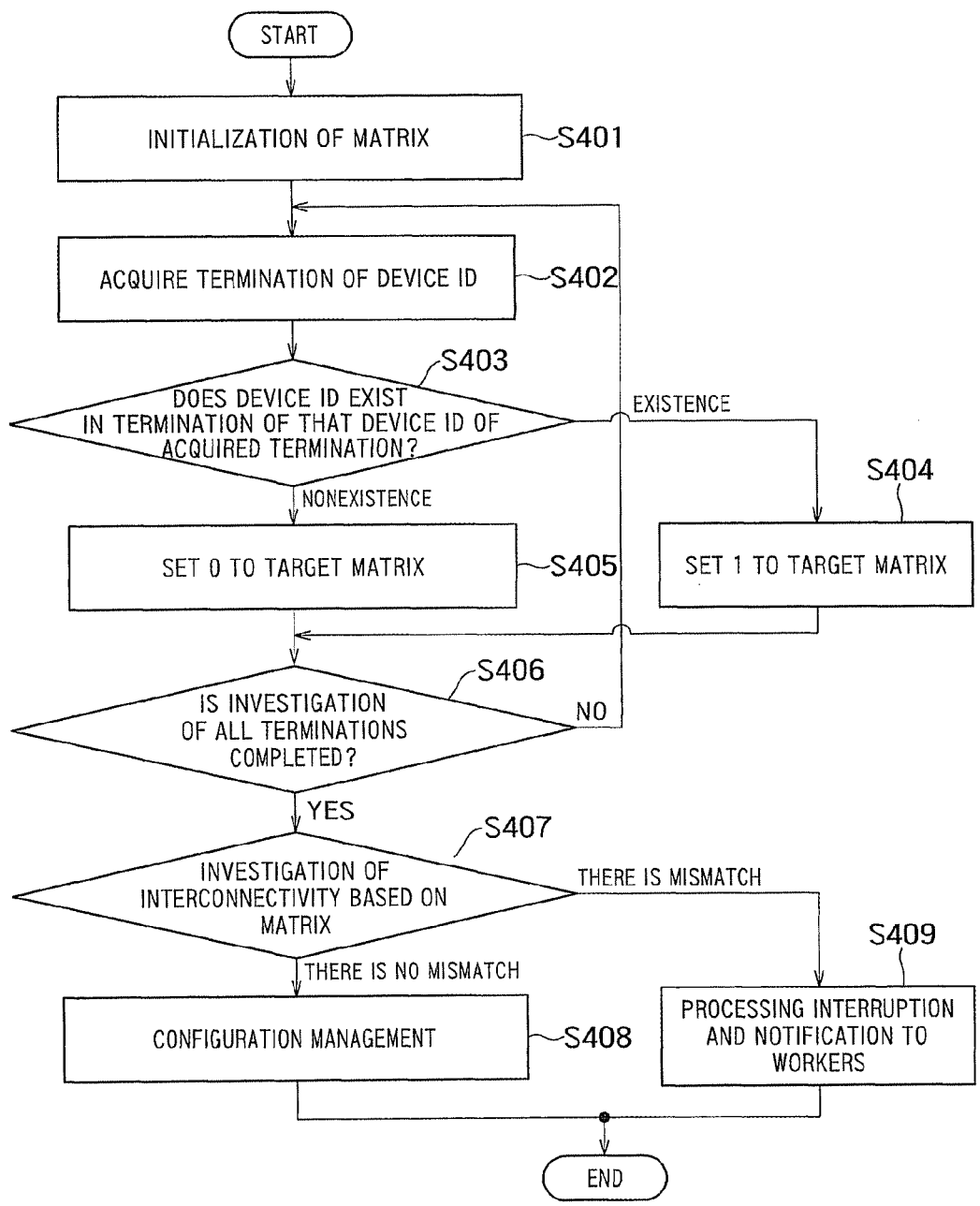
FIG. 35 is a view illustrating a detailed flowchart for confirming a configuration of power connection.

FIG. 35 illustrates a detailed flowchart of confirming the configuration of power connection. By performing operation according to this flowchart, the interconnection relationship is confirmed and the power connection relationship is understood.

Figure 36:
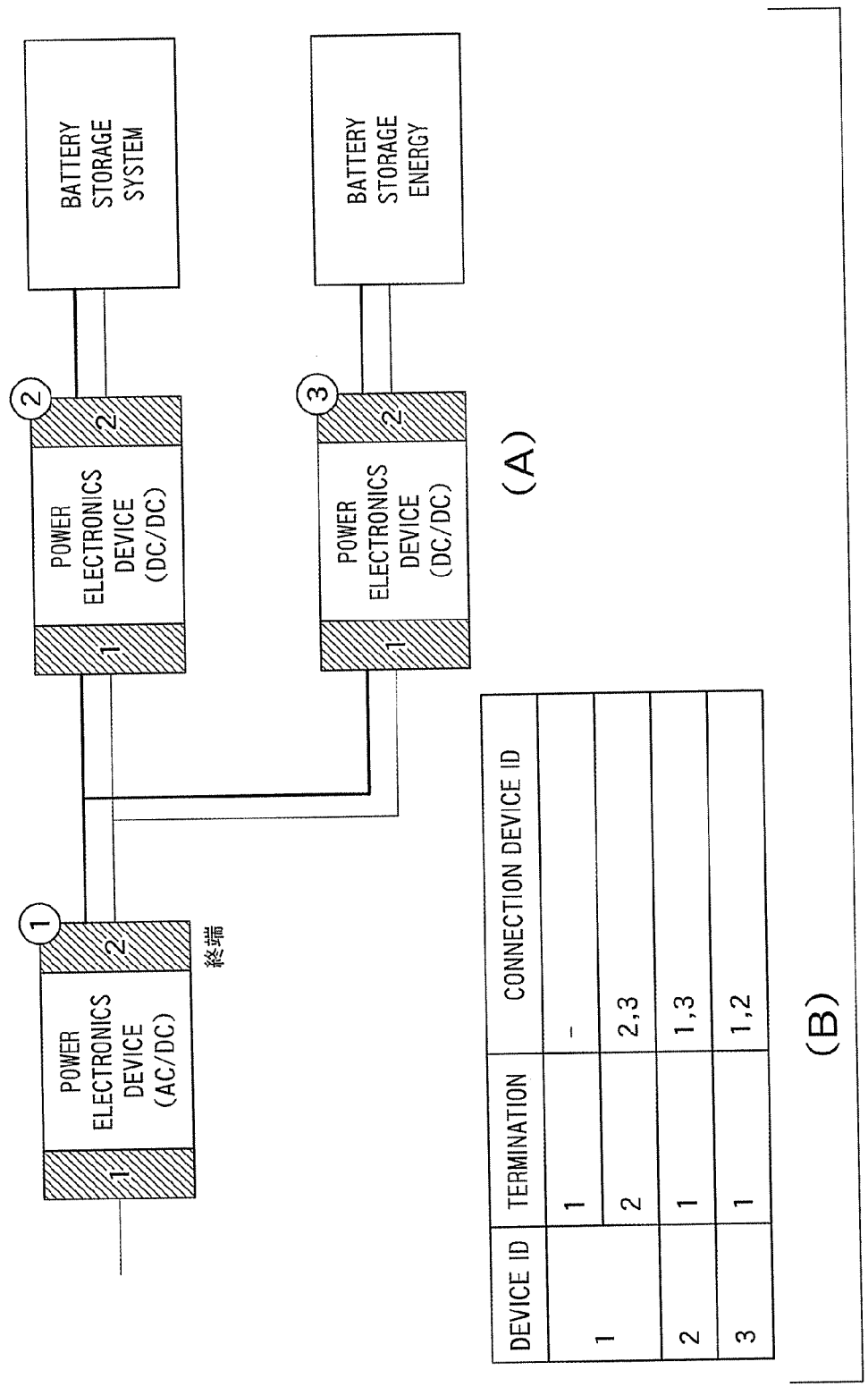
FIG. 36 is an explanatory diagram of processing for confirming the configuration of power connection.

First, in initialization of a matrix (i.e., table) (S401), a matrix based on the termination of each power electronics device is created. When a matrix is created based on the power connection information illustrated in FIG. 36(B), it becomes as illustrated in FIG. 37(1). This power connection information expresses the connection relationships between power electronics devices, based on the terminations. This information can be acquired from power connection information acquired at the time of master/slave determination processing. This information is formed with device ID's, termination identifiers and device ID's of devices connected to the terminations. Although FIG. 36(A) illustrates an actual connection configuration from which this power connection information is acquired, this configuration may not be understood at this time yet. In the example of FIG. 37(1), although a termination is expressed by "device ID-termination number," another format may be used as long as the termination can be identified. Also, in the following, the termination of a device having a certain device ID may be referred to as "termination of device ID."

Next, in acquisition of terminal information of the device ID (S402), a device ID of an investigation object is determined and the device ID of a device connected to a termination of that device ID is acquired.

Next, whether the above-mentioned investigation object device is connected to the termination of the acquired device ID is confirmed on the basis of the information in FIG. 36(B). If the connection is confirmed, "1" is set to a target part of the matrix (S404), and, if the connection is not confirmed, "0" is set (S405). The above-mentioned procedure is implemented with respect to all device ID's (S406).

The above-mentioned procedure is described in detail using FIG. 37. First, in the matrix state of FIG. 37(1), based on the power connection information illustrated in FIG. 36(B), a device ID 2 connected to a termination 2 of a device ID 1 is focused on. It is confirmed that the device ID 1 is connected to a termination 1 of the device ID 2. Therefore, a cell corresponding to item 1-2 of the row and item 2-1 of the column in the matrix is set to "1." Subsequently, a device ID 3 connected to the termination 2 of the device ID 1 is focused on. Since it is confirmed that the device ID 2 is connected to a termination 1 of the device ID 3, a cell corresponding to item 1-2 of the row and item 3-1 of the column is set to "1." This procedure is repeatedly performed with respect to all terminations of the device ID's. FIG. 37(2) illustrates a result of performing it with respect to the device ID 1, FIG. 37(3) illustrates a result of performing it with respect to the device ID 2 and FIG. 37(4) illustrates a result of performing it with respect to the device ID 3. FIG. 37(4) corresponds to a finally acquired matrix.

Finally, whether there is interconnectivity is confirmed using the created matrix (S407). An example of a confirmation method is described on the basis of the matrix in FIG. 37(4). First, the value of the cell of 1-2 in the row and 2-1 in the column and the value of the cell of 2-1 in the row and 1-2 in the column, which is vertically and horizontally opposite to 1-2 in the row and 2-1 in the column, are compared to confirm whether the values are matched. The confirmation is similarly applied to all in the row and column of the matrix, and, if there is not mismatch, it shifts to management of the next power connection information (step S13 in FIG. 5) (S408). If there are mismatched values, the processing is interrupted (S409). At this time, information that interconnectivity is not secured may be reported to workers (S409).

[Details of Management of Power Connection Information (Step S13 in FIG. 5)]

In management of power connection information, as illustrated in FIG. 29, the whole power connection relationship is expressed using the information acquired in steps S11 and S12 in FIG. 5. The power connection information managed by the power electronics devices can be integrated on the basis of the power connection relationships between the power electronics devices to thereby obtain the whole power connection information collectively described as one power connection information. The whole power connection information can be confirmed by workers through the display terminal 69 illustrated in FIG. 4 or the like. In the following, an example of management of the whole power connection information is described.

The description illustrated in FIG. 28, which was described a little beforehand, is described in detail. FIG. 28 expresses connection between a power electronics device and a battery storage system. The power electronics device is expressed by a PowerTransformer type element and the battery storage system is expressed by a ConductingEquipment type element. In the present embodiment, as described above, although the power electronics device is expressed by the PowerTransformer type element and the battery storage system is expressed by the ConductingEquipment type element, they are not limited to this and it is possible to use a data type element matching the function of each instrument. IEC 61850-6 SCL uses an idea of "connection point (or power connection point)" to express the connection relationship between devices. The example illustrated in FIG. 28 expresses that, in the power electronics device and the battery storage system, Terminal type elements (1) and (2) that are terminations for connection thereto are connected to ConnectivityNode type element (3). This is understood because the attributes of Terminal type elements (1) and (2) match the attribute of ConnectivityNode type element (3). To be more specific, the pathName attribute of ConnectivityNode type element (3) and the connectivityNode attribute of Terminal type elements (1) and (2) are matched.

Figure 38:
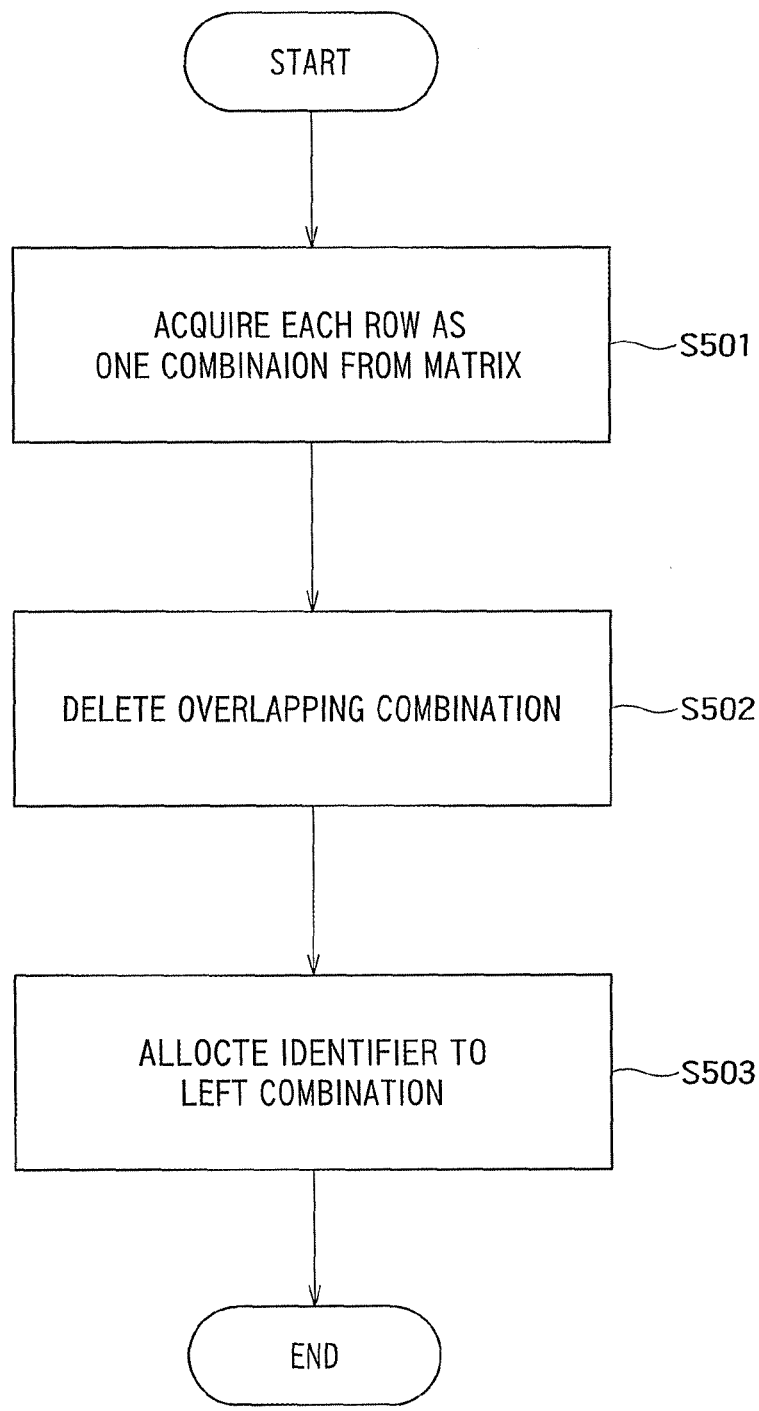
FIG. 38 is a view illustrating a flowchart that specifies the connection relationship in each termination between power electronics devices.
Figure 39:
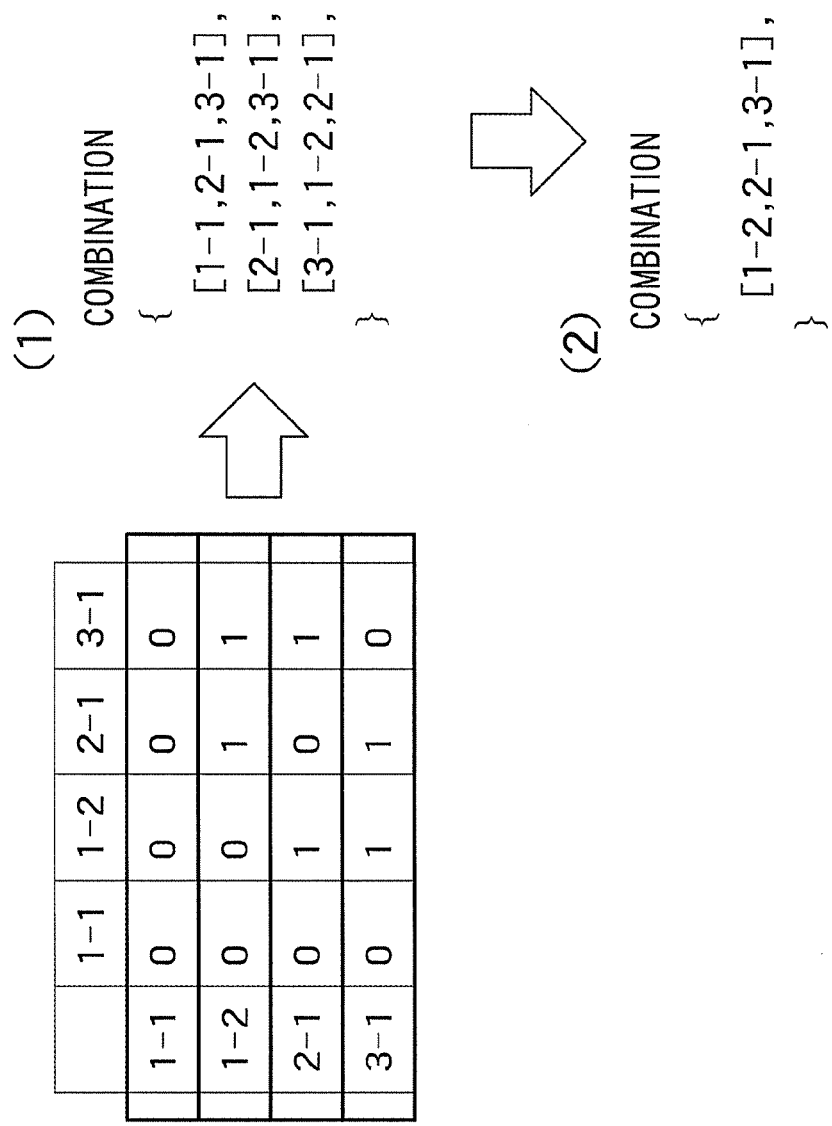
FIG. 39 is an explanatory diagram of processing in FIG. 38.

A creation method of a connection point is described using the matrix in which interconnection information is confirmed in step S407 in FIG. 35. FIG. 38 illustrates a flowchart of the flow of processing in this method. First, combinations based on a termination with "1" in each row are created using the matrix illustrated in FIG. 37(4) (S501). From the matrix illustrated in FIG. 37(4), three combinations can be generated as illustrated in FIG. 39(1).

Next, overlapping combinations are deleted (S502). As a result of this, one combination remains as illustrated in FIG. 39(2). It is possible to distinguish the combination by allocating an identifier to the left combination (S503). This left combination shows that the termination 2 of the instrument ID 1, the termination 1 of the instrument ID 2 and the termination 1 of the instrument ID 3 are connected by a common connection point. Therefore, since the connection relationship in terminations between power electronics devices is understood or information on a controllable instrument connected to a power electronics device is already acquired, it is possible to manage the whole power connection information between the power electronics device, the battery storage system, the natural energy and the load.

Figure 40:
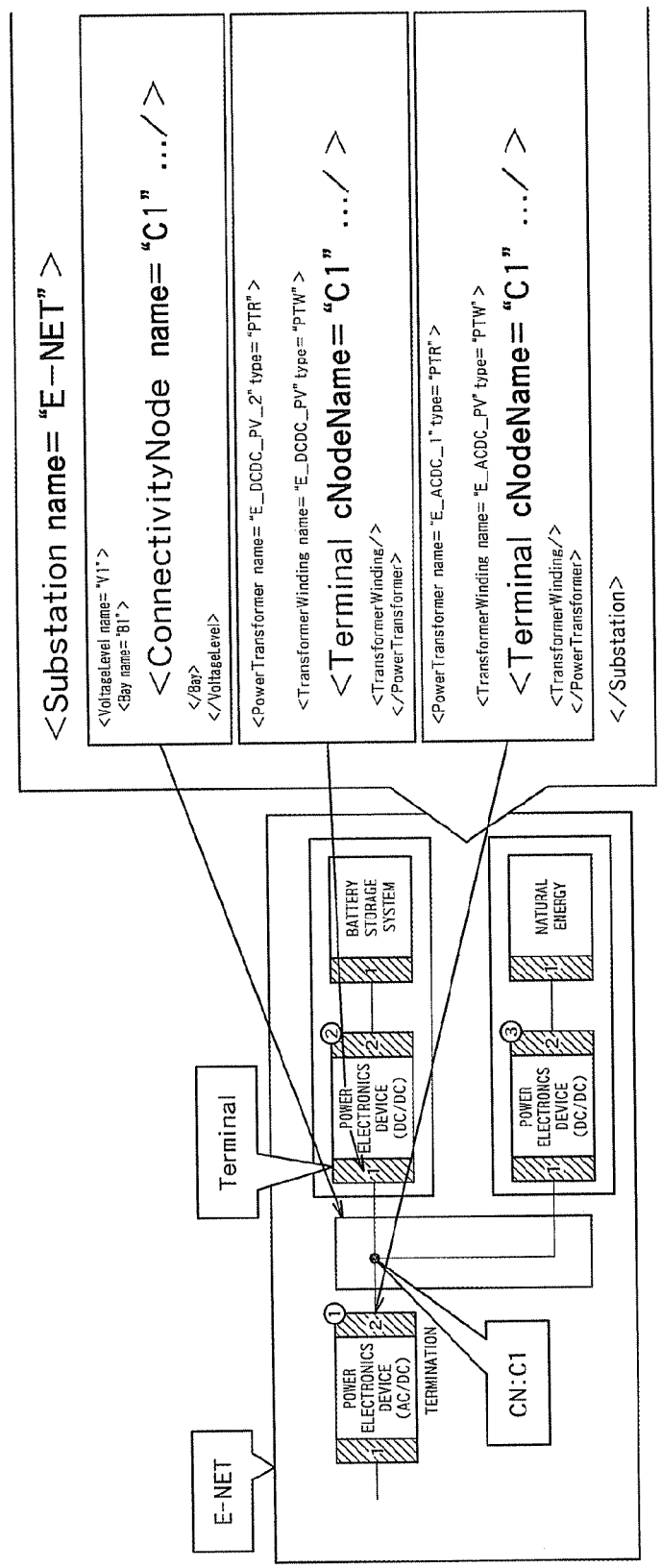
FIG. 40 is a view illustrating an example of adding a connection point between power electronics devices according to IEC 61850-6 SCL.

Next, a method of reflecting the whole power connection information generated in the above-mentioned procedure to IEC 61850-6 SCL used in a design system is described using FIG. 40 and FIG. 28. FIG. 40 illustrates an example of assigning a connection point in IEC 61850-6 SCL.

In order to integrate (or combine) power connection information on a plurality of power electronics devices, it is necessary to add two settings of the setting related to the whole and the setting related to each power electronics device.

The setting related to the whole is a value that should be shared by all power electronics devices, and corresponds to the name attribute of the Substation type element in the example of FIG. 28. In the example of FIG. 40, "E-NET" is assigned as the name attribute of the Substation type element. The setting related to each power electronics device is description of the Terminal type element that expresses power connection and the ConnectivityNode type element. In the example in FIG. 28, although the connection relationship between the power electronics device and the battery storage system is expressed, the connection relationship between power electronics devices is not expressed.

As illustrated in the example in FIG. 40, a ConnectivityNode type element corresponding to the combination illustrated in FIG. 39(2) that is information on the connection point of each power electronics device is added. At the time of adding the ConnectivityNode type element, it is necessary to determine a plurality of attributes (such as a name and pathName). Moreover, it is necessary to attach an identifier to the added connection point. In the illustrated example, "C1" is attached as an identifier to the connection point. For the identifier, an arbitrary value that does not overlap with other connection points in the same substation element may be assigned. It may be generated on the basis of the device ID of each device connected to the connection point.

Moreover, a Terminal element is created for a PowerTransformer type element corresponding to the instrument ID described in the above-mentioned combination. That is, the Terminal type element is added into the PowerTransformer type element of each power electronics device shown in the combination (in the illustrated example, as for only the power electronics devices 1 and 2, the state of addition is illustrated). At the time of creating the Terminal element, the attribute value of the ConnectivityNode type element that is a connection point is retained in the Terminal element.

In the embodiment of the present invention, although management of power connection information is implemented by a local controller, it may be implemented by a power electronics device. Moreover, the managed power connection information may be reported to each power electronics device. By notifying each power electronics device of the Terminal type element and the ConnectivityNode type element to be added, it is possible to display the whole power connection relationship even in a case where a totally different system collects information from each power electronics device.

The power electronics devices which have been heretofore described may also be realized using a general-purpose computer device as basic hardware. That is, the power electronics devices can be realized by causing a processor mounted in the above described computer device to execute a program. In this case, the power electronics device may be realized by installing the above described program in the computer device beforehand or may be realized by storing the program in a storage medium such as a CD-ROM or distributing the above described program over a network and installing this program in the computer device as appropriate. Furthermore, the storage in the power electronics device may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power electronics device comprising a computer including a processor, wherein the computer is configured to implement at least:
  a controlling unit configured to perform surveillance/control concerning an input/output of power to a power line with other power electronics devices connected via the power line;
  a determining unit configured to determine a master device which is a subject of the surveillance/control and a slave device which is controlled by the master device, based on power characteristic information of the other power electronics devices from among the other power electronics devices and the power electronics device;
  a communicating unit configured to receive configuration information indicating a master device and a slave device determined by the other power electronics devices;
  a confirming unit configured to confirm whether the master device and the slave device determined by the determining unit are matched with the master device and the slave device determined by the other power electronics devices based on the configuration information received by the communicating unit;

a determining unit configured to permit a start of the surveillance/control when matching is determined by the confirming unit.

2. The power electronics device according to claim 1, wherein the computer is further configured to implement an outputting unit configured to output configuration information indicating the master device and the slave device determined by the determining unit, to an outside, wherein the confirming unit determines the matching when receiving a confirmation with respect to the outputted configuration information from the outside.

3. The power electronics device according to claim 1, wherein power characteristic information of the power electronics device includes information indicating which function of alternating-current/direct-current conversion, direct-current/direct-current conversion and alternating-current/alternating-current conversion the power electronics device has.

4. The power electronics device according to claim 3, wherein the power characteristic information further includes information indicating to which of an electric-supply power source device and an electric-consumption load device the power electronics device is connected.

5. The power electronics device according to claim 3, wherein:

a higher priority is given in order from a power electronics device having the alternating-current/direct-current conversion function, a power electronics device which has the direct-current/direct-current conversion function and which is further connected to a power source device, and a power electronics device which has the direct-current/direct-current conversion function and which is further connected to a load device; and the determining unit determines a device with a highest priority in the other power electronics devices connected to the power line, as the master device.

6. The power electronics device according to claim 5, wherein the determining unit sets a priority of a power electronics device connected to a battery storage to be higher than a power electronics device connected to a power source device different from the battery storage.

7. The power electronics device according to claim 1, wherein, in a case where there is already one master device in the other power electronics devices, the determining unit acquires power characteristic information of the master device and determines the master device and the slave device from among the master device, the other power electronics devices and the power electronics device.

8. The power electronics device according to claim 1, wherein, in a case where interruption of communication or power with one of the other power electronics devices is detected, the determining unit determines the master device and the slave device again from among the power electronics device and a remainder of the other power electronics devices excluding the power electronics device for which the communication or power is interrupted.

9. The power electronics device according to claim 1, wherein:

the communicating unit configured to communicate with at least one power electronics device; and the computer is further configured to implement:

a power connection information acquiring unit configured to acquire, from each of the at least one power electronics device, at least one of first power connection information and second power connection information, the first power connection information specifying another power electronics device connected to a same power line as each of the at least one power electronics device and the second power connection information specifying an instrument which is connected to a same power line as and controlled by each of the at least one power electronics device; and a power connection information managing unit configured to generate whole power connection information showing a whole power connection relationship including a connection relationship between power electronics devices and a connection relationship between a power electronics device and an instrument, based on the first and second power connection information.

10. A cooperative control method by a power electronics device performing surveillance/control concerning an input/output of power to a power line with other power electronics devices connected via the same power line, comprising:

determining a master device which is a subject of the surveillance/control and a slave device which is controlled by the master device, based on power characteristic information of the other power electronics devices from among the other power electronics devices and the power electronics device;

receiving configuration information indicating a master device and a slave device determined by the other power electronics devices;

confirming whether the master device and the slave device as determined are matched with the master device and the slave device determined by the other power electronics devices based on the received configuration information; and permitting a start of the surveillance/control when matching is determined by the confirming unit.

11. The method according to claim 10, further comprising:

communicating with at least one power electronics device;

acquiring, from each of the at least one power electronics device, at least one of first power connection information and second power connection information, the first power connection information specifying another power electronics device connected to a same power line as each of the at least one power electronics device and the second power connection information specifying an instrument which is connected to a same power line as and controlled by each of the at least one power electronics device; and generating whole power connection information showing a whole power connection relationship including a connection relationship between power electronics devices and a connection relationship between a power electronics device and an instrument, based on the first and second power connection information.

12. A non-transitory computer readable medium having instructions stored therein which, when executed by a processor for a power electronics device performing surveillance/control concerning an input/output of power to a power line with other power electronics devices connected via the same power line the processor, controls the power electronics device to perform operations comprising:

determining a master device which is a subject of the surveillance/control and a slave device which is controlled by the master device, based on power characteristic information of the other power electronics devices from among the other power electronics devices and the power electronics device;

receiving configuration information indicating a master device and a slave device determined by the other power electronics devices;

confirming whether the master device and the slave device as determined are matched with the master device and the slave device determined by the other power electronics devices based on the received configuration information; and permitting a start of the surveillance/control when matching is determined by the confirming unit.

13. The medium according to claim 12, wherein the operations further comprise:

communicating with at least one power electronics device;

acquiring, from each of the at least one power electronics device, at least one of first power connection information and second power connection information, the first power connection information specifying another power electronics device connected to a same power line as each of the at least one power electronics device and the second power connection information specifying an instrument which is connected to a same power line as and controlled by each of the at least one power electronics device; and generating whole power connection information showing a whole power connection relationship including a connection relationship between power electronics devices and a connection relationship between a power electronics device and an instrument, based on the first and second power connection information.

* * * * *